(12) United States Patent
Schie

(10) Patent No.: US 11,548,182 B1
(45) Date of Patent: Jan. 10, 2023

(54) SAWMILL

(71) Applicant: Kurt M. Schie, Akron, NY (US)

(72) Inventor: Kurt M. Schie, Akron, NY (US)

( * ) Notice: Subject to any disclaimer, the term of this patent is extended or adjusted under 35 U.S.C. 154(b) by 0 days.

(21) Appl. No.: 17/475,520

(22) Filed: Sep. 15, 2021

(51) Int. Cl.
| | |
|---|---|
| *B27B 13/02* | (2006.01) |
| *B27B 13/10* | (2006.01) |
| *B27B 15/02* | (2006.01) |
| *B27B 15/04* | (2006.01) |
| *B27B 13/08* | (2006.01) |
| *B27B 13/12* | (2006.01) |

(52) U.S. Cl.
CPC .............. *B27B 13/02* (2013.01); *B27B 13/08* (2013.01); *B27B 13/12* (2013.01); *B27B 15/02* (2013.01); *B27B 15/04* (2013.01); *B27B 13/10* (2013.01); *Y10T 83/7101* (2015.04); *Y10T 83/7108* (2015.04); *Y10T 83/722* (2015.04)

(58) Field of Classification Search
CPC ......... B27B 13/02; B27B 13/04; B27B 15/02; B23D 55/02; B23D 55/023; B23D 55/026; Y10T 83/707–7264
USPC .................................................... 83/794–797
See application file for complete search history.

(56) References Cited

U.S. PATENT DOCUMENTS

| | | | | |
|---|---|---|---|---|
| 2,427,038 A | * | 9/1947 | Ashman | B27B 15/04 83/435.27 |
| 2,459,800 A | * | 1/1949 | Esgate | B27B 5/10 52/646 |
| 2,497,072 A | | 2/1950 | Cooper | |
| 2,687,309 A | * | 8/1954 | Anders | B27B 5/10 30/379 |
| 2,853,309 A | * | 9/1958 | Hubbard | B27B 5/10 83/651 |
| 2,905,481 A | | 9/1959 | Schramm | |

(Continued)

FOREIGN PATENT DOCUMENTS

| | | |
|---|---|---|
| CA | 187369 | 12/2019 |
| CA | 191489 | 12/2019 |

(Continued)

OTHER PUBLICATIONS https://www.youtube.com/watch?v=4vKzbXIFwKU (Year: 2017).*

(Continued)

*Primary Examiner* — Laura M Lee
(74) *Attorney, Agent, or Firm* — James C. Simmons

(57) ABSTRACT

A portable sawmill which has an elongate central portion, at least one hinged foldable extension portion, laminated rails, detachable axle/wheel combinations, a tow bar, and adjustable legs. Spacers are received between each rail and the respective support structure for both the central portion and the extension portion, including one spacer a first portion of which is disposed between and attached to each rail and support structure of one of the central portion and the extension portion and a second portion of which is slidingly receivable between each rail and support structure of the other of the central portion and the extension portion as the extension is unfolded for use. A pull cable, when an actuation lever is engaged, effects pivotal movement of a cam to which another pull cable is attached for actuating the engine throttle for cutting wood. At least one other pull cable or other actuation member is attached to the cam to actuate at least one other device upon the actuation of the throttle.

20 Claims, 43 Drawing Sheets

(56) References Cited

U.S. PATENT DOCUMENTS

| | | | |
|---|---|---|---|
| 3,913,439 A * | 10/1975 | Large | A01G 23/00 |
| | | | 83/928 |
| 3,979,133 A | 9/1976 | Morris | |
| 4,058,325 A | 11/1977 | Schramm | |
| 4,126,324 A | 11/1978 | Browning | |
| 4,165,096 A | 8/1979 | Lewis, Jr. et al. | |
| 4,275,632 A | 6/1981 | Ross | |
| 4,480,851 A | 11/1984 | St-Pierre | |
| 4,559,858 A * | 12/1985 | Laskowski | B23D 53/04 |
| | | | 83/743 |
| 4,584,918 A | 4/1986 | Stubbe et al. | |
| 4,807,894 A | 2/1989 | Walker | |
| 5,137,297 A | 8/1992 | Walker | |
| 5,161,814 A | 11/1992 | Walker | |
| 5,215,049 A | 6/1993 | Wolf | |
| 5,326,128 A | 7/1994 | Cromley, Jr. | |
| 5,464,243 A | 11/1995 | Maiwald et al. | |
| 5,692,779 A | 12/1997 | Hedgepeth | |
| 5,743,541 A | 4/1998 | Cook | |
| 6,038,954 A | 3/2000 | Keener | |
| 6,428,035 B1 | 8/2002 | Maxwell et al. | |
| 6,655,429 B2 * | 12/2003 | Tekulve | B27B 31/08 |
| | | | 144/242.1 |
| 6,857,643 B2 | 2/2005 | Neider | |
| 6,923,452 B1 | 8/2005 | Zachmeier et al. | |
| 7,055,848 B1 | 6/2006 | James | |
| 7,073,816 B1 | 7/2006 | Larson et al. | |
| 7,163,212 B1 | 1/2007 | Rupp | |
| 7,243,979 B1 | 7/2007 | Stene et al. | |
| 7,360,784 B2 | 4/2008 | Stewart et al. | |
| 7,401,804 B1 | 7/2008 | Rupp | |
| 7,444,912 B2 * | 11/2008 | Fenton | B27B 29/02 |
| | | | 144/1.1 |
| 7,784,387 B2 | 8/2010 | Dale et al. | |
| D638,040 S | 5/2011 | Dale | |
| 8,215,216 B2 | 7/2012 | Dale | |
| 8,276,493 B2 * | 10/2012 | Dale | B23D 55/02 |
| | | | 83/788 |
| 8,479,628 B2 | 7/2013 | Dale et al. | |
| 8,573,106 B2 * | 11/2013 | Burton | B27B 31/04 |
| | | | 83/928 |
| 8,727,360 B2 | 5/2014 | Catford | |
| 8,857,407 B2 | 10/2014 | Furuya | |
| D816,742 S | 5/2018 | Cabrit et al. | |
| D818,013 S | 5/2018 | Cabrit et al. | |
| D831,711 S | 10/2018 | Cabrit et al. | |
| D834,623 S | 11/2018 | Cabrit et al. | |
| 11,267,058 B2 * | 3/2022 | Shiel | B23Q 1/0063 |
| 2003/0024371 A1 | 2/2003 | Gibson et al. | |
| 2004/0004333 A1 | 1/2004 | Riermann | |
| 2005/0067799 A1 | 3/2005 | Smith | |
| 2005/0092155 A1 * | 5/2005 | Phillips | B27B 27/10 |
| | | | 83/581 |
| 2005/0146125 A1 | 7/2005 | Wheeler | |
| 2005/0184485 A1 | 8/2005 | Timmermans | |
| 2007/0126209 A1 | 6/2007 | Wolfe | |
| 2007/0246911 A1 | 10/2007 | Shawyer | |
| 2007/0272066 A1 * | 11/2007 | Phillips | B23D 45/068 |
| | | | 83/435.11 |
| 2009/0165624 A1 * | 7/2009 | Brown | B27B 27/02 |
| | | | 83/477 |
| 2009/0224512 A1 | 9/2009 | Winter et al. | |
| 2011/0133433 A1 | 6/2011 | Wolfe | |
| 2013/0283992 A1 | 10/2013 | Belzile | |
| 2014/0174603 A1 | 6/2014 | Dale | |
| 2016/0264031 A1 | 9/2016 | Weldy | |
| 2016/0346852 A1 | 12/2016 | Gilman et al. | |
| 2018/0297501 A1 | 10/2018 | Studer | |
| 2018/0345524 A1 | 12/2018 | Cabrit et al. | |
| 2019/0084177 A1 | 3/2019 | Lucas | |
| 2019/0084178 A1 | 3/2019 | Lucas | |
| 2020/0353640 A1 | 11/2020 | Bramley et al. | |
| 2021/0008751 A1 | 1/2021 | Bramley et al. | |
| 2021/0086393 A1 * | 3/2021 | Johnson | B27B 33/06 |
| 2021/0213460 A1 | 7/2021 | Bramley et al. | |

FOREIGN PATENT DOCUMENTS

| | | |
|---|---|---|
| CA | 191490 | 12/2019 |
| CA | 3052360 A1 | 2/2021 |
| CA | 3098025 A1 | 4/2021 |
| GB | 2267468 A | 12/1993 |
| GB | 2401586 A | 11/2004 |
| WO | 2004069589 A1 | 8/2004 |

OTHER PUBLICATIONS

Woodlander drawings; Dec. 19, 2019.*
Woodlander XL sawmill trailer Operator's Manual Dec. 1, 2020.*
Woodland Mills, "HM126 Portable Sawmill", Operator's Manual, Dec. 1, 2021.

* cited by examiner

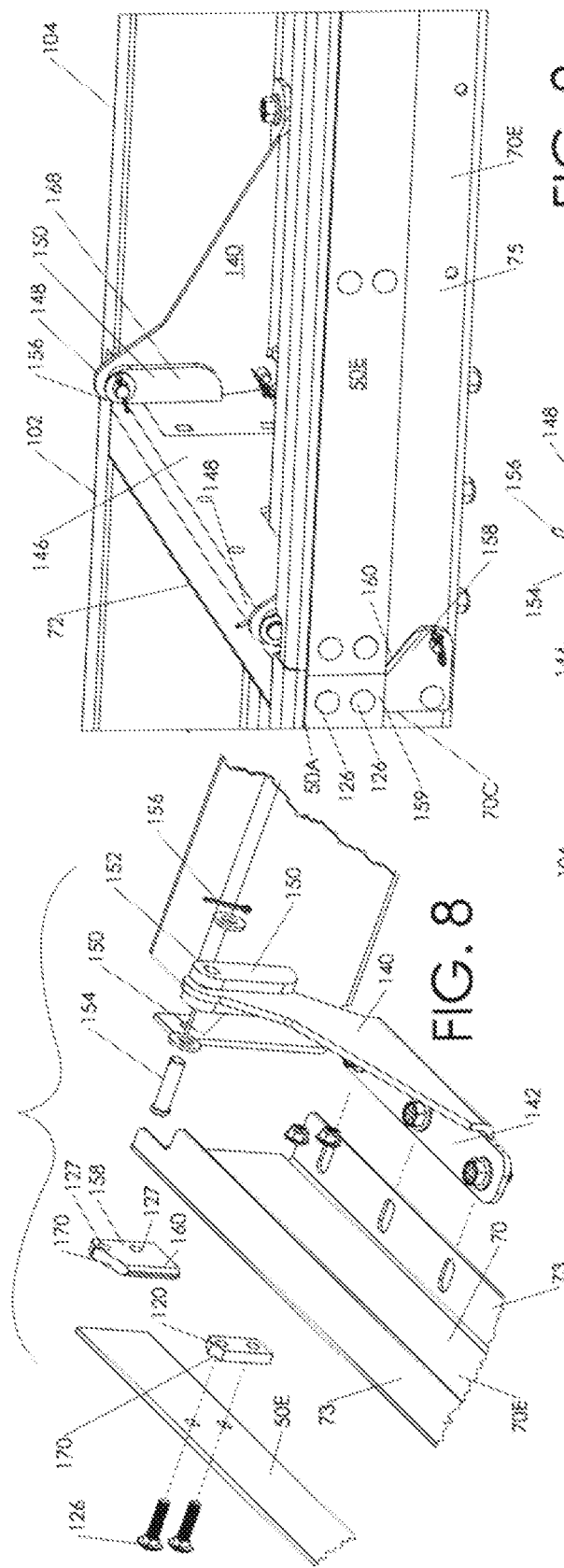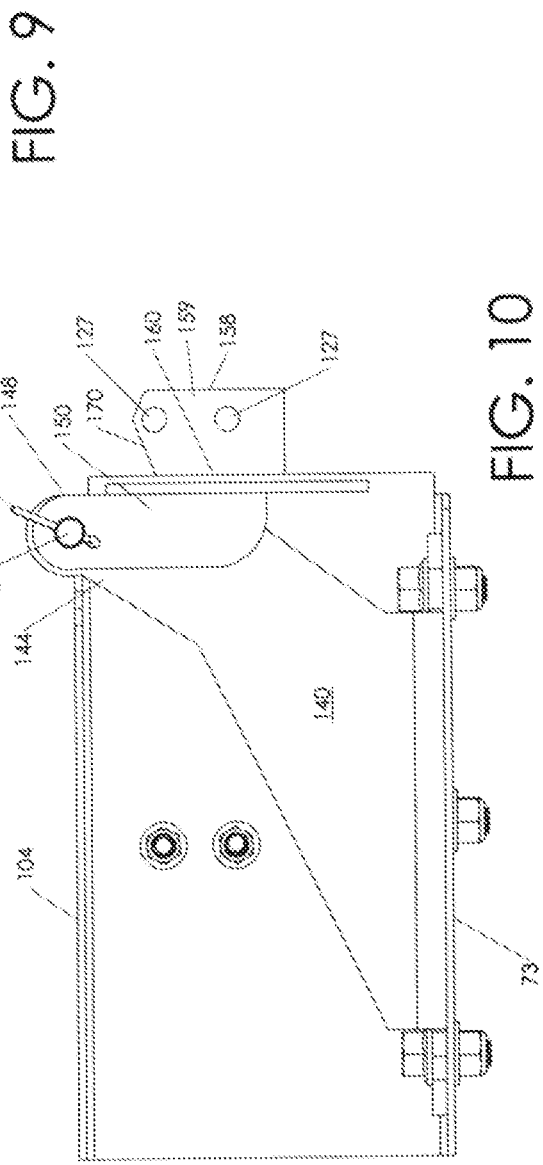

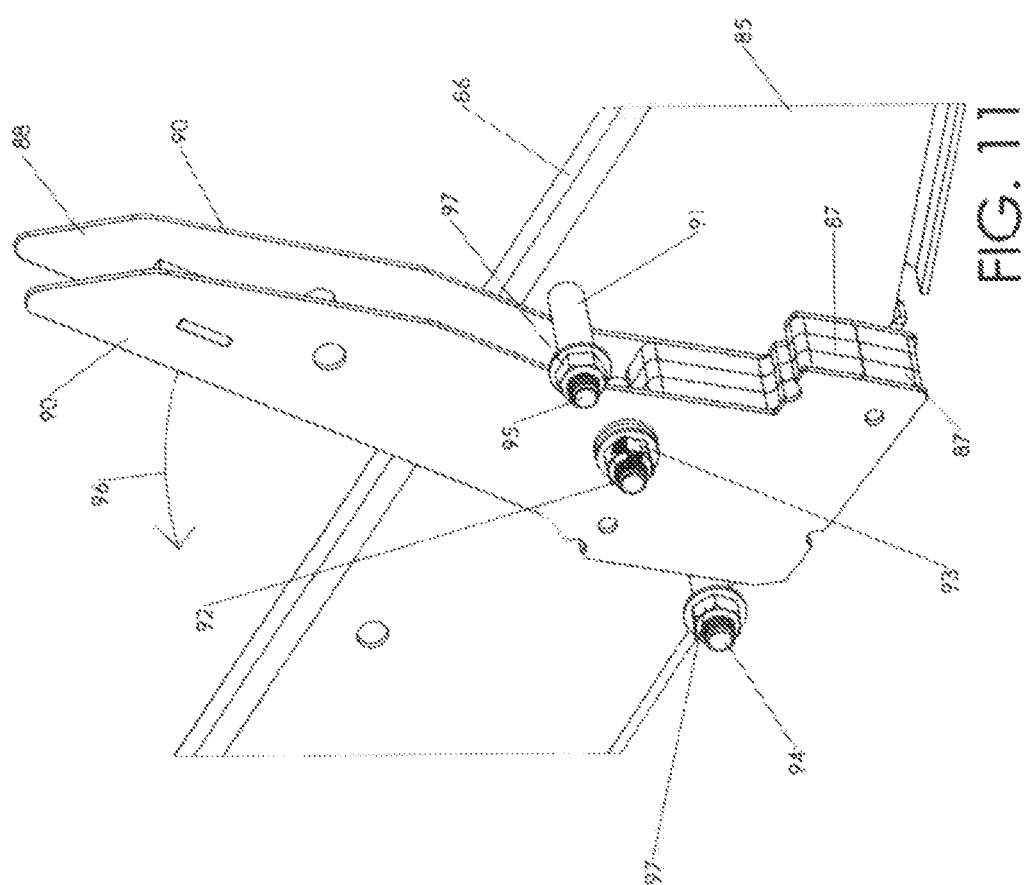

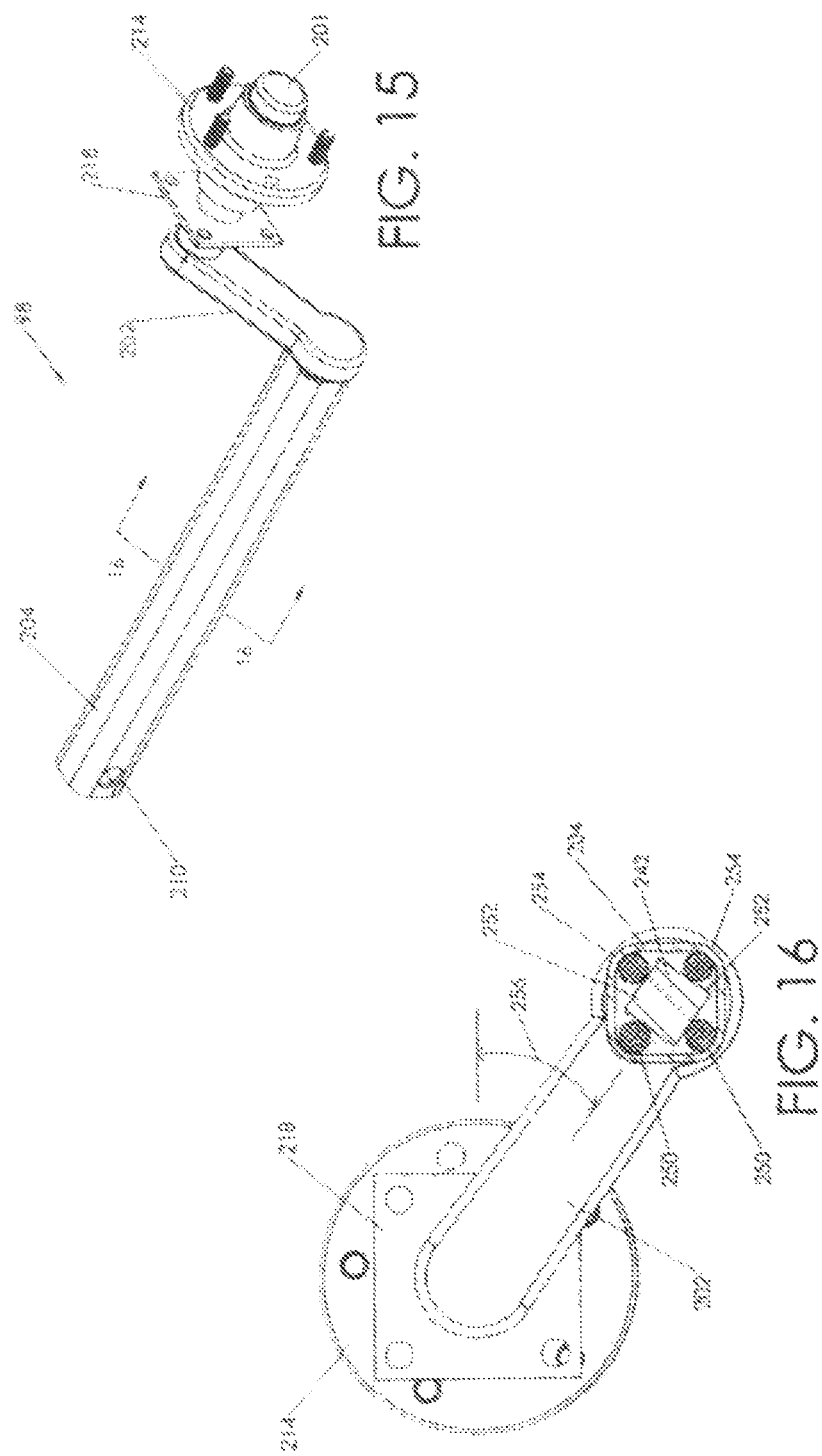

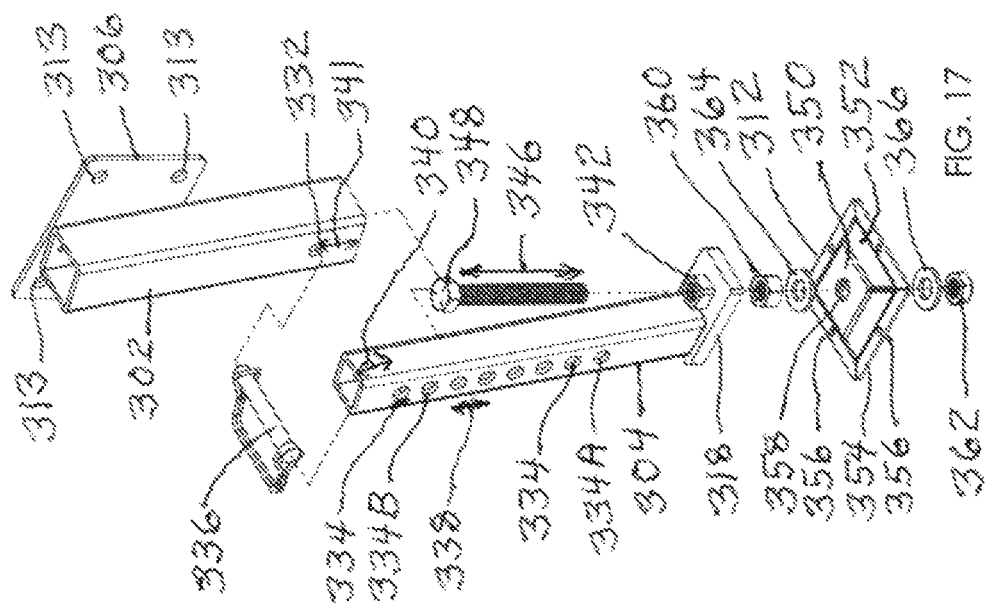

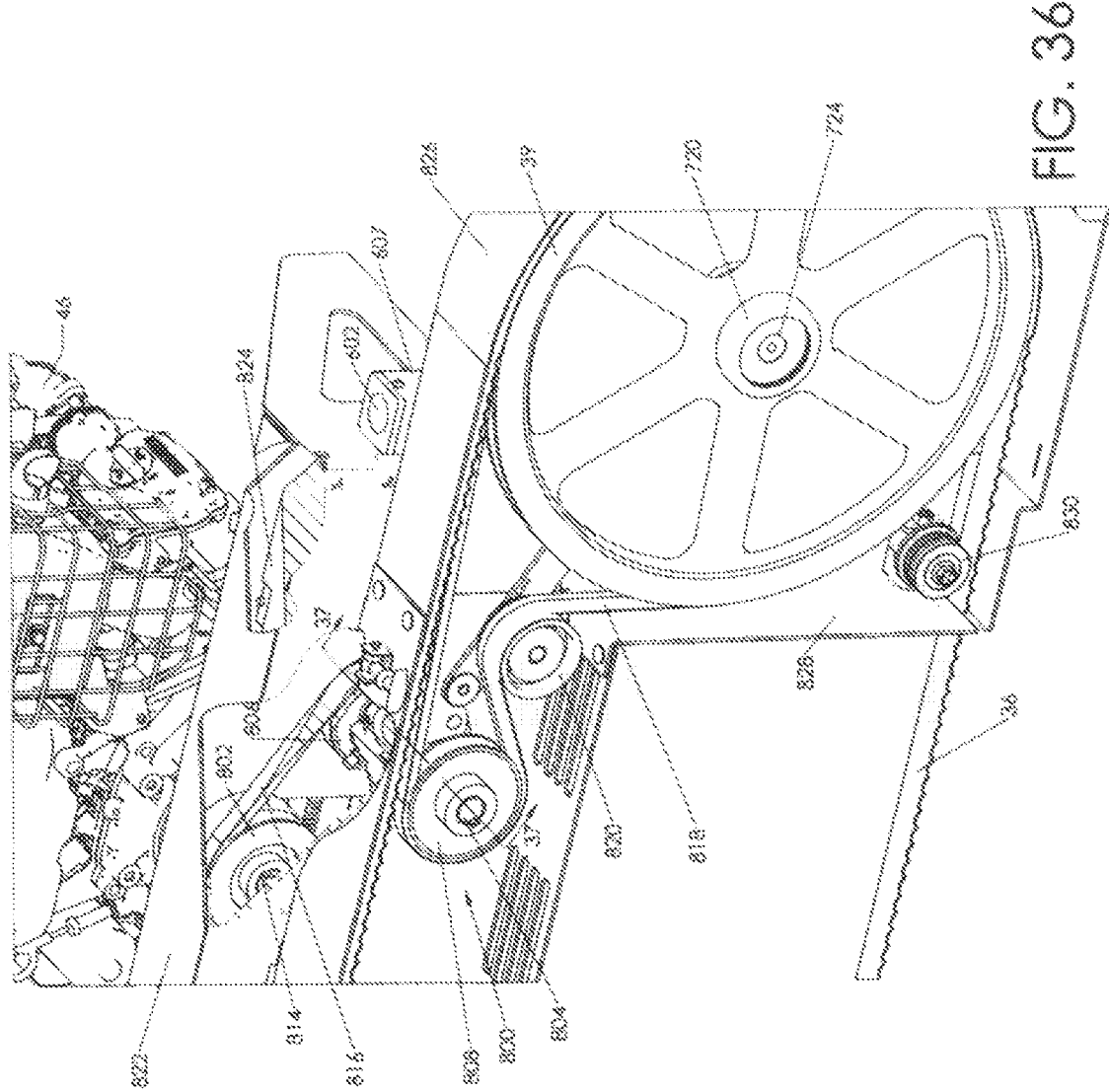

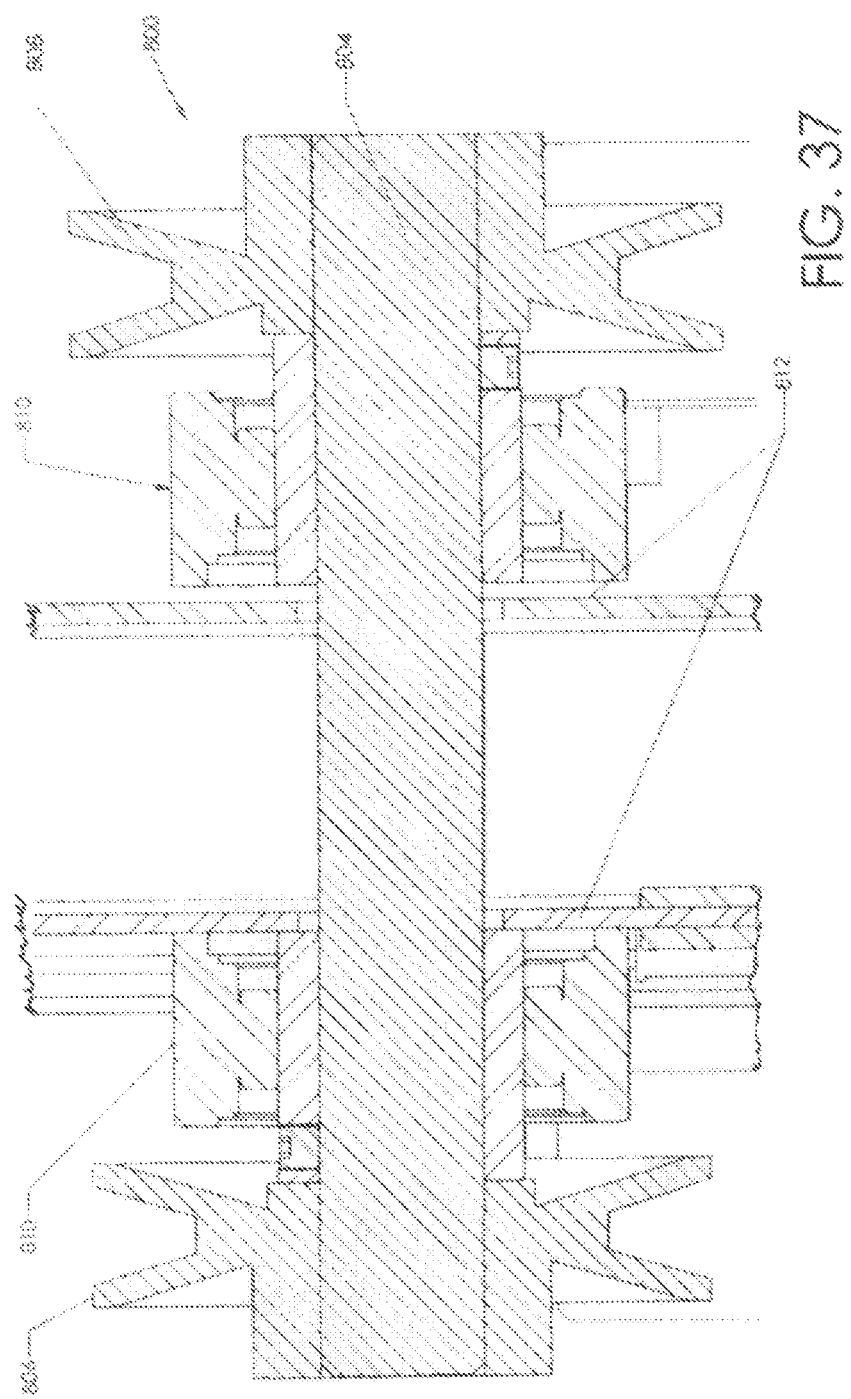

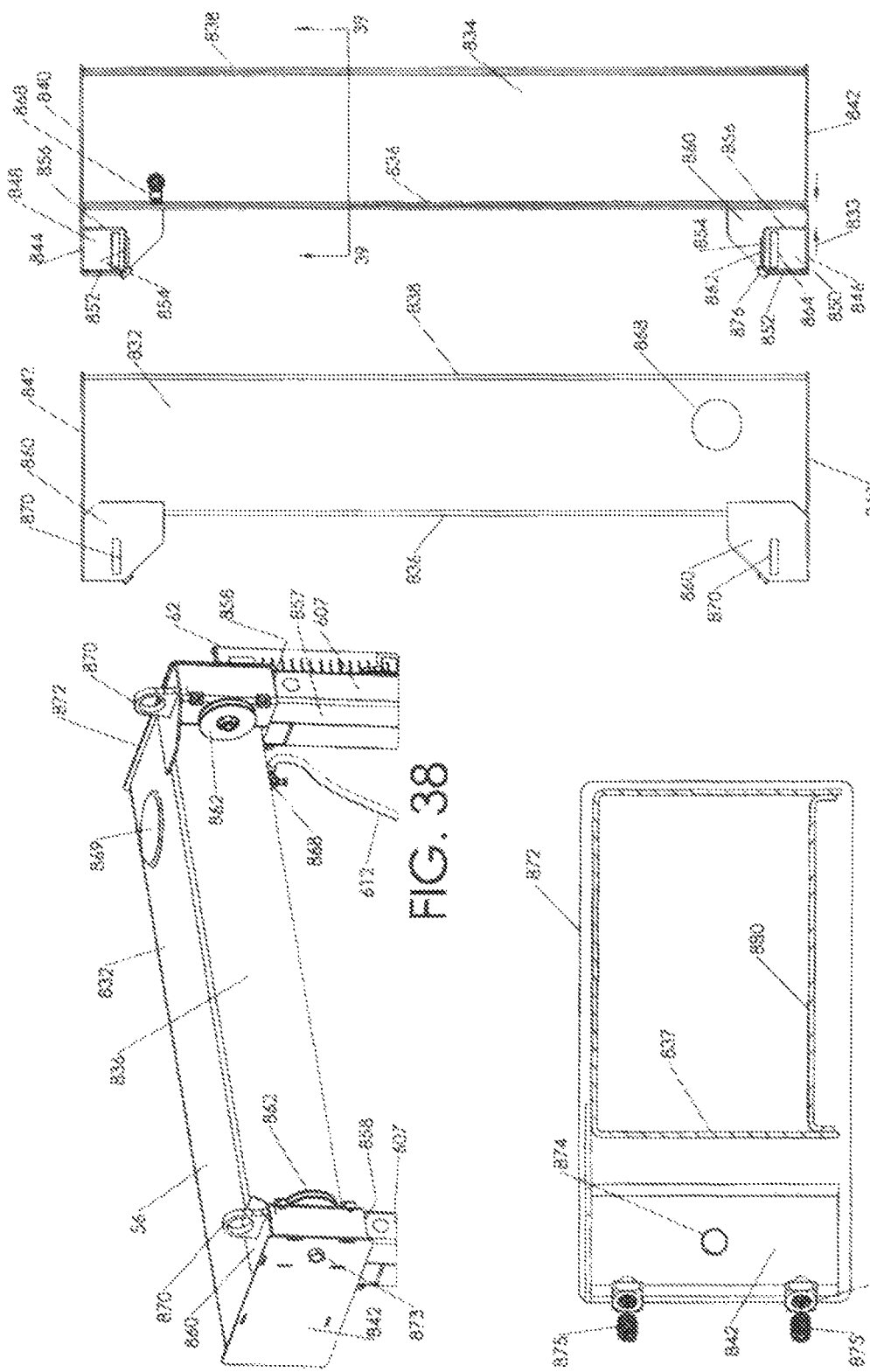

SAWMILL

The present invention relates generally to sawmills, including but not limited to portable sawmills which can be towed to a location for use.

An example of a sawmill is found in U.S. Pat. No. 8,276,493, which is incorporated herein by reference and which discloses a sawmill having a carriage movable along horizontal rails which are shown supported on a surface. The sawmill includes a base including a pair of elongate parallel rail supports upon which rails are placed and a plurality of longitudinally spaced cross members extending between the rail supports upon which logs are placed for sawing. The rail supports are supported on a plurality of legs. A carriage has wheel assemblies for movement of the carriage along the rails and carries a saw for cutting the logs as the carriage is moved along the rails. A friction winch and braking system is said to allow easy, one-handed raising and lowering of the sawmill head within the carriage. U.S. design Pat. D638040, which is also incorporated herein by reference, discloses a similar sawmill. It is considered desirable for the rails to be mounted more securely to the rail supports to avoid damage.

U.S. Pat. No. 6,038,954, which is incorporated herein by reference, discloses a portable sawmill in which logs are placed on a lower deck frame, and a bandsaw moves longitudinally of the frame by use of rollers movable along overhead tracks. The tracks are attached to lower support rails with spacers there between wherein the tracks are spaced vertically from the support rails by the spacers. A hydraulic motor driving a sprocket and chain turns threaded rods to raise and lower the cutting assembly. Attached to the frame is an axle and wheel assembly and a trailer hitch for transporting the sawmill for portable use. It is considered desirable for the tracks to be mounted more securely to the support rails to avoid damage.

Canadian patent application 3098025, which is incorporated herein by reference, discloses a portable sawmill having a bed, which has a main bed member and a carriage. The main bed member has a pair of substantially parallel rails, and the carriage is movably supported along the rails. The bed also includes an extension bed member pivotably attached to the main bed member with a combination bunk/hinge to allow an operator to fold the bed between an extended in use position, and a stowed position for transporting the sawmill to and from a work site with a tow vehicle. Means are disclosed for aligning the rails of the main and extension bed members. See also U.S. Pat. Nos. 2,687,309, 2,459,800, and 2,853,309 disclosing hinged bed extensions.

U.S. published patent application 2020/0353640, which is incorporated herein by reference, discloses a sawmill having a cutting fluid delivery controller. The saw blade thereof is driven by a motor. The speed of the motor is regulated by a throttle lever having an idle speed position and a cutting speed position. A Bowden cable is provided for use, upon movement of an operator-manipulated actuator, in simultaneously effecting movement of the throttle lever to the cutting speed position and opening of the valve to allow flow of the cutting fluid to the saw blade. The actuator is a lever arm which is actuated by being pushed to and held against a push bar by the operator's hand and is biased to return to the non-actuated position when released by the operator. The controller includes a fluid valve configured to automatically turn on a flow of cutting fluid to the saw blade when the throttle lever is set to the cutting speed position, and to automatically turn off the flow of the cutting fluid when the throttle lever is set to the idle speed position. The controller includes a cable which interconnects the fluid valve and the throttle lever to allow the operator to simultaneously control operation of the saw blade, and the flow of the cutting fluid to the saw blade, with a single operator manipulable actuator. More specifically, when the lever arm is engaged or actuated, the Bowden cable effects movement of the throttle lever to the cutting speed position. When struck by the throttle lever, as it is moved to the cutting speed position, an actuation tab is deflected toward the valve stem to open the valve for flow of the cutting fluid. Similar systems have been provided by others wherein the valve is a ball-type valve. Canadian patent/applications 3079275 and 3041479 are claimed as priority thereto and are therefore believed to be cumulative thereto.

The simultaneous effective actuation of various devices upon actuation of the throttle may desirably require different pull lengths of Bowden or other pull cables or otherwise tailored inputs to other devices. Undesirably, the above U.S. published patent application 2020/0353640 does not allow such different pull lengths or other tailored inputs to other devices.

Examples of other sawmills are found in U.S. Pat. Nos. 4,275,632; 7,444,912; 7,784,387; 8,215,216; 8,479,628; and 8,573,106, and in U.S. published applications 2014/0174603, 2018/0345524, 20190084177, 2019/0084178, and 2021/0008751, and in Canadian patents 3,019,727; 3,037,514; 3,052,360; 3,079,275; and 3,041,479, and in Canadian industrial design patents 187,369; 191,489; and 191,490, all of which are incorporated herein by reference.

U.S. published application 2011/0133433, which is incorporated herein by reference, discloses an apparatus which can be configured to be a trailer and a shed. It includes a tow arm and an axle having a pair of wheels. The axle is pivotably connected to the trailer frame, wherein the axle pivots into a down position to provide the trailer with an extended axle and wheels for towing, and the axle pivots into an up position to provide the trailer with a planar base with a retracted axle and wheels (wheels retracted into wheel wells) for use as a shed. As seen in FIG. 9 thereof, the axle is attached to the frame with pins 80, and it may be rotated, as aided by handles 103, dependent upon positioning of the tow bar, between the extended and retracted positions, as more fully disclosed in paragraphs 0039 and 0040 thereof. Note that axle is seen in FIG. 9 to have a central portion and, for each wheel, a portion which extends at one end from an end thereof and is normal thereto and extends to another end to which the wheel is rotatably attached. The same or substantially similar apparatus is disclosed in U.S. published application 2007/0126209, which is also incorporated herein by reference.

Canadian patent application 3052360, which is incorporated herein by reference, discloses an apparatus for adjustable, lateral spacing of wheels of a load carrying vehicle. The apparatus includes an axle assembly, and an axle holder configured to attach the axle assembly to the vehicle. The axle assembly has a first elongate axle member, and a second elongate axle member. At least a portion of the first elongate axle member defines a sleeve having a hollow sized and shaped to slidably receive at least a portion of the second elongate axle member, between a retracted position and an extended position. The free ends of the first and second axle members are configured to attach the wheels. Sliding the second elongate axle member between the retracted position and the extended position allows adjustment of the lateral spacing of the wheels, between a smallest lateral spacing and a largest lateral spacing.

U.S. published application 2005/0184485, which is also incorporated herein by reference, discloses a folding trailer with kneeling device which effects movement of tires from an extended position for towing into a retracted position wherein the trailer deck is lowered for ease of loading and unloading and for storage. A control shaft extends across the deck and is hingedly connected to the trailer frame. A pair of arms are cantilevered and extend from and normal to the ends respectively of the control shaft. An hydraulic cylinder or other device is used to effect rotation of the control shaft between the extended position for towing and the retracted position for loading, unloading, and storage. With the kneeling device in kneeling position with the wheels retracted, for storage, the aft section of the trailer is folded onto the forward section (which is hingedly attached thereto), and is shown in an upright storage position in FIG. 11. Although the trailer in the kneeling position is shown in FIG. 9 with one wheel removed for clarity of illustration, it is further stated (see paragraph 0054) that it is not necessary for the decking and the right wheel and tire to be removed to position the trailer in the kneeling position.

U.S. Pat. No. 3,979,133, which is also incorporated herein by reference, discloses a foldable trailer formed of a pair of side frame members pivoted at their forward ends for movement in the directions toward and away from each other between folded and unfolded positions respectively. To allow such folding, the wheel supporting axle is built so that it may be collapsed. As best seen in FIG. 5 and discussed in the first full paragraph of col. 4 thereof, the axle is divided into a pair of outer sections in the form of stub shafts each fixed at its mid-portion to a side channel member via a supporting spring assembly. The axle is also divided into a pair of inner sections the outer ends of which are pivotably secured to the inner ends of the stub shafts respectively. The inner ends thereof are pivotably interconnected to enable the inner sections to be rotated forwardly relative to the respective stub shafts until the inner sections are in substantial parallel side-by-side relation to bring the inner ends of the stub shafts in end-to-end relation when in the collapsed position.

U.S. published application 2007/0246911, which is also incorporated herein by reference, discloses a collapsible boat trailer, which includes a longitudinal member with a hitch for hitching to a towing vehicle and a pair of transverse members to the lower of which are attached wheels. The wheels are associated with stub axles which are insertable into the ends of the lower transverse member. Each stub axle and the lower transverse member are provided with a hole or slot through which a pin can be passed to releasably attach the stub axles to the lower transverse member (see paragraph 0044 thereof). When adapting the trailer from the use condition to the collapsed condition, the pins holding the stub shafts in position in the lower transverse member are removed allowing the wheels and mud guards to be removed. Bracing rods are then removed, and the transverse members may be moved to be substantially parallel to the longitudinal member. As seen in FIG. 3, the longitudinal member is collapsed into individual pieces, whereby it is substantially smaller than when in the use position.

U.S. Pat. No. 2,497,072, which is also incorporated herein by reference, discloses a torsion spring wheel suspension (see especially col. 4, lines 10 to 35, thereof).

U.S. patent application publication 2016/0264031, which is also incorporated herein by reference, discloses a torsion axle on a vehicle (see especially paragraph 0025 thereof).

U.S. patent application publication 2018/0297501, which is also incorporated herein by reference, discloses a torsion axle for a trailer (see especially paragraph 0008 thereof).

U.S. patent application publication 2005/0146125, which is also incorporated herein by reference, discloses what is referred to as a split axle for a camping trailer (see especially paragraph 0018 thereof). See also especially FIG. 10 and col. 4, lines 35 to 55, of U.S. Pat. No. 4,126,324, which is also incorporated herein by reference.

U.S. Pat. No. 6,428,035, which is also incorporated herein by reference, discloses a three-part axle structure whereby a longer distance between the wheels can be achieved (see especially col. 3, lines 21 to 31, thereof).

U.S. Pat. No. 5,692,779, which is also incorporated herein by reference, discloses a trailer with easy change axles and removable wheels.

U.S. Pat. No. 5,464,243, which is also incorporated herein by reference, discloses an adjustable axle in the form of a telescoping structure.

U.S. Pat. No. 5,326,128, which is also incorporated herein by reference, discloses a length adjustable axle for trailers of various widths which is achieved by telescopingly adjusting torsion spring subassemblies within a center axle tube (see especially col. 3, lines 21 to 52, thereof).

U.S. Pat. No. 4,807,894, which is also incorporated herein by reference, discloses a trailer frame which is included within a structure and which allows the frame of the structure to be converted into a mobile trailer on detachable wheel assemblies and includes a torsion suspension assembly (see especially col. 6, lines 18 to 40, thereof).

Other art which may be of interest, and all of which are also incorporated herein by reference, includes U.S. Pat. Nos. 2,905,481; 4,058,325; 4,165,096; 4,480,851; 5,137,297; 5,161,814; 5,743,541; 6,857,643; 6,923,452; 7,055,848; 7,073,816; 7,163,212; 7,243,979; 7,360,784; 7,401,804; 8,727,360, and 10,434,677, and in U.S. published applications 2004/0004333, 2005/0067799, 2009/0224512, and 2016/0346852, and in Great Britain patent documents 2,267,468 and 2,401,586, and in WO 2004/069589.

Low profile snowmobile trailers have been provided with torsion axles. Such an axle has a swing arm integral with a square in cross section torsion bar which is received in a square in cross section tube. Urethane tubes are received between the sides of the torsion bar and apexes of the square tube respectively which are compressed during shocks to provide torsion spring load and return to their normal orientation after a shock is over due to force exerted by the compressed urethane tubes.

It is an object of the present invention to provide an improved sawmill wherein the base can be easily shortened for easy storage.

It is another object of the present invention to provide an improved portable sawmill wherein the wheels may be easily removed so that they do not interfere with use of the sawmill.

It is a further object of the present invention to provide an improved sawmill wherein the rails are more securely attached to rail support structures to avoid damage.

With reference to the herein disclosed embodiments, merely for the purposes of illustration and not by way of limitation, in accordance with certain aspects/embodiments of the present invention and in order to achieve one or more of the above objects, a portable sawmill is provided wherein base supporting legs are height-adjustable to raise the base to an height such that the tires are raised above the ground so that the wheels may be removed, whereby the sawmill may be towed from one location to another and whereby the wheels may be removed so that they do not interfere with use of the sawmill.

With reference to the herein disclosed embodiments, merely for the purposes of illustration and not by way of limitation, in accordance with certain aspects/embodiments of the present invention and in order to achieve one or more of the above objects, a sawmill is provided wherein the base includes a central base portion and at least one base portion hingedly attached to the central base portion at either or both ends of the central base portion in a manner as to lie atop the central base portion.

With reference to the herein disclosed embodiments, merely for the purposes of illustration and not by way of limitation, in accordance with certain aspects/embodiments of the present invention and in order to achieve one or more of the above objects, a sawmill is provided wherein each rail is rigidly attached side-by-side (or laminated) to a respective rail support structure.

The above and other objects, features, and advantages of the present invention will be apparent from the following detailed description of the preferred embodiment(s) thereof when read in conjunction with the appended drawings wherein the same reference numerals denote the same or similar parts throughout the several views.

BRIEF DESCRIPTION OF THE DRAWINGS

FIG. 8 is an exploded view of the means one of the hinges for hinged attachment of the front extension of the sawmill of FIGS. 1 to 3 as well as a pair of spacers between one of the rails and a respective supporting channel member.

FIG. 9 is a close-up perspective view of the hinged attachment as well as one of the spacers.

FIG. 10 is a side view of the hinged attachment as well as the spacer.

FIG. 11 is a perspective view of one of the catches in a ramp for either of the sawmills, a portion of one side or rail of the ramp shown, the other not shown for purposes of clarity.

FIG. 15 is a close-up perspective view of an axle of the axle assembly.

FIG. 16 is a section view taken along lines 16-16 of FIG. 15.

FIG. 17 is an exploded view of one of the legs of either of the sawmills.

FIG. 36 is a detail perspective view of a pulley arrangement for operating the bandwheels of the sawmill.

FIG. 37 is a sectional view of the pulley arrangement, taken along lines 37-37 of FIG. 36.

FIG. 38 is a perspective view of a water tank and its attachment to the guide tubes.

FIG. 39 is a sectional view of the water tank taken along lines 39-39 of FIG. 41.

FIG. 40 is a plan view of the water tank.

FIG. 41 is a view looking upwardly at the water tank.

DETAILED DESCRIPTION OF THE PREFERRED EMBODIMENTS

Figure 1:
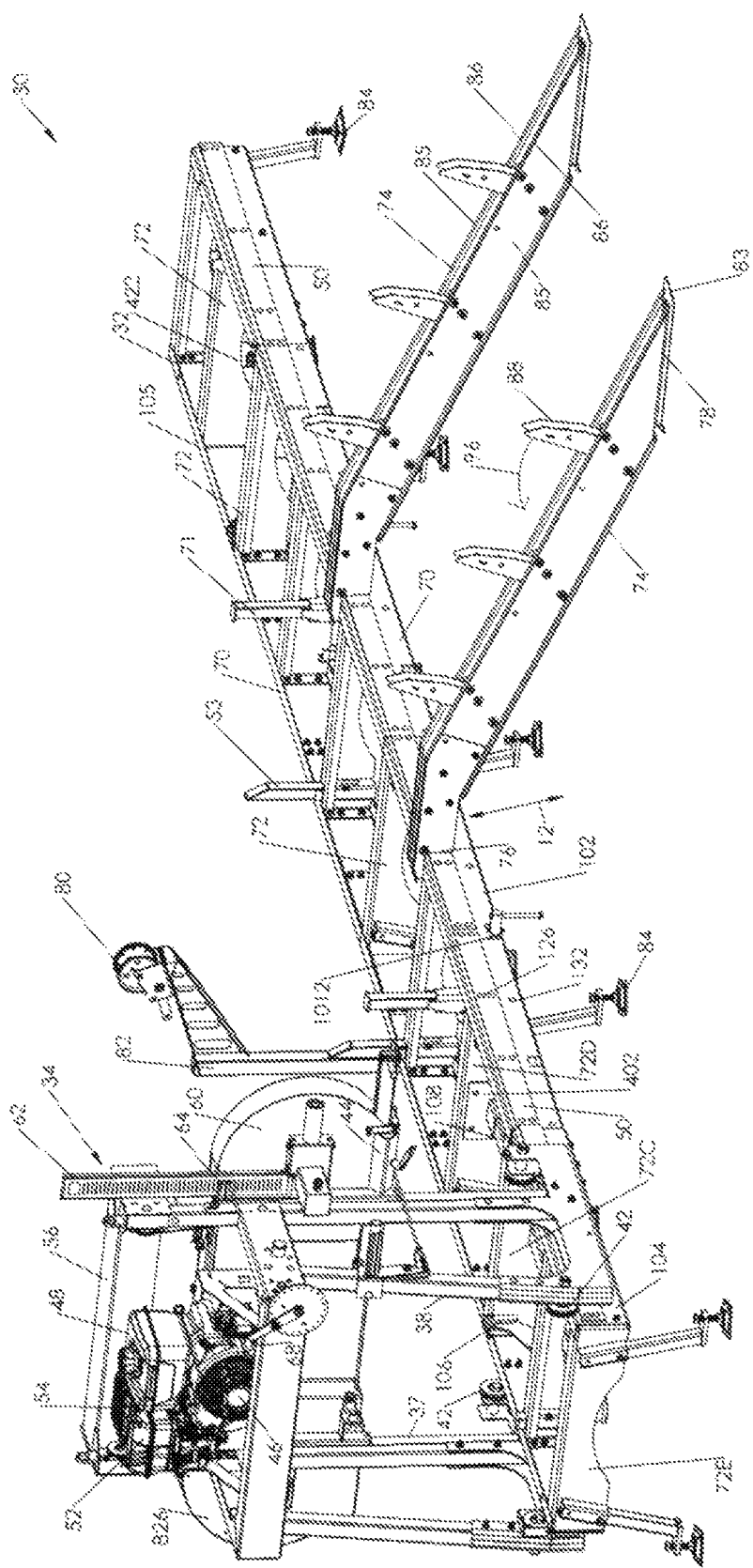
FIG. 1 is a perspective view of a sawmill, including a base and a carriage for a saw blade movable along the base, which embodies the present invention, which base has an end extension at each end, and set up with the end extensions unfolded for the sawing of logs.
Figure 2:
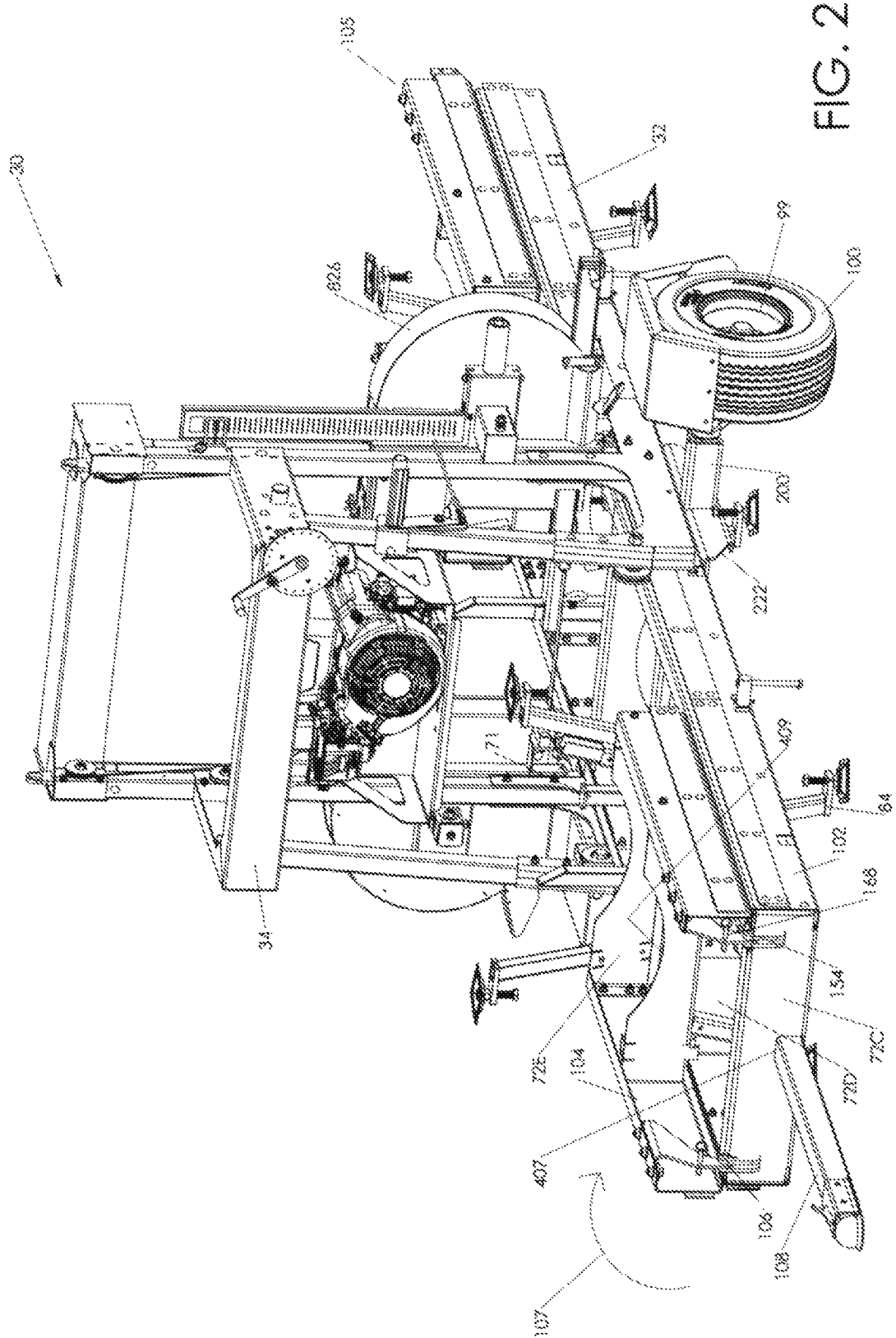
FIG. 2 is a perspective view thereof set up with wheels attached for towing, and with the end extensions folded over onto the central portion of the base, and with the saw head at a lowered position.
Figure 3:
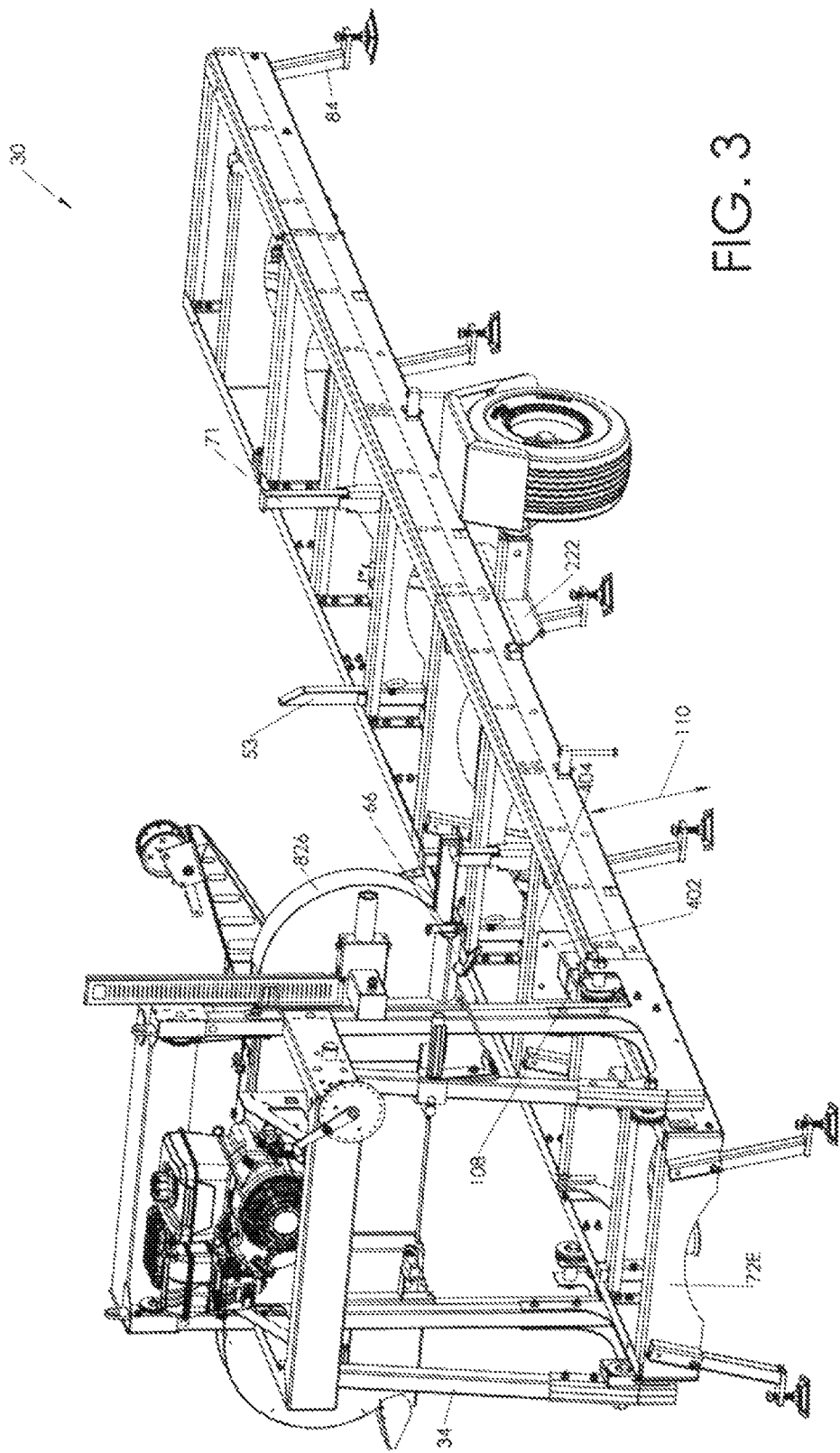
FIG. 3 is a perspective view thereof raised to a height to allow the wheels to be mounted for towing or removed for the sawing of wood.

Referring to FIGS. 1 to 3, there is shown generally at 30 a sawmill which includes an elongate base 32 upon which logs are placed for cutting and a carriage 34 which is movable along the length of the base 32 and which carries a saw head 60 which supports a saw 36 (FIG. 36) in the form of a blade for cutting the logs for providing lumber. The saw blade is driven by a pair of band wheels 39 which are received within cover 826 of saw head 60.

Unless otherwise stated or apparent, the sawmill parts are made of steel or other suitable material and are laser cut (discussed hereinafter) and bolted or otherwise similarly fastened together. This allows easier and less expensive shipment as a kit so the customers can easily assemble them. While the bolts or apertures for receiving bolts are clearly shown in the drawings, they do not all carry reference numerals, and, when they do, they will be the same reference numeral 40, unless a different reference numeral is provided for a particular bolt or bolts or apertures therefor. Unless otherwise specified or apparent, it should be understood that all parts are suitably bolted together (or similarly fastened together so that customers can easily assemble them).

The carriage 34 has a frame 37 including four legs 38 having wheels or rollers 42 on their lower end portions which engage rails 50 on the base 32 for moving of the carriage along the base 32 for cutting logs. The carriage 34 is pushed along the rails 50 with push bar 44. Shown at 46 is an engine for the saw blade 36, supplied by a gas tank 48, an air cleaner 52, and a muffler 54. A water tank 56 supplies water to keep the saw blade 36 lubricated. A blade guide cover is shown at 66 (FIG. 3).

Figure 21:
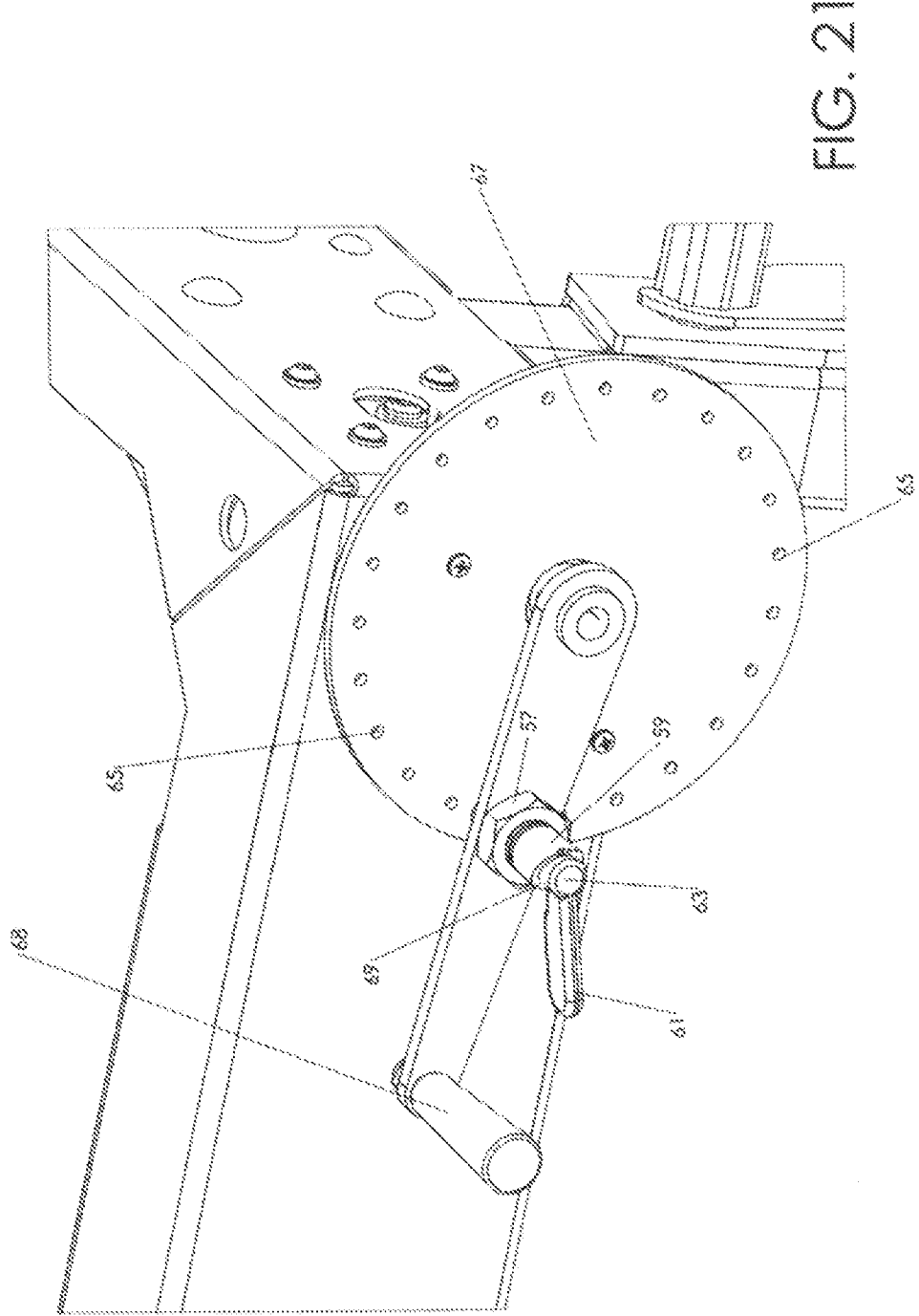
FIG. 21 is a perspective view illustrating an indexing plate for incrementally adjusting height of the saw blade.

A ruler 62 with an height indicator 64 serves to indicate the height of the saw blade 36 as it is raised or lowered by turning crank handle 68 (FIG. 21) clockwise or counterclockwise. The crank handle 68 is not direct drive, i.e., its input is redistributed through a ratioed gear box (not shown) and a series of pulleys (not shown) to suitably space and quantify the indexing holes 65 in accordance with principles commonly known to those of ordinary skill in the art to which this invention pertains. For example, four turns of the crank handle 68 may raise or lower the saw blade by approximately one inch. The indexing plate 67 has (unlike as shown), for example, 16 holes or apertures 65 equally spaced about its circumference thereby providing approximately 1/64 inch increments of raising or lowering height of the saw blade 36. To raise or lower the saw blade 36, a cam pin 63 (or other suitable locking mechanism such as a stainless steel plunger ball) is released from its indexed aperture 65 by rotating handle 61 through, for example, 180 degrees along cam surface 69 on cylindrical member 59 which is threadedly attached to nut 57 which is in turn welded or otherwise suitably attached to the crank handle 68, thereby raising the cam pin 63 (which is received in the cylindrical member 59, nut 57, an aperture, not shown, in the handle 68, and receivable in each of the indexing apertures 65) out of the respective indexing aperture 65. The handle 68 is now free to be turned to raise or lower the saw blade 36. When the saw blade is raised or lowered to its desired position, it is locked in that position by rotating the handle 61 along the cam surface 69 thereby pushing the cam pin 63 into the respective indexing aperture 65.

Figure 23:
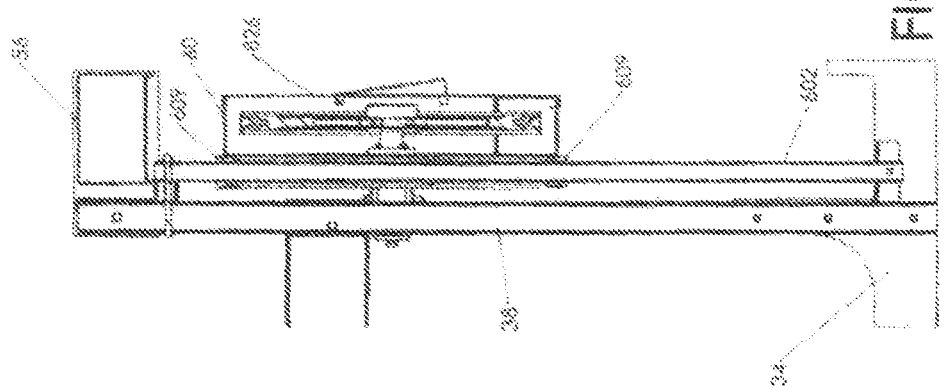
FIG. 23 is a side view of one of the guide tubes.
Figure 22:
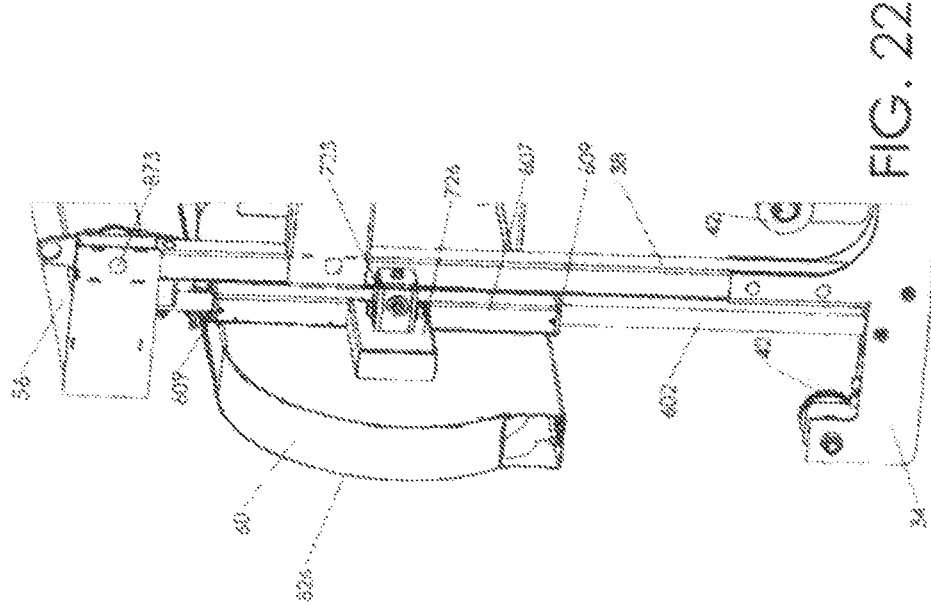
FIG. 22 is a perspective view of one of two guide tubes and one of two guide rails received therein that secure the saw head to the carriage.
Figure 24:
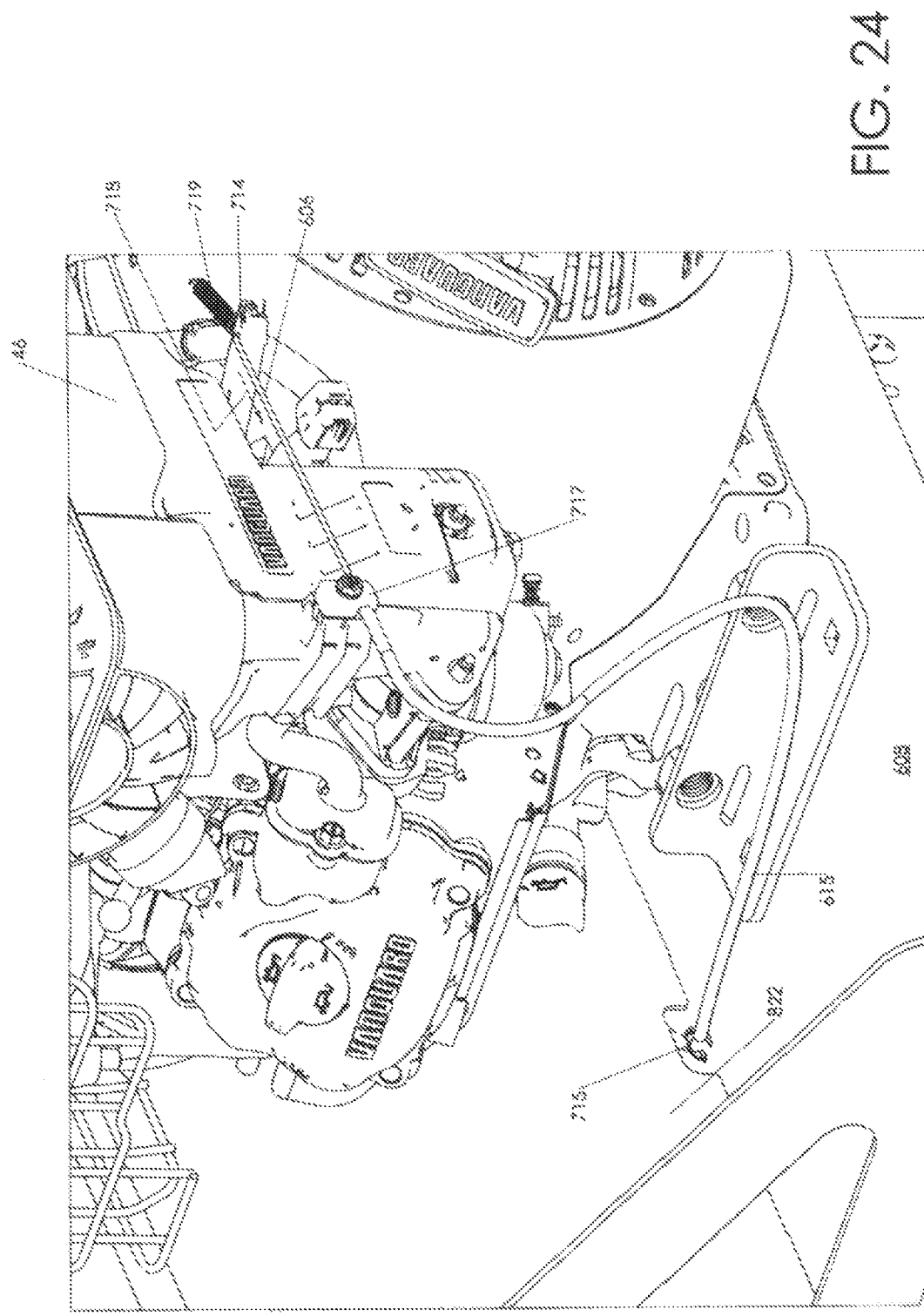
FIG. 24 is a detail perspective view of engine throttle control structure for the sawmill.
Figure 30:
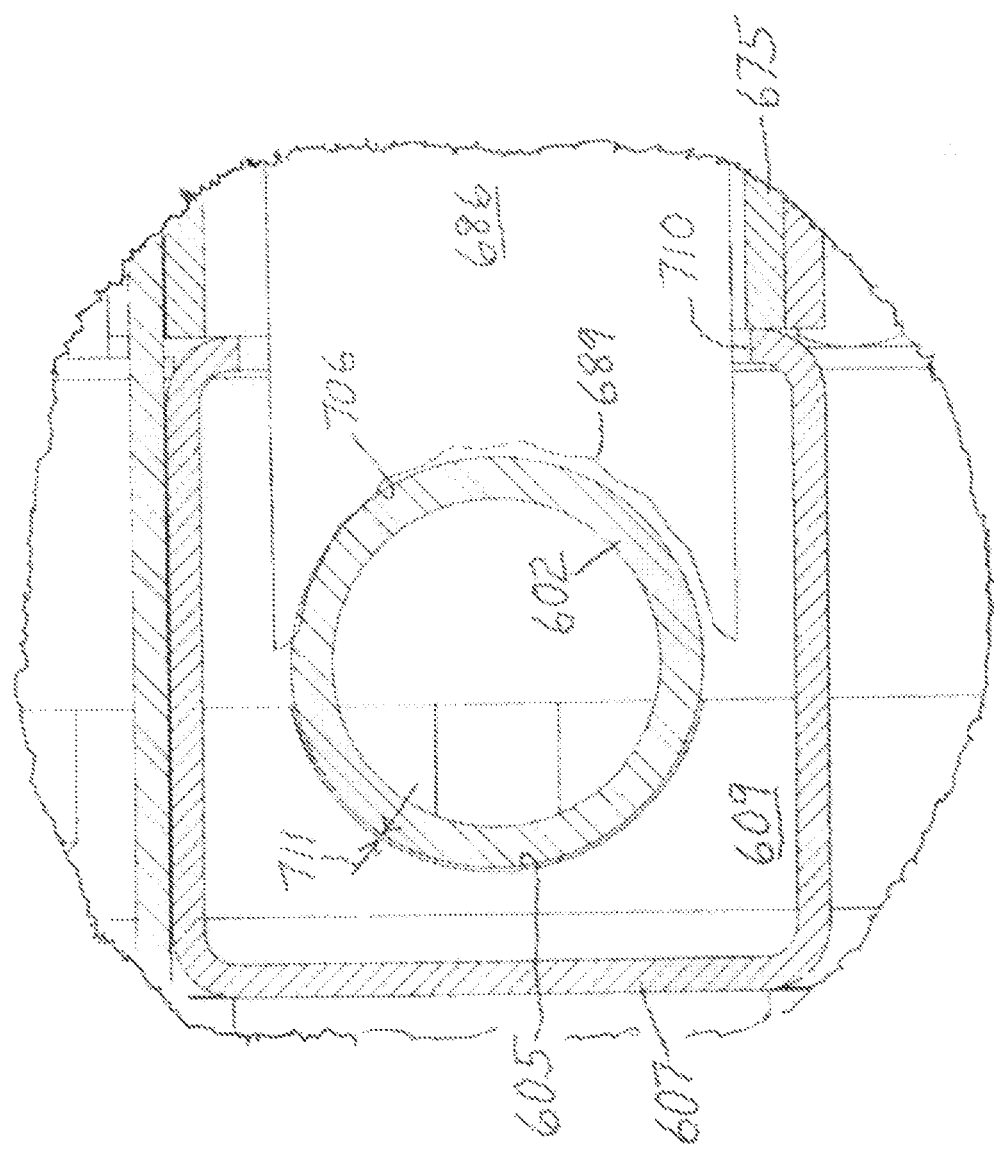
FIG. 30 is a upper view of one of the guide tubes with the associated guide rail in section, showing the guide rail engaged by a brake arm.
Figure 33:
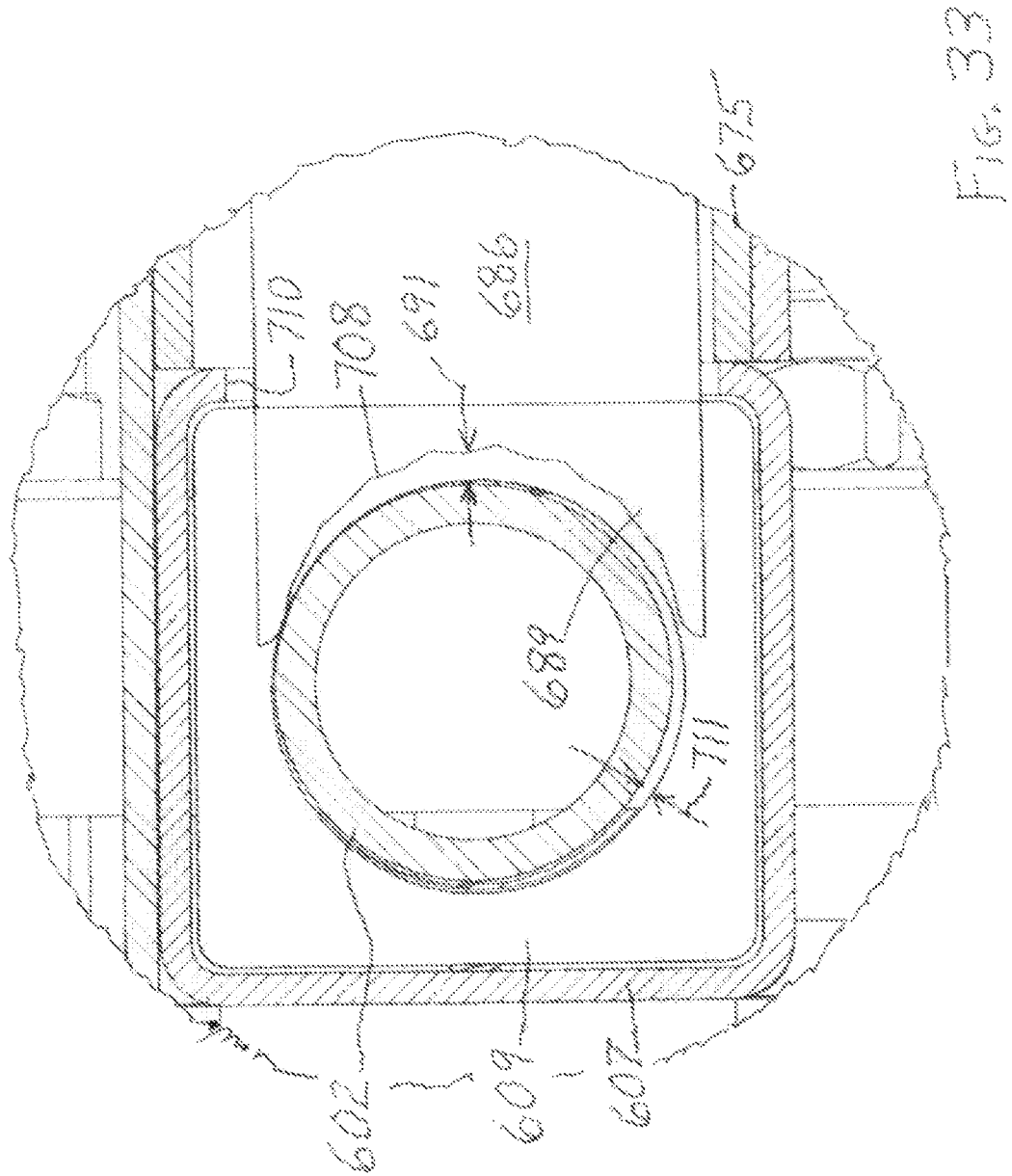
FIG. 33 is a view similar to that of FIG. 30, showing the brake arm disengaged from the guide rail.
Figure 34:
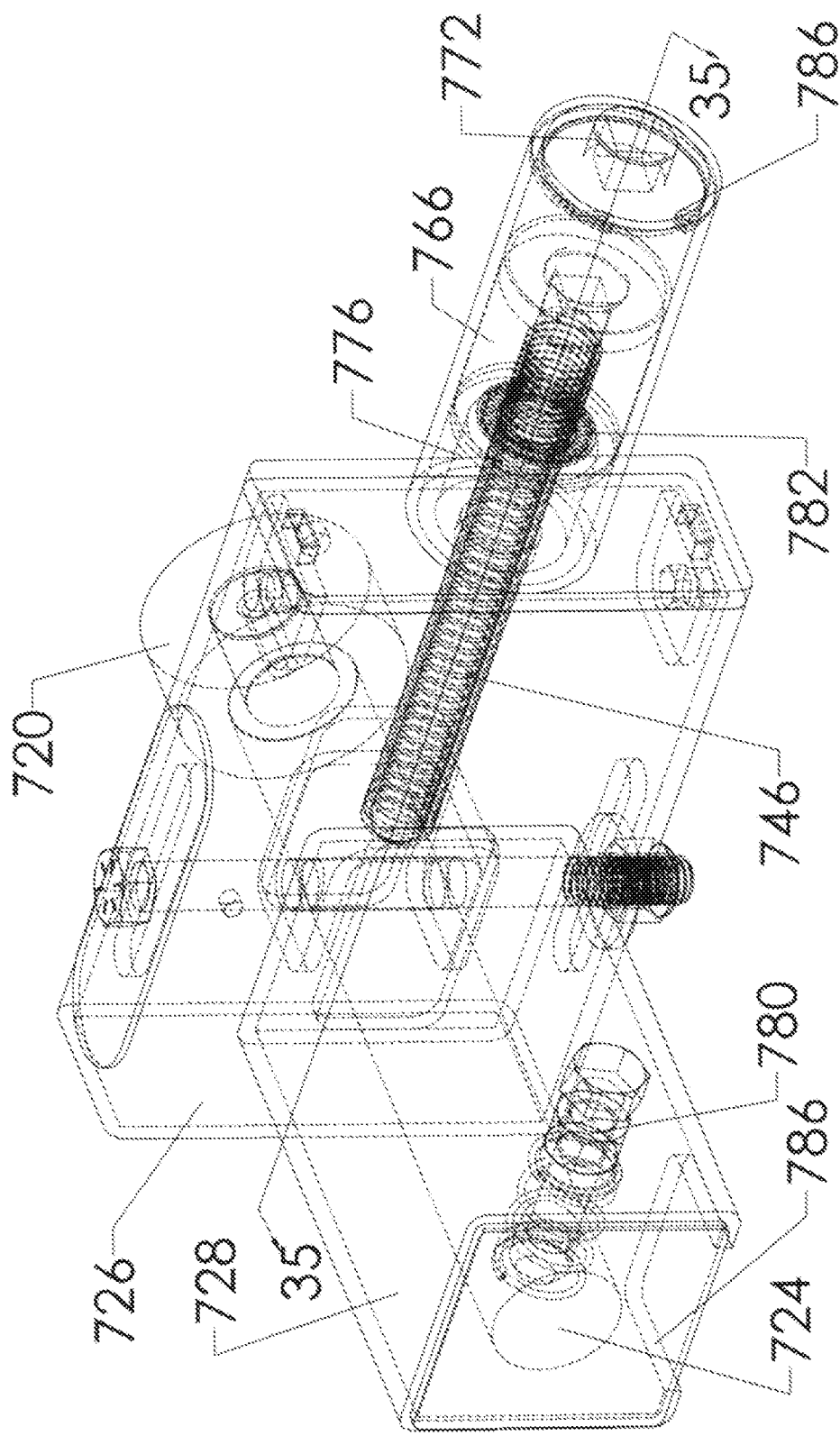
FIG. 34 is a perspective view of a tensioner for the saw blade for the sawmill.

As best seen in FIGS. 22 and 23, the saw head 60 is suitably attached to a pair of housings or guide rail tubes 607 on opposite sides respectively. Since the attachments are identical on both sides, only one is seen in FIG. 22 and discussed herein. The guide rail tube 607 encases an elongate guide rail block 609 which is composed of a suitable polymer material having a central bore 605, as seen in FIGS. 30 and 33. A stationary vertical cylindrical guide rail 602 is received within the bore 605 so that the guide rail tube 607 glides vertically along guide rail 602.

Except as otherwise described herein, the carriage 34 may be similar to, for example, the carriage shown in the aforesaid U.S. Pat. No. 8,276,493, which is incorporated herein by reference.

The elongate base 32 includes a pair of elongate parallel support structures 70 to which the parallel rails 50 are respectively rigidly attached, as discussed in greater detail hereinafter. The base 32 also includes a plurality of longitudinally spaced plates or beams or channel members 72 interconnecting, as discussed in greater detail hereinafter, the rail support structures 70 and providing structural support to the base and the parallel rails 50. Such support structures usually also serve as bunks for supporting logs between the rails 50 so that they may be cut by the saw blade as the carriage is pushed or otherwise moved along the rails. A bunk is defined herein and in the claims as a structural member on a sawmill which supports a log for cutting thereof by the saw blade. While these structures 72, both on the base 32 and on the extension members 104 and 105 hereinafter discussed, may be referred to herein as bunks, for supporting logs, it should be understood that not all of such support structures 72 need support a log and that only a sufficient number of these support structures 72 need provide log support to adequately support a log for sawing. For example, an individual support structure 72 may be provided with a lesser height than the other support structures 72 thereby rendering it incapable of providing log support. For another example, some of such support structures 72 may be provided close enough to an end of the sawmill that they would not normally be positioned to support a log, for example, where the carriage may be located at the initiation of a cutting pass. Thus, while there should be a sufficient number of support structures 72 serving as log-supporting bunks to achieve sufficient log support for a cutting pass, one or more of such support structures 72, while serving to provide the desired structural integrity, may not necessarily serve as log-supporting bunks. Thus, these support structures 72 as a group are referred to herein as bunks, even though an individual support structure 72 may not be able to support a log or may be positioned (such as under the carriage at the beginning of a cutting pass) so that it would not normally support a log. The spacing between the bunks 72 allows saw dust to fall to the ground to maintain cleanliness of the base 32. The base 32 is supported by a plurality of legs 84 spaced along each of the rail support structures 70, as discussed in greater detail hereinafter.

Throughout the cutting process, it is necessary to reposition the log/log cant to achieve the desirable piece of wood (i.e., planks, studs, slabs, beams, etc.), and it is of course necessary to hold the log firmly during cutting. At 71 is shown a portion of a log clamping mechanism for that purpose, and the log/log cant clamping mechanism is shown and described hereinafter with respect to FIGS. 46 to 50.

FIG. 1 shows the sawmill 30 set up for the cutting of logs. A pair of log loading ramps 74 have end portions with notches, illustrated at 76, to receive a corner of and to lie atop the respective rail support structure 70, providing a path for movement of logs from the ramps 74 directly onto the bunks 72. The ramps 74 have sloping ground-engaging other end portions 78. The rails 50 are preferably even with or more preferably, as shown, below the height of the support structures 70 to prevent damage to the rails 50 by the ramps 74.

Logs are winched up the ramps 74 by the use of a conventional winch 80 supported by a suitably removable support 82 which is spaced outwardly from the respective rail 50 and which is suitably attachable to the respective rail support structure 70 such as by a tubular arm (not shown) which extends under both of the rail support structures 70 and suitably securely bolted thereto. Thus, the winch 80 and support 82 may remain in place during sawing operations but is suitably removable for transport of the sawmill 30 or if otherwise necessary or desirable when not loading a log.

For loading a log, the ramps 74 are suitably placed (on the opposite side of the base 32 from where the winch 80 is located) so that the notches 76 suitably engage one of the rail support structures 70 with a portion of each ramp 74 overlying the respective rail support structure 70. The log is winched up the pair of ramps 74 and onto the bunks 72 with the winch 80, which is located on the opposite side of the base 32 as the ramps 74 are located. The ramps 74 are then lifted off the support structures 70 and placed away from the walking path of the saw carriage during cutting so that the carriage 34 may traverse along the rails 50 for cutting of the loaded log.

Each ramp 74 is composed of a pair of spaced plates 85. A bend on each plate forms a rail 86. The plates 85 are suitably securely tied together by tubular spacers 91 (FIG. 11) of which bolts 94 and 95 pass there through and through the pair of plates 85 and tightened with nuts 97.

A plurality of safety catches 88 are spaced along the length of each ramp 74 to prevent a log from rolling backwards after it has passed a catch 88. Referring to FIG. 11, each catch 88 includes a pair of plates 90 with a plurality of, for example, three ¼ inch plates 87 suitably laminated thereto (between the plates 90) and to each other (such as by tack welding), the plates 87 being generally within the lower end portion of the catch 88 to define a low center of mass, illustrated at 93 (discussed hereinafter). The lower end portion of each catch 88 is received between the ramp plates 85 (one shown in FIG. 11 for ease of illustration) and suitably bolted thereto such as by pivot bolt 92 and nut 93 so that the catch 88 is rotatable thereabout. The pivot bolt 92 is located above the center of mass a suitable distance of, for example, 0.91 inch and the lower portion of the catch 88 is suitably weighted by the laminated plates 87 so that the catch 88 suitably returns to its upright position shown in the drawings when rotated from the upright position during passage of a log. The shape and weight distribution of the catch 88 to define the location of the center of mass can be determined using principles commonly known to those of ordinary skill in the art to which the present invention pertains. The forward (towards up the ramp) lower bolt 94 and the rearward upper bolt 95 act as pivot stops or obstacles to prevent the catch 88 from rotating backwards from its upright position shown in FIG. 1. Thus, when a log is winched up the ramps 74, the catches 88 in turn rotate forward, as illustrated at 96, to generally lie between the ramp plates 85 to allow the log to pass over them and further up the ramp 74. After the log passes, the catches 88 under gravity rotate back to the upright position to safely catch the log (with the stops 91 and 94 preventing backward movement of the catches 88) should it uncontrollably fall backwards.

Referring to FIG. 2, there is shown the sawmill 30 set up for towing. It includes wheels 99 with tires 100 mounted thereto respectively and an axle assembly, illustrated generally at 200 in FIGS. 12 to 16. The axle assembly 200 comprises a pair of axles 98 for the wheels 99 respectively, one axle 98 for each wheel 99 (which may be called a split axle). As will be discussed in greater detail hereinafter, each of the axles 98 with its respective wheel 99 is removable as a unit and re-attachable as a unit and are shown to have been removed in FIG. 1 so they are not in the way as the carriage 34 is pushed along the rails 50 by a worker pushing on the push bar 44.

The base 32 for the sawmill of FIGS. 1 to 3 is of a foldable type which allows its length to be reduced for towing and for storage in a garage or the like. For the purpose of this specification and the claims, the term "base" is meant to include front and/or rear foldable or non-foldable extension portion or portions, if any. Thus, the base 32 has a central portion 102 and front and rear extension portions 104 and 105 (or, if desired, an extension portion on only one of its ends) which are hingedly attached to the central portion 102 as at hinges 106 to be folded over to lie on the central portion 102 as shown in FIG. 2 and as discussed in greater detail hereinafter. The detachable legs 84 are adjusted to minimum or near minimum height so that they are well off the ground for towing, as discussed in greater detail hereinafter.

Figure 5:
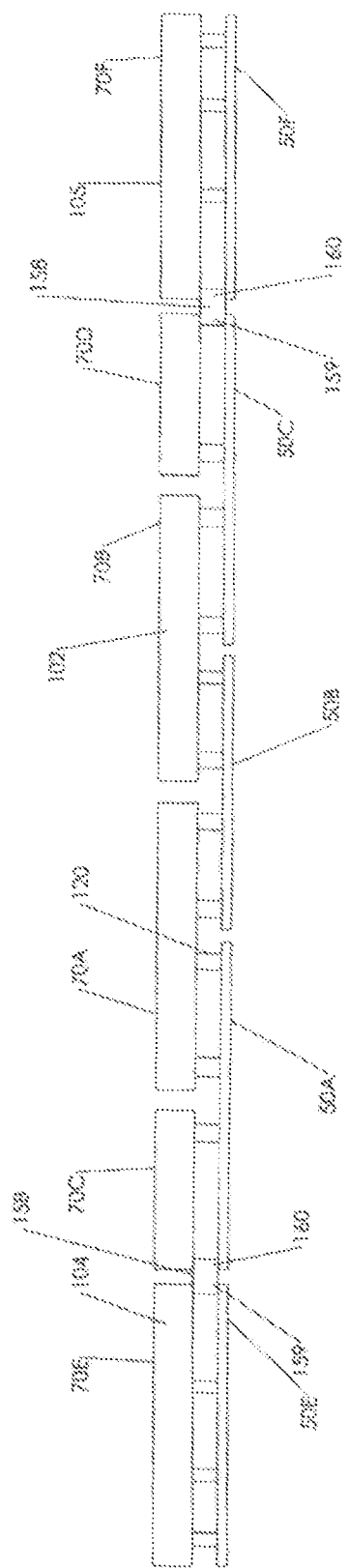
FIG. 5 is a diagrammatic view illustrating the layout of rail portions of a pair of rails and supporting channel members for the base of the sawmill of FIGS. 1 to 3.

Referring to FIG. 5, each rail 50 is composed of a plurality of end-to-end sections, which are illustrated at 50A, 50B, 50C, 50E, and 50F. Each rail support structure 70 is also composed of a plurality of sections or beams or channel members, which are illustrated at 70A, 70B, 70C, 70D, 70E, and 70F. In order to provide structural stability and a more secure attachment of the rail portions to the channel members, the rail portions 50 preferably overlap the channel members 70 along the length of the central portion 102. For each of the front and rear extension portions 104 and 105 respectively, the length thereof is such that only a single rail portion 50E and only a single channel member 70E is used for the front extension portion 104 and only a single rail portion 50F and only a single channel member 70F is used for the rear extension portion 105, so there is no such overlap in the extensions. However, there would desirably be such overlap if an extension portion were longer and/or is composed of more than one rail portion and more than one channel member. Moreover, shorter or longer rail portions and/or shorter or longer channel members may be necessary at the ends of the central portion 102 as well as at ends of any extension portions composed of more than one rail portion and more than one channel member. For example, as seen in FIG. 5, channel members 70C and 70D are shorter to define the ends of the central portion 102 to which the extensions 104 and 105 are hingedly attached.

The base 32 for the sawmill of FIGS. 1 to 3 also has a removable tow bar 108 secured to the central portion 102 and over which the front extension portion 104 lies when the base is unfolded, such as seen in FIG. 1, as discussed in greater detail hereinafter. Thus, it may normally not be necessary that the tow bar 108 be removed.

After the sawmill 30 has been towed to a site for use and after (or optionally before) the base 32 is unfolded, as seen in FIG. 3, the base 32 is raised high enough to raise the tires 100 off of the ground to allow removal of the wheels 99 along with the axles 98 and the mounted tires 100. In order to do so, the legs 84, which are height-adjustable as discussed in greater detail hereinafter, are adjusted to a height, illustrated at 110 (FIG. 3), which may, for example, be 18 inches. After wheel removal, the base 32 may then be adjusted to a desired lesser height, illustrated at 112 (FIG. 1), which may, for example, be 12 inches, for operation of the sawmill 30. If desired, the base 32 may be left at the height 110 for operation of the sawmill, in which case an axle and wheel need only be removed on the side on which the push bar 44 is located in order to avoid the wheel and tire on that side being an hindrance to the person pushing the carriage. However, the wheel and axle on both sides must be removed if the base 32 is to thereafter be lowered to a lesser height such as the height 112 (FIG. 1).

Figure 4:
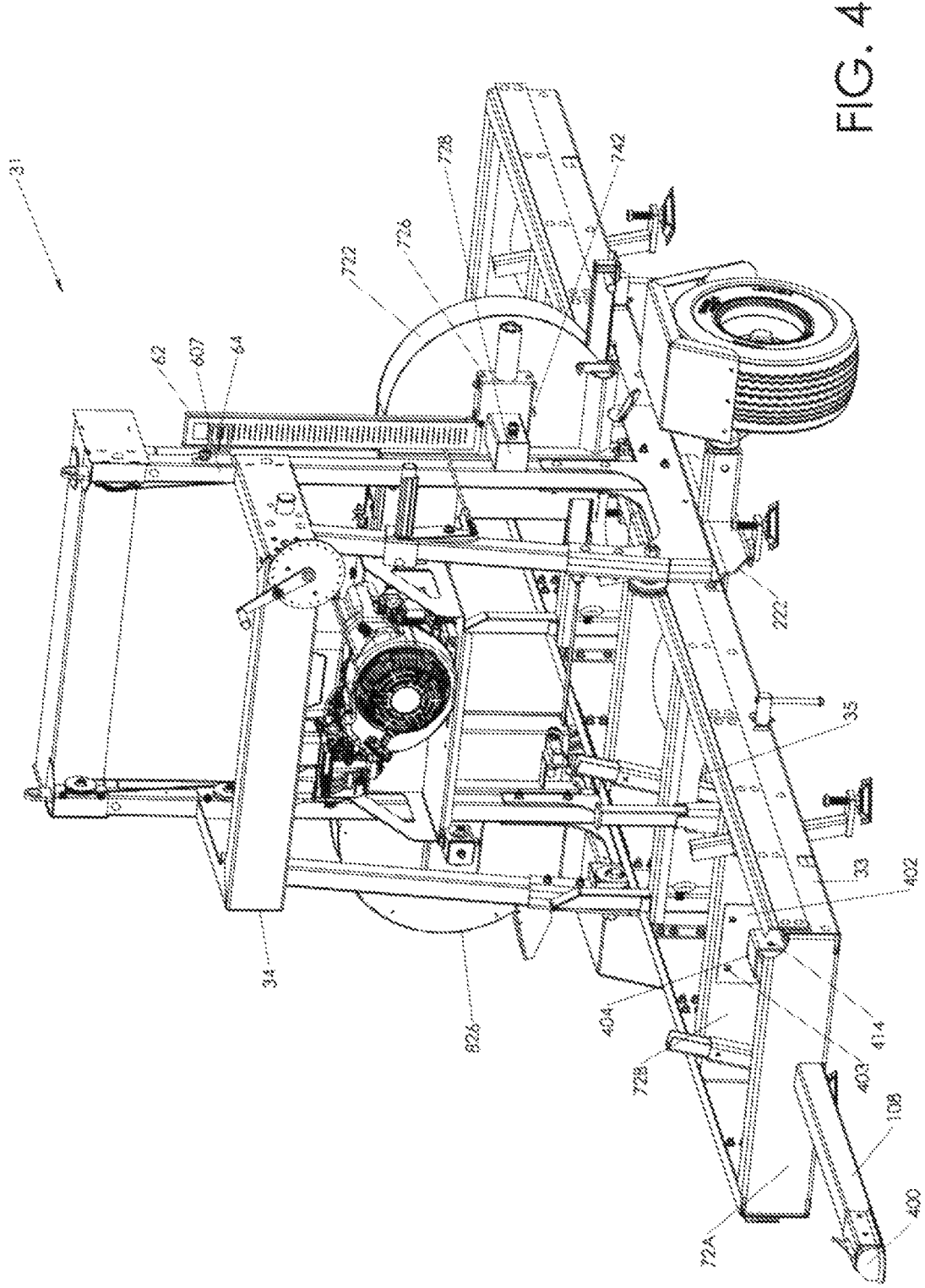
FIG. 4 is a perspective view of an alternative embodiment of the sawmill wherein it is without end extensions, set up for towing, and with the saw head at a lowered position.

FIG. 4 shows at 31 an alternative embodiment of the sawmill set up for towing, wherein its base 33 does not have any extension portions. Base 33 of sawmill 31 is otherwise similar to base 32 of sawmill 30. The tow bar 108 protrudes from the front of the base 33 and may be removed if it is an hindrance or if desired. The concavities 35 (FIG. 4) are cosmetic.

Laminated Rail

Figure 6:
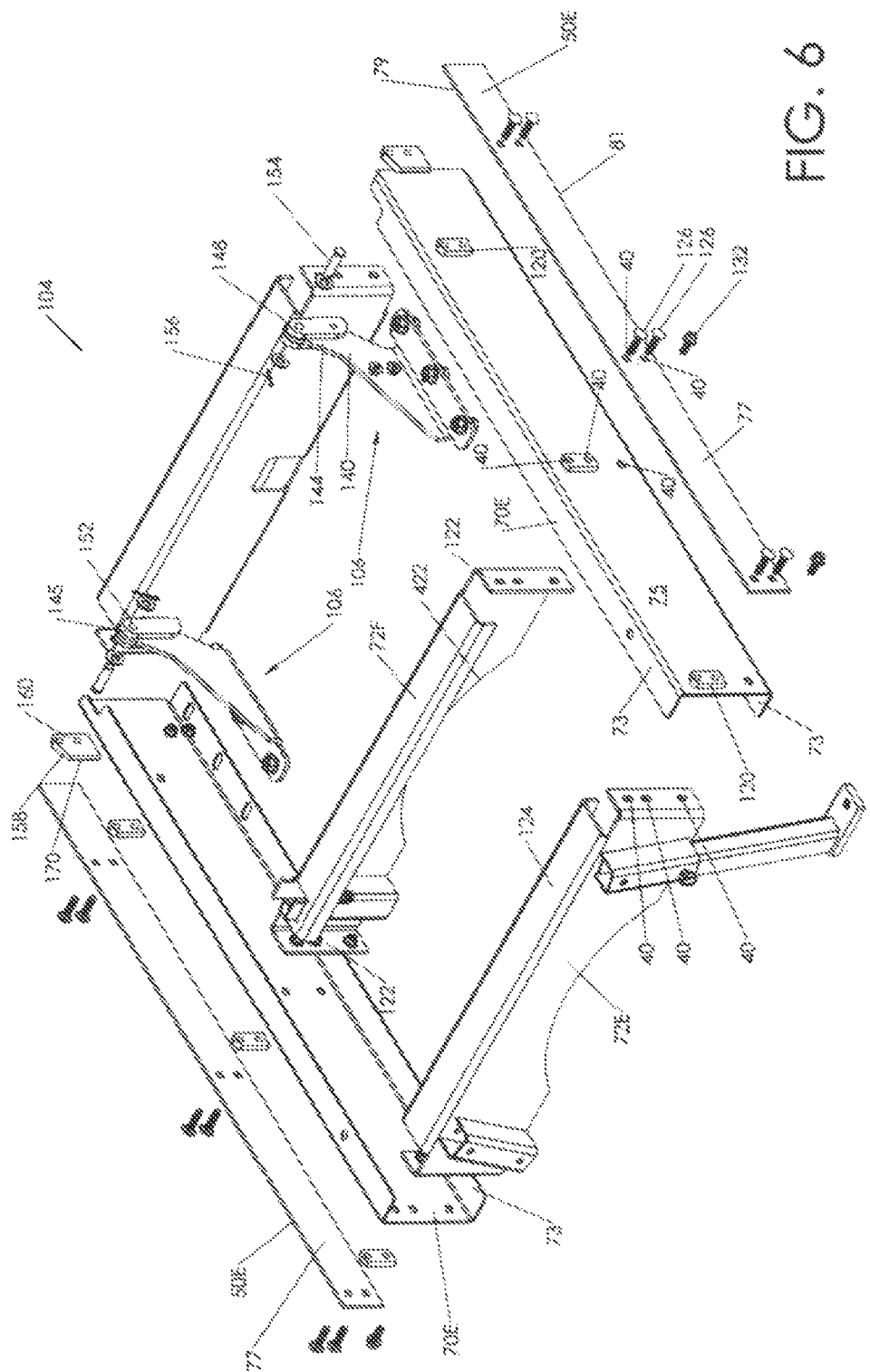
FIG. 6 is an exploded view of the front extension for the sawmill of FIGS. 1 to 3, illustrating lamination of rail portions to the rail support structures for the front extension as well as a pair of hinges for attaching the front extension to the base central portion.
Figure 7:
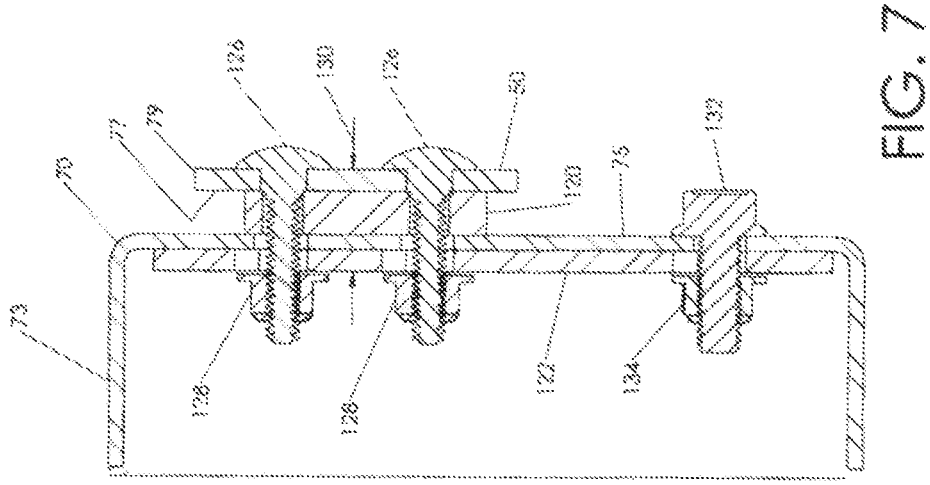
FIG. 7 is a sectional view illustrating the lamination of one of the rails to the respective rail support structure and to the respective structural member of the base of either of the sawmills.
Figure 12:
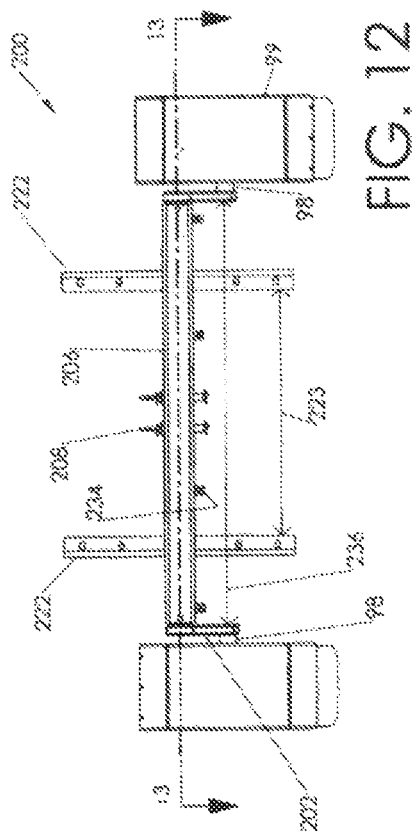
FIG. 12 is a plan view of an axle assembly and associated wheels and tires for a narrow sawmill base for either of the sawmills.

When the rails of a sawmill base lie atop their support structures, as shown in the aforesaid U.S. Pat. No. 8,276, 493, their attachments may not be as stable as desired, and they may be vulnerable to damage. Referring to FIGS. 6 and 7, in accordance with the present invention, in order to provide a more secure and stable attachment less vulnerable to damage, the rails 50, which are composed of flat strips, illustrated at 77, with upper and lower edges 79 and 81 respectively, are laminated, i.e., rigidly attached side-by-side to their respective support structures or pluralities of channel members 70, i.e., laminated or rigidly attached side-by-side to the vertically extending flat portions or sides 75, which are flanked by the upper and lower flanges 73 which face away from the side-by-side attachment. By "laminated" is meant, for the purposes of this specification and the claims, the rigid attachment of two or more items with flat surfaces thereof side-by-side, whether or not the items or flat surfaces thereof are spaced or touching each other. Thus, two items are laminated together if they are rigidly attached together side-by side, whether or not they are touching over their flat surfaces or whether or not there are spacers between them. The term "laminated" is specifically not meant to include the attachment of a rail portion to a support structure wherein the rail portion sits atop the support structure, i.e., it is specifically not meant to include a rail portion whose lower edge engages an upper edge or upper flange or upper surface of a support structure. The verb "laminate" means, for the purposes of this specification and the claims, rigidly attaching two or more items with flat surfaces thereof side-by-side, whether or not the items or flat surfaces thereof are spaced or touching each other. The verb "laminate" is not meant to include the attaching of a rail portion to a support structure such that the rail portion sits atop the support structure, i.e., it is specifically not meant to include the attaching of a rail portion to a support structure such that the lower edge of the rail portion engages an upper edge or upper flange or upper surface of a support structure. Thus, the rail portions 50A, 50B, etc. are attached side-by-side or laminated to the support structure channel members 70A, 70B, etc. as well as being attached to the bunks 72, even though the rails 50 are spaced from the support structures 70, as seen in FIG. 7.

FIG. 6 shows, on each side of the base 32, the lamination or rigid attachment of a rail portion 50E to a channel member 70E as well as to bunks 72 (only two of the four bunks shown for purposes of clarity) for the front extension portion 104. Thus, unlike the central portion 102 of the base, there is no overlap of each rail portion 50E and the corresponding channel member 70E of this front extension portion 104. It should therefore be understood that the rail portions and channel members desirably overlap for the central portion 102 of the base. FIG. 7 is a cross section of a lamination or rigid attachment of any of the rail portions to any of the channel members respectively as well as respective bunks 72 and is thus applicable to both the central portion 102 and the extension portions 104 and 105 of the base 32. However, unlike as seen in FIG. 7, the bolts 132 may not necessarily be directly below and in line with bolts 126 but may be offset to the left or right from the bolts 26, as seen in FIG. 1 as well as FIGS. 2 to 4.

As seen in FIG. 7, in order to protect each rail 50 (rail being used interchangeably to refer to one of the rail portions making up a rail or to the collective whole of the rail portions) from damage due to the placement of the ramps 74 or otherwise, the rail 50 is attached so that its upper edge 79 is preferably even or flush with or more preferably below the upper flanges 73 of the channel members 70. In order to do so in a manner so that the rollers 42 of the carriage 34 can still engage the rail 50, spacers 120 are sandwiched between the rail portions 50 and the channel members 70, whose flanges 73 face away from the rail portions 50. Each bunk or structural member 72 is a cross plate which has end flanges 122 and upper and lower side flanges 124 (the lower one not shown) all facing in the same direction (i.e., as seen in FIG. 6, rearwardly). There is a rigid attachment of the respective portion of the rail 50 to the respective spacer 120 and side-by-side to the respective channel member portion 75 and to an end flange 122 (which is received between flanges 73 and flush with the portion 75) of a respective bunk 72, by a pair of upper and lower carriage bolts 126 (or other suitable bolts) each received in respective apertures 40 therein and threadedly engaged by flanged Nylock nuts 128 (or other suitable nuts) respectively. The total thickness of the lamination, illustrated at 130, may, for example and not for purposes of limitation, be about 0.94 inch. For example, there may be, as shown, 4 spacers 120 along the length of a channel member 70. The spacers 120 desirably help to keep the rails 50 free of saw dust and the like by allowing it to fall between the spacers to the ground. Below each such lamination (directly below or offset), the respective channel member 70 is attached to the respective end flange 122 of the respective bunk 72 by a suitable bolt 132 received in apertures therein and threadedly engaged by a suitable nut 134.

When rail portions are hot-dipped or electric galvanized or powder coated, as is conventional in the industry, the coating undesirably wears off quickly and rusts. In order to prevent such from occurring, the rail portions 50 are preferably made of stainless steel. The rail portions 50 are preferably laser cut to provide desirably hardened edges 79 for engagement by the carriage rollers 42.

While it is preferred that the rail not stick up above the bunks so that it is easier to load and to provide protection to the rail, it should be understood that the spacers 120 can nevertheless be eliminated (with the rail sides 77 un-spaced from the channel member portions 75) by elevating the upper edges 79 of the rails 50 to be higher than the upper flanges 73 of the channel members 70 sufficiently to allow the carriage rollers 42 to move along the rails 50. Such an elevated rail embodiment is meant to come within the scope of the present invention as defined by the appended claims. Base Extensions FIG. 6 also shows in exploded view each of a pair of the hinge assemblies 106 (one for each side of the base 32, and which may be referred to herein and in the claims as hinges) for hingedly attaching the front extension portion 104 to the central portion 102 of the base, it being understood that the hinge assemblies for attaching the rear extension portion 105 to the central portion 102 are similar. FIG. 8 is a close-up exploded view of one of the hinge assemblies 106 (shown to the inside of the support structures or channel members 70 as well as spacers 120 and 158 (shown to the outside of the support structures 70, the spacer 158 discussed hereinafter). A generally triangular hinge plate 140 has a lower flange 142 which is bolted to the lower flange 73 of the respective channel member 70E and extends upwardly therefrom to an upper apex portion 144 which has an aperture, illustrated at 145. A hinge mounting plate or bracket 146 is attached, such as by bolting or welding, to the front channel or structural member 72C of the central portion 102 of the base and carries a hinge 148 comprising a pair of spaced plates 150 each having an upper aperture, illustrated at 152 (the aperture in one plate shown). A pin 154 is received in the apertures 145 and 152 (best shown in FIG. 6) for the hinge plate 140 and the spaced plates 150 respectively and secured with a washer and cotter pin 156 for each of the hinges 106 to hingedly attach the front extension portion 104 to the central portion 102 so that the front extension portion 104 may be rotated about the hinge pin 154 upwardly and then over on top of the central portion 102 to the folded position seen in FIG. 2, as illustrated at 107, and rotated back to the unfolded position aligned with the central portion 102 of the base, as seen in FIG. 1.

It is important that the rail portions 50A and 50E on each side of the sawmill be maintained in alignment as the front extension portion 104 is unfolded for use. In order to achieve such alignment, in accordance with the present invention, a plate, illustrated at 158, is provided (on each side of the base 32) which serves, like the spacers 120, as a spacer between portion 75 of channel member 70E and rail portion 50E of front extension portion 104 as well as serving as a spacer between portion 75 of channel member 70C and rail portion 50A of the central base portion 102, as illustrated schematically in FIG. 5. A vertical side portion 160 of the plate 158 is positioned at the forward end of the central base portion 102 between the forward-most channel member 70C and the forward-most rail portion 50A of the central base portion 102 and replaces and acts as a spacer 120, wherein bolts 126, as shown schematically in FIG. 9, passing through apertures 127, and with the use of nuts (not shown) or other suitable fasteners, rigidly attach the plate 158 to the rail portion 50A, channel member 70C, and the forward-most structural support 72 of the central base portion 102 to sandwich the plate 158, as illustrated in FIG. 5, as part of the previously discussed laminating process. In accordance with the aforesaid discussion of the structural supports 72, the structural supports 72 in one or both of the extensions 104 and 105 may not normally be provided to support a log, their purpose being instead to provide structural support for the extensions 104 and 105 to support the rails, i.e., during normal use of the sawmill, one or both of them may be positioned so as not to support a log, i.e., one may instead support the carriage at the beginning of a cutting pass.

Like a spacer 120, the plate 158 is preferably disposed between and tightly engages and is bolted, by bolts 126, between rail portion 50A and channel member 70C at the respective end of the central base portion 102, as illustrated in FIGS. 8 to 10 and the left side of FIG. 5. The side portion 160 of the plate juts or extends out from the respective end of the central base portion 102 to be slidably receivable between rail portion 50E and channel member 70E at the respective adjoining end of the extension 104, as also illustrated in FIG. 5. It can thus be seen that as the extension portion 104 is being unfolded to its position in FIG. 1, its rail portion 50E and channel member 70E will engage the plate portion 160 so that it is sandwiched between them and slidably engage the plate portion to provide alignment of the rail portions 50A and 50E.

It is envisioned that, if desired, suitable apertures may be provided and suitably located in the plate 158 and the forward extension channel member 70E, on one or both sides of the sawmill, and a pin inserted in these apertures in order to lock the front extension 104 in the unfolded position illustrated in FIG. 5 for use of the sawmill 30. For folding the front extension 104, the pin is removed. The rear extension member may of course similarly be locked in the unfolded position and unlocked for folding.

The spacer plate 158 and the spacers 120 each has a sloping upper surface, illustrated at 170, to prevent sawdust build-up.

As illustrated on the right side of FIG. 5, as an alternative to the positioning of the plate 158 as illustrated on the left side of FIG. 5 and otherwise in the drawings, the plate 158 may be said to be flipped so that its portion 160 is attached to a base extension portion such as 105, and so that it's other portion 159 is inserted between the rail and respective structural member of the central base portion 102.

The means for unfolding and folding of the rear extension 105 is similar to that for unfolding and folding of the front extension 104.

It is envisioned that a sawmill may be provided wherein the central base portion is shortened and the front and rear extensions respectively lengthened, as compared to those shown in the drawings, to provide an overall shorter folded base for towing and storage of the sawmill.

Removable Wheels

Referring to FIGS. 12 to 16, the axle assembly or split axle 200 includes the two identical axles 98 (which may be called snub axles), which are removable or detachable as discussed hereinafter. Collectively, they may be referred to as a split axle or simply as the axle, and each of the snub axles 98 may be referred to as an axle. The reference numeral 98 is intended to refer to a snub axle, and the reference numeral 200 is intended to refer to the axle assembly including both snub axles 98. Each snub axle 98 includes a portion 201 conventionally connected to the respective wheel 99, a swing arm 202 one end of which extends from and normal to axle portion 201, and an elongate generally square (or suitably rectangular) in section axle portion 242 which the swing arm 202 also extends normal to. The axle portion 242 is received in a similarly generally square (or suitably rectangular) in section tube 204 with rounded corners, as discussed hereinafter. The axles 98 are preferably torsion axles, as will be discussed in greater detail hereafter.

Figure 14:
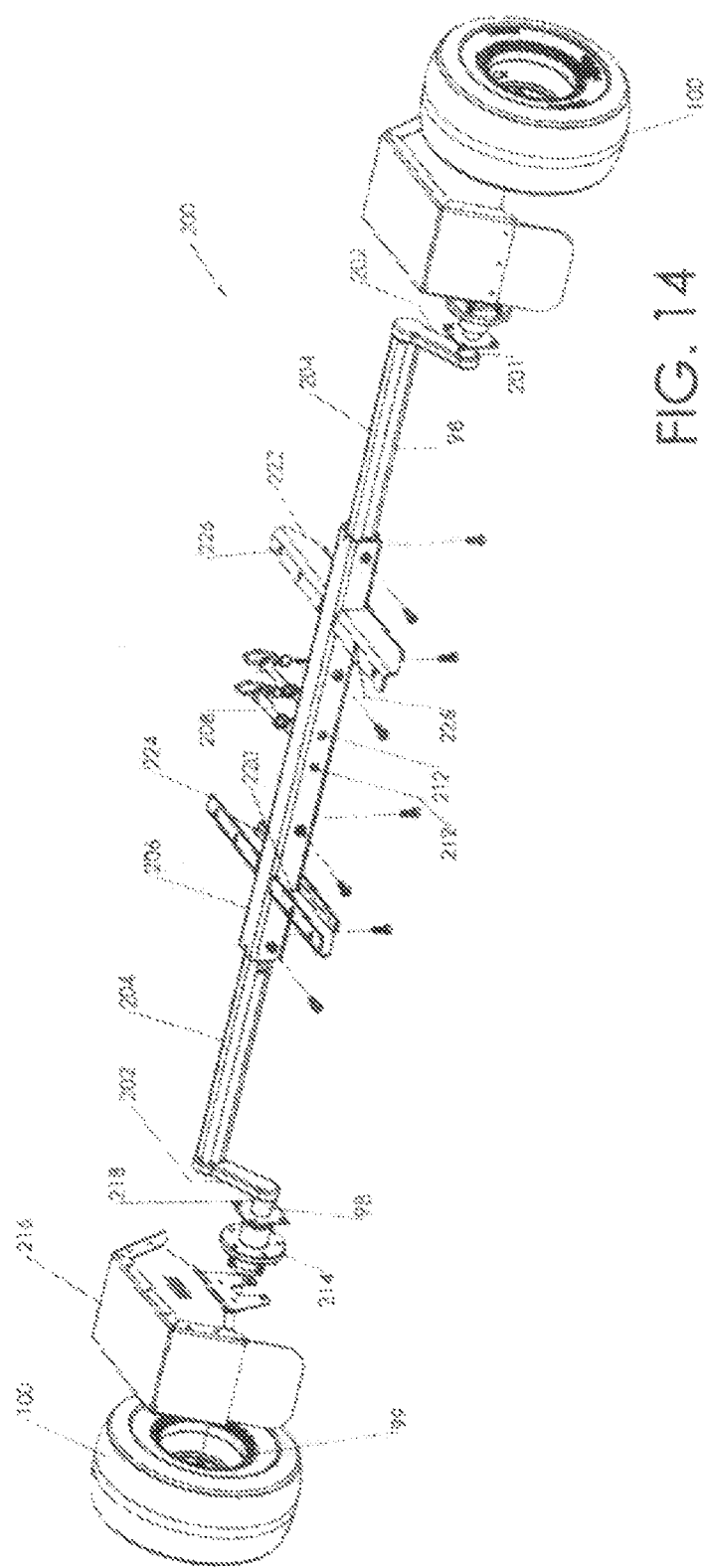
FIG. 14 is a perspective view of the axle assembly and wheels and tires.

The axle portions 204 are telescopingly received in the ends respectively of a centrally located (centrally of the base width) elongate axle receiver 206 which is also similarly square (or suitably rectangular) in section to prevent the tube 204 from rotating. Each axle portion 204 is attached to the axle receiver 206 by a suitable hitch pin 208 which is received in a respective pair of aligned apertures, illustrated at 210 (FIG. 15, one of each pair shown), in opposite walls of the axle portion 204 and also received in a respective pair of aligned apertures, illustrated at 212 (FIG. 14, one of each pair shown), in opposite walls of the axle receiver 206. As seen in FIG. 14, the pairs of apertures 212 are close to the center of the axle receiver 206. As seen in FIG. 15, the apertures 210 are near the terminal end of the axle portion 204. The pins 208 are provided to be quickly removable to easily and quickly detach each axle 98 with its attached wheel 99 and tire 100 as a unit from the axle receiver 206. The hubs 214 are suitably attached to the wheels 99 and receive the axle portions 201 and remain stationary while the axle portions 201 rotate relative thereto respectively. Fenders 216 for the tires 100 are suitably attached to fender mounts 218 respectively, which also receive the axle portions 201 respectively and remain stationary while the axle portions 201 rotate relatively thereto respectively. Conventional camber and toe tracking adjustment mechanisms are shown at 232 and 234 respectively.

The elongate axle receiver 206 is received in square (or suitably rectangular) cut-outs, illustrated at 220, in a pair of longitudinally spaced axle carriage members (channel members) 222 respectively and suitably welded thereto on opposite sides of the base 32 respectively. The axle carriage members 222 are suitably attached to opposite sides of the base 32 by means of bolts or other fasteners received in apertures 226 in carriage flanges 224 and in suitably positioned apertures in the base 32, as seen in FIGS. 2 and 4.

The axle assembly 200 is provided for a base 32 having a width of, for example, about 29 inches for handling of logs having diameters up to about 27 inches, and the axle receiver 206 therefor has a length, illustrated at 236, of, for example, about 43 inches. For handling larger logs, the width of the base 32 is desirably increased to, for example, about 35 inches for handling logs having diameters up to about 32 inches. In accordance with the present invention, in order for an identical axle to be used for the increased base width, the spacing, illustrated at 223, between the axle carriage members 222 is increased from a first spacing as illustrated by their positions at 222A (FIG. 13) to a second spacing as illustrated by their positions at 222B. It should of course be understood that the spacing 223 may be similarly changed to accommodate other base widths. As a result, the number of different parts in inventory may be reduced and maintenance of inventory may be simplified since the same axle assembly 200 may be used for various widths of the base 32 (i.e., only the positions of the carriage members 222 along the axle receiver 206 need to be changed).

Figure 13:
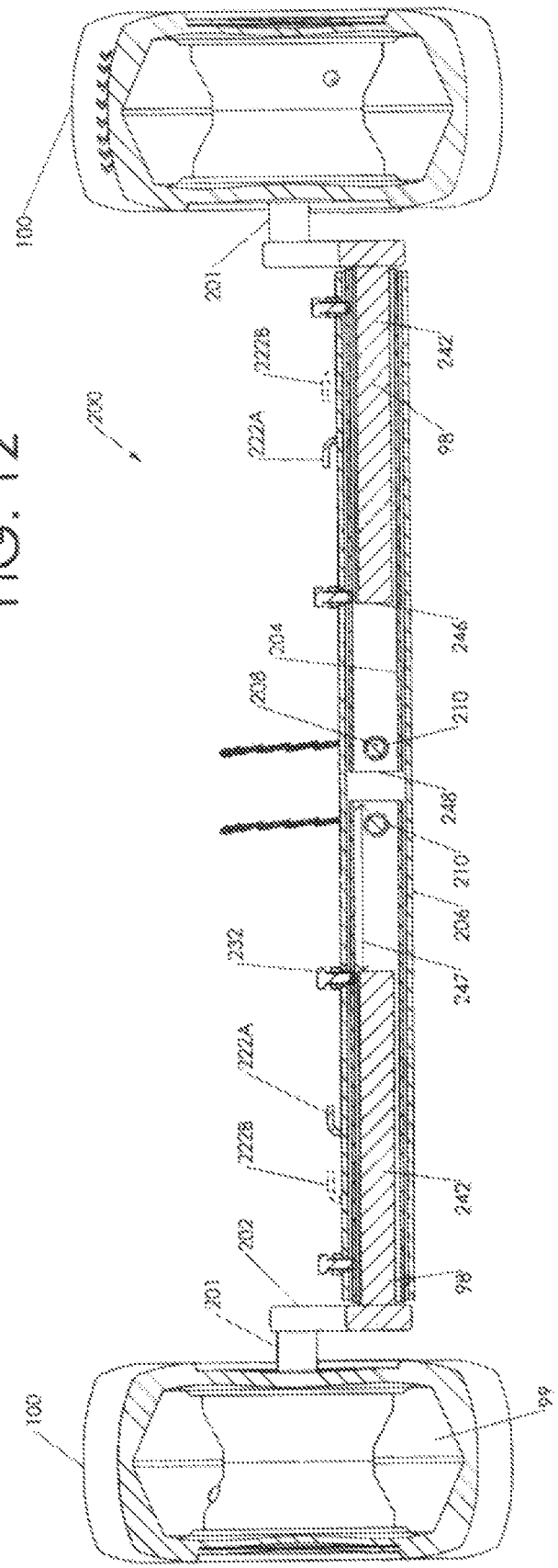
FIG. 13 is a section view taken along lines 13-13 of FIG. 12.

Referring to FIGS. 13, 15, and 16, the swing arm 202 is integral with (or may otherwise be suitably attached to) an elongate generally cross-sectionally square (or suitably rectangular) member 242 which is received within the elongate generally cross-sectionally square (or suitably rectangular) tube 204. The square tube 204 has adjacent it's terminal end the respective pair of aligned apertures 210 (one shown) in opposing walls respectively thereof for receiving a hitch pin 208 thereby attaching the square tube 204 and thus the axle 98 to the axle receiver 206, as previously discussed. The cross-sectionally square member 242 extends only part way to the location of the respective apertures 210 and ends at 246 and is retained in the cross-sectionally square tube 204 by suitable conventional means, believed to be by friction and/or torsion, as provided by the axle manufacturer. A suitable axle assembly is provided by Qingdao Mastervim Industry Technology Co, Ltd of Qingdao, China, having a website of www.mastervim.com, and identified on the website as "torsion axle without brake −1." The distance, illustrated at 247 in FIG. 13, between the ends 246 and 248 of the cross-sectionally square member 242 and the cross-sectionally square tube 204 respectively is, for example, about 7.125 inches, but may vary, it being necessary that the cross-sectionally square member 242 not interfere with the passage of pins 208 through respective apertures 210 and since the cross-sectionally square member 242 must be rotatable relative to the non-rotatable tube 204, as hereinafter discussed.

In order to allow a lower profile, in accordance with a preferred embodiment of the present invention, the axle 200 is a torsion axle (rather than a fixed axle). Thus, referring to FIG. 16, the cross-sectionally square member or torsion bar 242 is small enough that it is able to rotate relative to the cross-sectionally square tube 204 and has four sides 252. The four sides of the cross-sectionally square tube 204 meet at four rounded apexes 254 respectively. The torsion bar 242 is spring-loaded in that it is oriented within the cross-sectionally square tube 204 so that an elongate compressible urethane (or other suitably compressible material) tube 250 is received tightly between each side 252 of the torsion bar 242 and a respective apex 254 of the cross-sectionally square tube 204. As the tires 100 run over bumps in the road, each swing arm 202 effects some rotation of the respective rotatable torsion bar 242 in either direction (clockwise or counterclockwise) relative to the respective stationary cross-sectionally square tube 204 and under the resulting applied force compressing or squeezing the urethane tubes 250 to provide torsion spring load thereby absorbing shocks of the bumps. When a bump/shock is passed, the torsion bar 242 is returned back to its normal rotational position as counterforce is applied by the de-compressing urethane tubes 250.

The swing arm 202 is angled downwardly at an angle, illustrated at 256, which is selected by the axle manufacturer to achieve an optimum trailer pre-load. This angle 256 is typically between about 40 and 50 degrees, for example, about 45 degrees.

Adjustable and Removable Legs

Referring to FIGS. 17 to 20, each of the legs 84 has an upper cross-sectionally square (or could be rectangular or otherwise suitably shaped) tubular member 302 in which a lower cross-sectionally square (or otherwise similarly shaped) tubular member 304 is telescopically received and adjustably attached thereto (as discussed hereinafter). Each leg 84 terminates in a ground-engaging foot or foot pad 312.

In order to avoid the tripping hazard associated with the typical mounting of support legs to the outsides of the support structures or tracks 70, the support legs 84 are preferably mounted to the inside of the tracks 70, which also allows them to extend downwardly at an angle for more stable support of the base 32, as discussed hereinafter, without re-creating the tripping hazard. Thus, the upper end portion of the upper member 302 is bolted (or otherwise suitably attached such as by welding) to a plate 306 which is in turn bolted to the forward side (or rearward side as suitable) of a respective bunk 72 and thus to the inside of the respective support structure or track 70. The plate 306 is bolted to the respective bunk 72 by suitable fasteners 311 (such as bolts secured with nuts) received in apertures, illustrated at 313, in the four corners of the plate 306 and in apertures in the respective bunk 72.

Figure 18:
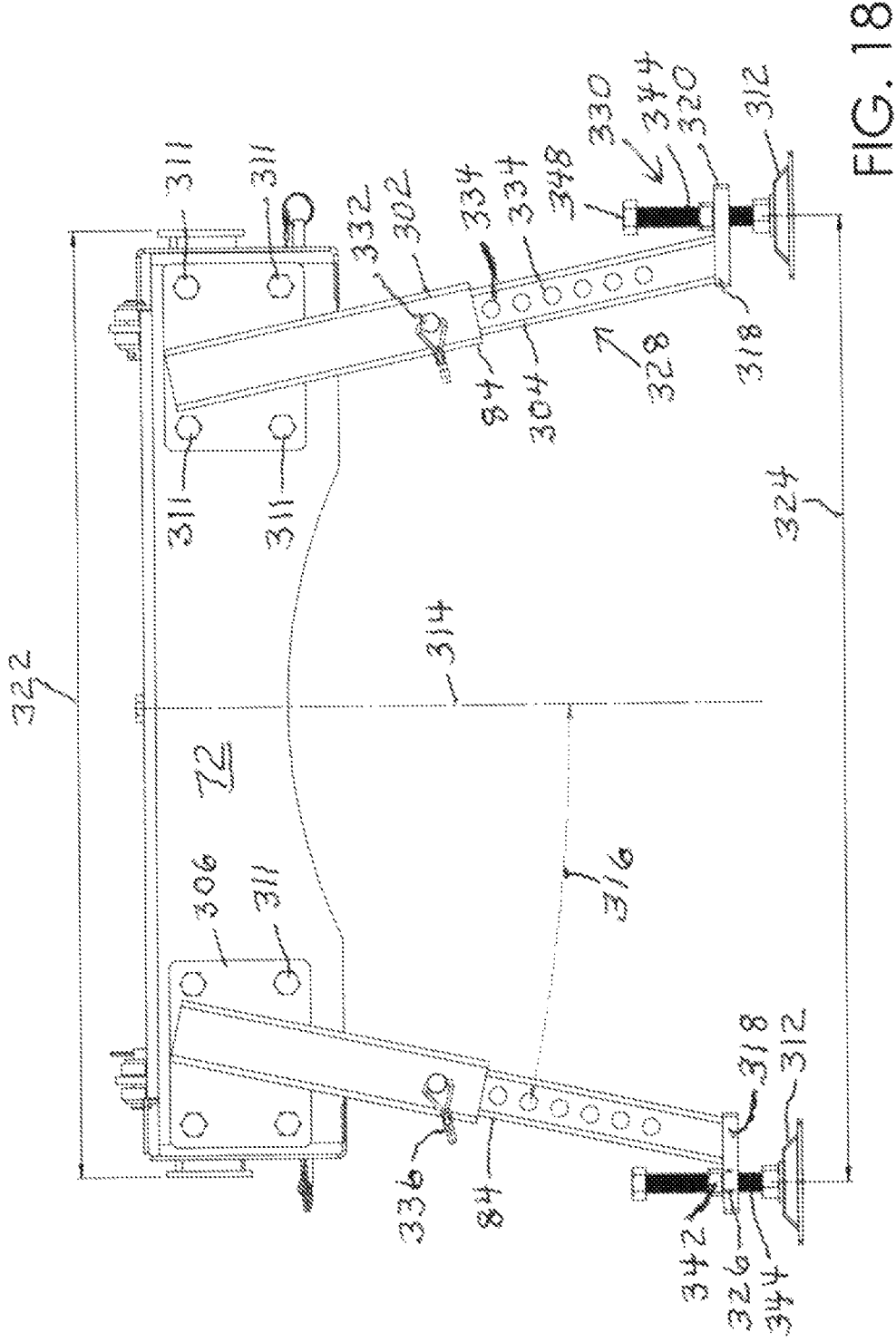
FIG. 18 is a side view of a pair of the legs attached to opposite sides of the base of either of the sawmills.

If the legs were attached to the outside of the respective rail support structures 70 and extend straight down, in addition to the legs constituting a tripping hazard, there may also be a problem with side-to-side stability and lateral movement when loading logs. Referring to FIG. 18, in order to provide better side-to-side stability of the base 32 and to reduce and substantially eliminate lateral movement when loading logs, the legs 84 are angled to the vertical, illustrated at 314, to be angled outwardly as they extend downwardly, as illustrated by angle 316, so that each pair of legs 84 on opposite sides of the base 32 forms a more stable shape, which may be called an "A-frame" shape, as seen in FIG. 18. This angle 316 is selected so that the feet 312 are laterally not so far outside the base 32 as to constitute a trip hazard by the legs 84. This angle 316 is preferably between about 10 and 20 degrees, for example, about 12 degrees. For example, for an angle 316 of 12 degrees, the difference between the distances 322 and 324 may be about 1.5 inches. Thus, the legs 84 are generally confined laterally within the sides of the base 32 so as not to constitute a trip hazard while also having an "A-frame" shape to provide desired stability. As pointed out hereinafter with respect to FIGS. 42 and 43, the bolts 344 should however be positioned sufficiently outside the respective bunk 72 so as to easily allow the bolts 344 to be easily engaged by a suitable tool.

The lower end of the lower member 304, which is telescopically received in the upper member 302, is welded or otherwise suitably attached to a plate or flange 318 and is skewed relative to the flange 318 so that the flange 318 is oriented horizontally. The flange 318 extends horizontally outwardly (relative to the base 32) from the lower end of the lower member 304 to define a flange portion 320 which has an aperture, illustrated at 326, extending vertically there through generally centrally thereof.

In order to raise the tires 100 high enough for detachment and removal of the wheels 99 and axles 98 as well as to provide preciseness of height adjustment, in accordance with the present invention, the legs 84 are provided with means for both coarse and fine height adjustments, illustrated generally at 328 and 330 respectively.

The coarse height adjustment 328 comprises a pair of aligned apertures, illustrated at 332 (one shown), in opposite walls respectively of the lower portion of the upper member 302 which aligned apertures 332 are alignable with each of a plurality of pairs of aligned apertures, illustrated at 334, longitudinally spaced along the length of the lower member 304. For example, there may be 8 such pairs of apertures 334 spaced from one another, center-to-center as illustrated at 338, by about 1 inch thus allowing coarse height adjustment in 1 inch increments. Thus, for coarse height adjustment, the leg 84 is adjusted to close to the desired height by aligning the pair of apertures 332 and the pair of apertures 334 corresponding to close to the desired height of the base 32, and inserting a pin 336 in the corresponding aligned apertures 332 and 334. In order to prevent the pin 336 from inadvertently coming out, it is preferably a clevis pin, as it is illustrated in FIG. 17. As seen in FIG. 18, each leg 84 is adjusted to the greatest coarse height, i.e., the pin 336 is inserted in the upper pair of apertures 334. The upper one of the pairs of apertures 334 is spaced sufficiently from the upper edge of the lower member 304, as illustrated at 340, to provide stability between the connected upper and lower members 302 and 304 respectively. This distance 340 may, for example, be about 1.5 inches. Likewise, the pair of apertures 332 is spaced sufficiently from the lower edge of the upper member 302, as illustrated at 341, to provide stability between the connected upper and lower members 302 and 304 respectively. This distance 341 may, for example, be about 1.5 inches.

In order to shorten the legs 84 for towing and to lengthen the legs 84 for set up for sawing, there should normally not be a need to remove the lower member 302 from the upper member. For towing of the base 32, the legs 84 are desirably stowed at the shortest coarse height wherein the pin 336 is received in the lowest pair of apertures 334A in the lower member 304 and in the pair of apertures 332 in the upper member 302, and the foot pad 312 may be raised to be next to the flange 318 by the fine adjustment, which is hereinafter described.

After towing and while the tires are still supporting the base, the legs 84 are coarsely adjusted to the greatest height that can be achieved coarsely by removing the pin 336, lowering the lower member 304 so that the foot pad 312 (finely adjusted to its closest point next to the flange 318) engages the ground, then inserting the pin 336 in the highest pair of apertures, for example, the apertures at 334B, in which it can be inserted and further inserting the pin 336 in the pair of apertures 332 in the upper member 302.

The wheels do not have to be removed to set up the base for sawing, but they may desirably be removed so that they are not in the way of sawing operations. In order to optionally remove the wheels to set the base up for sawing, the tires 100 must be lifted off the ground for their removal. To do this, the base 32 must be lifted further than can be achieved with the coarse adjustment, and this can be done with the fine height adjustment 330. For fine height adjustment, a suitable bolt 344 is threadedly received in the flange aperture 326 and extends above and below the flange 318. The bolt 344 is long enough to achieve the desired amount of fine adjustment. For example, the bolt shank may have a length, illustrated at 346, of about 5 inches. The flange portion 320 and the skewed relation of the lower member 304 to the flange 318 allow the bolt 344 to extend vertically so that the bolt head 348 is above the flange portion 320 and spaced from the lower member 304 to desirably allow the manipulation of the bolt head 348 with a suitable hand tool from an advantageous position to conveniently provide simple accessible adjustment with a hand tool from above the flange 318 to jack the base 32 up and down, as hereinafter discussed.

As seen in the foot embodiment of FIGS. 17 and 18, the bolt 344 is threadedly received in a lock nut 342 above the flange portion 320 to lock the bolt position at a desired height of the base 32. As seen in the foot alternative embodiment of FIGS. 42 and 43, this lock nut 342 may desirably be eliminated.

The foot or pad 312 is a suitably bent sheet member which has a raised generally square or rectangular central portion 350 with four outer wall portions 352 which slope downwardly and outwardly to flange portions 354. Apertures, illustrated at 356, are provided in the flange portions 354 respectively to attach the foot pad 312 to a conventional ground engaging sleeper (not shown) for the foot pad 312 to rest on.

The bolt 344 extends downwardly through and below an aperture, illustrated at 358, centrally of the foot pad portion 350, the aperture 358 being large enough not to interfere with rotation of the bolt 344. The lower end portion of the bolt 344 is held so that it can rotate but cannot move vertically by two capture jam nuts 360 and 362 in which the bolt 344 is threadedly received, one nut 360 above the foot pad 312 and the other nut 362 below the foot pad 312. Steel washers 364 and 366 are received between the raised central portion 350 and the nuts 360 and 362 respectively. The bolt 344 is thus retained against vertical movement as it is rotated.

In order to remove the tires, the bolt 344 is rotated to finely adjust the height of the base until the tires are off the ground, after which they can then be removed. The base height can then be adjusted to any desired height by utilizing coarse and/or fine adjustment to achieve the lower height seen in FIG. 1, or to achieve another desired height.

For towing the sawmill 30, the base is jacked up high enough for attachment of the axle/wheel/tire assembly by use of the fine and/or coarse adjustment, and a truck is hooked up to the tow bar 108. After the axle/wheel/tire assembly is attached, the legs 84 are adjusted to the towing position with the foot pad raised desirably as far as the adjustments allow, as seen in FIGS. 2 and 4.

Figure 42:
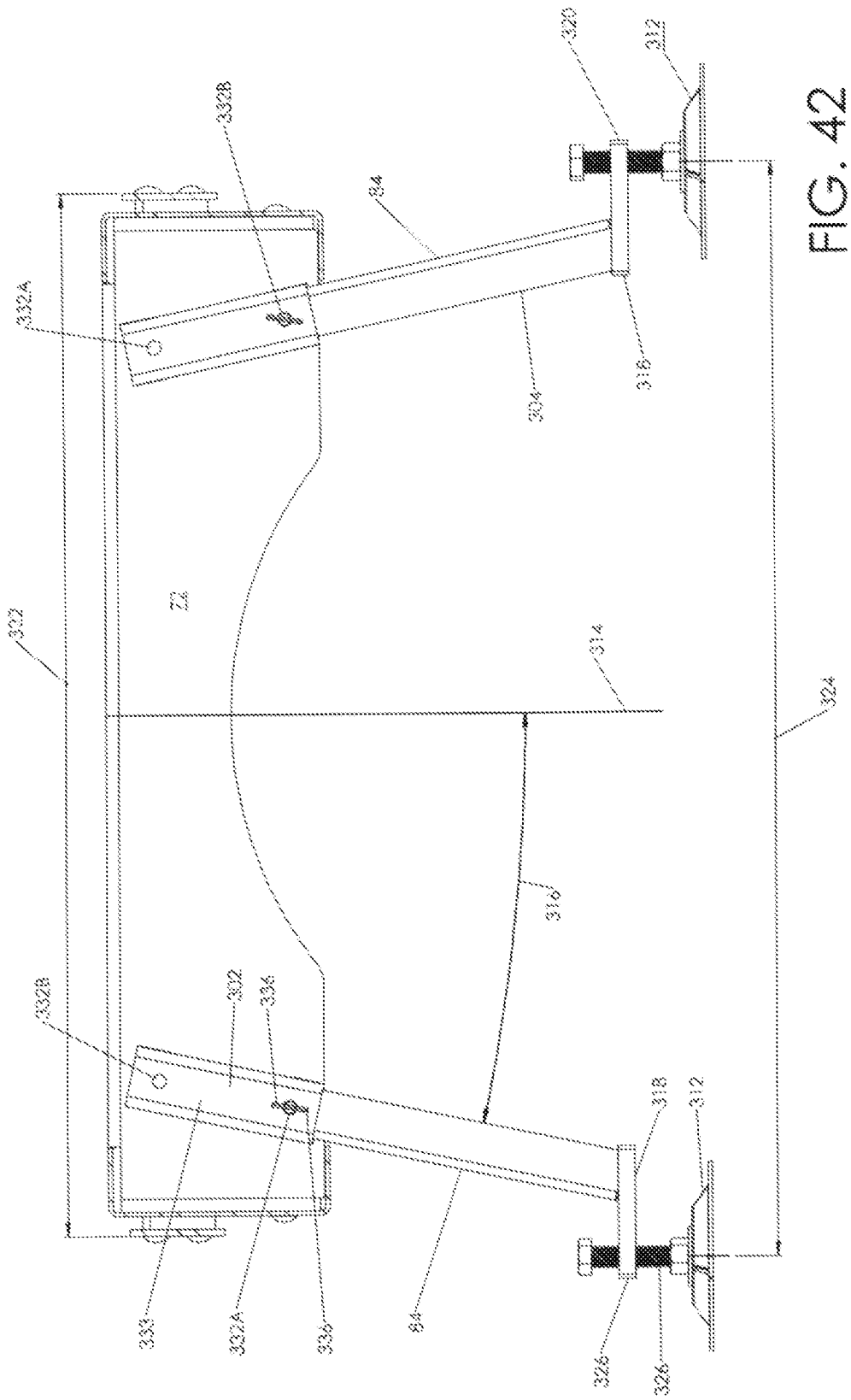
FIG. 42 is a view similar to that of FIG. 18 of an alternative embodiment of the legs.
Figure 43:
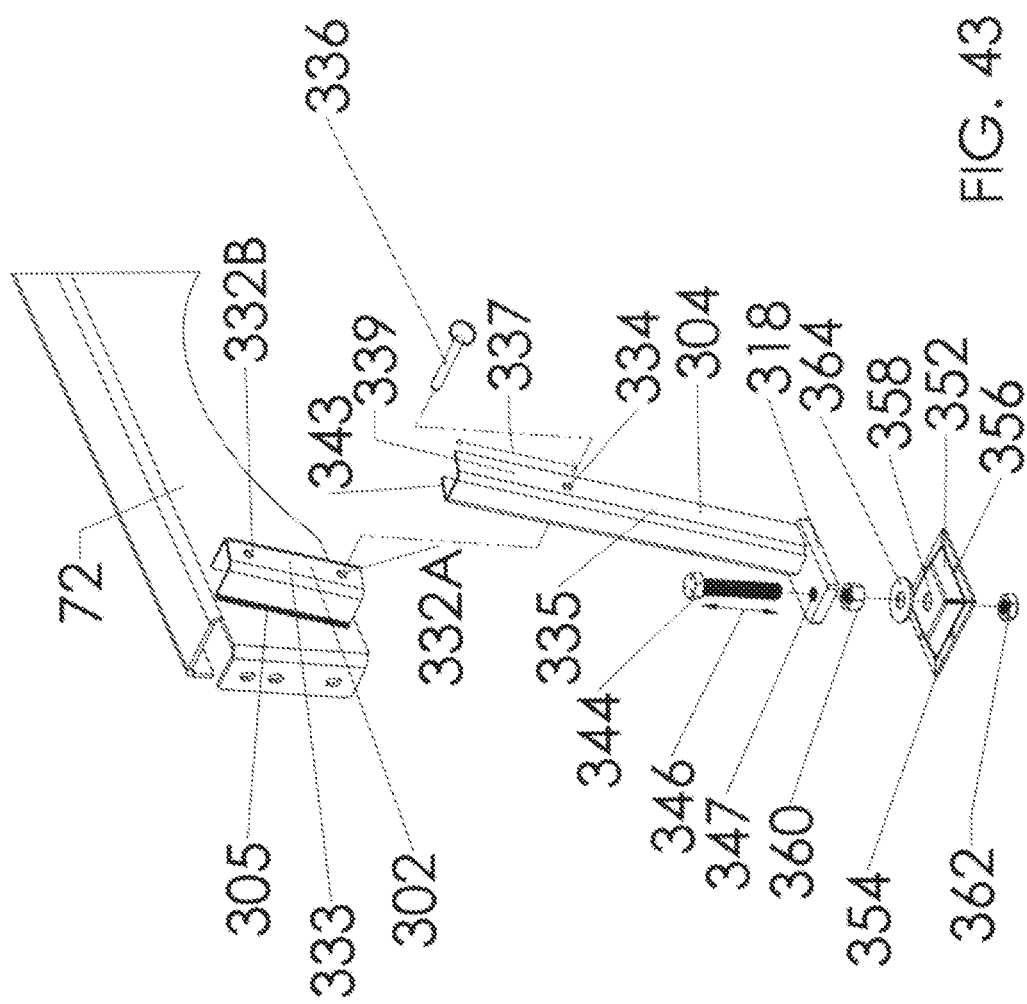
FIG. 43 is an exploded view of the alternative embodiment of FIG. 42.

During development, it was discovered that it may be awkward during assembly for customers to attach the legs of FIGS. 17 and 18 and that it may be awkward to apply a tool to the fasteners 311. It was also discovered that the many increments 338 may not be needed for the course adjustment. Referring to FIGS. 42 and 43, there is shown an improved version of the legs 304 wherein the upper member 302 is welded to the respective bunk 72 as by welding illustrated at 305 and at the desired angle 316 and is shortened so that it does not extend below the respective bunk 72. The upper member 302 in this embodiment is shown to have a pair of lower and upper apertures 332A and 332B (but could if desired have more such apertures) in its outer face 333 (FIG. 42) and correspondingly aligned apertures (not shown) in the adjacent face of the bunk 72. The lower member 304 is telescopingly received in the upper member 302 and has a single aperture 334 in the face 335 thereof (but if desired could have more than one such aperture) which engages the face 333 when the lower member 304 is telescopingly received in the upper member 302. The face 343 of the lower member 304, which is opposite face 335, has an aperture (not shown) which is aligned with aperture 334.

To attach the lower member 304 to the upper member 302 of this embodiment of FIGS. 42 and 43 for coarse adjustment 328 to plant the sawmill on the ground for use after it has been towed, after removal of the clevis pin 336 (or other suitable fastener) from apertures 334 and 332B (and corresponding aligned apertures referred to in the above paragraph in the face 343 and bunk 72) and movement of the lower member 304 downwardly, the clevis pin 336 is inserted in apertures 334 and 332A (and corresponding aligned apertures referred to in the above paragraph in the face 343 and bunk 72) and suitably fastened to fixedly attach the upper and lower members 302 and 304 together. To attach the lower member 304 to the upper member 302 for coarse adjustment 328 to raise the leg for towing of the sawmill, after removal of the clevis pin 336 from apertures 334 and 332A (and corresponding aligned apertures referred to in the above paragraph in the face 343 and bunk 72) and movement of the lower member 334 upwardly, the clevis pin 336 (or other suitable fastener) is inserted in apertures 334 and 332B (and corresponding aligned apertures referred to in the above paragraph in the face 343 and bunk 72) and suitably fastened to fixedly attach the upper and lower members 302 and 304 together, allowing the upper end portion 339 (the portion above the aperture 334) of the lower member 304 to protrude above the respective bunk 72. The insertion and fastening of the pin 336 (or other suitable fastener) as discussed in this paragraph is done to completely encapsulate the leg for greater stability while greatly reducing the possibility of shear of the clevis pin or other suitable fastener. The length, illustrated at 337, of the end portion 339, which may be approximately equal to the length of the upper member 302, is chosen to provide desired stability to the attachment of the upper and lower members 302 and 304 respectively. The length 337 should be at least about 4.6 inches, for example, 4.60 inches. Fine height adjustment 330 is achieved by threaded manipulation of bolt 344 within the threaded aperture 347, and otherwise similarly as discussed for the legs of FIGS. 17 and 18.

In the alternative leg embodiment of FIGS. 42 and 43, coarse adjustment is thus provided by the two spaced apertures 332A and 332B in the leg receiver 302 and by a single pair of aligned apertures 334 in the lower leg member 304. The upper and lower leg members 302 and 304 respectively may alternatively be referred to herein as leg receiver and leg (or leg member) respectively. Thus, there are two positions of course adjustment. A longer position of course adjustment is illustrated in FIG. 42 wherein the apertures 334 (FIG. 43) are aligned with the lower aperture 332A and the pin 336 inserted in these aligned apertures as well as the respective aligned aperture in the bunk. For a shorter position of course adjustment, the apertures 334 are aligned with the upper aperture 332B and the pin 336 inserted in these aligned apertures as well as the respective aligned aperture in the bunk. It should of course be understood that for more positions of coarse adjustment, if desired, there may be more than the two apertures 332. If no coarse adjustment is desired and only fine adjustment is desired, then it is envisioned that the leg 304 may more permanently be directly suitably secured to the bunk 72.

Removable Tow Bar

Figure 20:
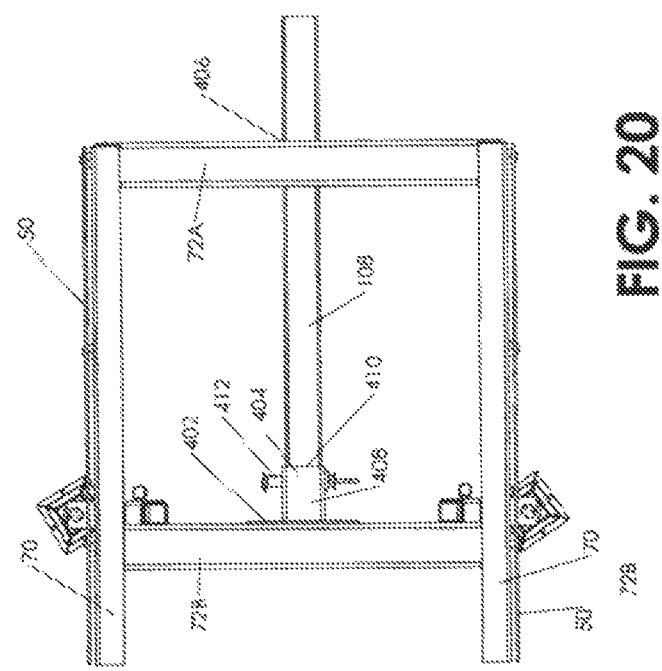
FIG. 20 is a close-up view showing the attachment of the tow bar to the base of the sawmill of FIG. 4.
Figure 19:
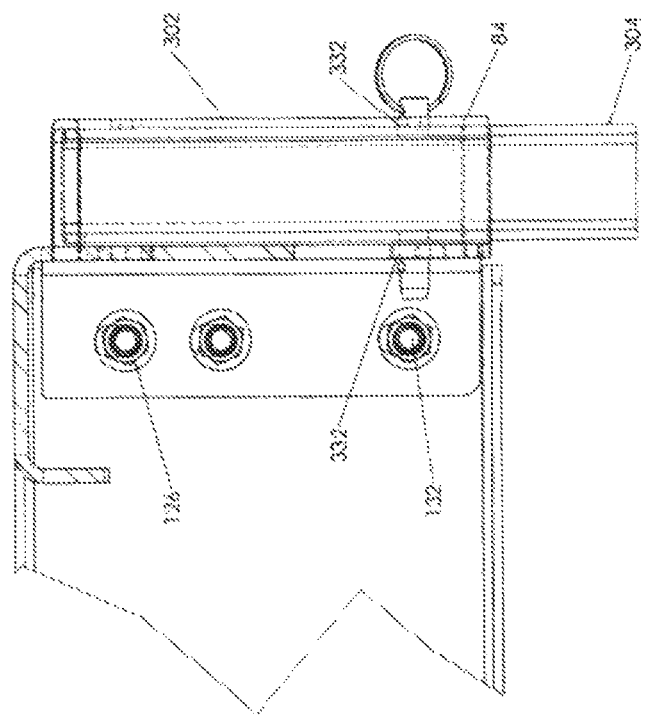
FIG. 19 is a close-up view showing the attachment of one of the legs to the base.

FIGS. 4 and 20 show the tow bar 108 for a sawmill base 33 without the extensions 104 or 105. Thus, the tow bar 108 extends from the second bunk 72B from the base front through the front bunk 72A and beyond the front bunk 72A to a point of termination at a suitable conventional device, illustrated at 400, for attaching thereof to a towing vehicle. The tow bar 108 is an elongate member which is generally square (or rectangular or otherwise suitably shaped) in cross section to prevent its rotation.

A plate 402 has welded thereto box-shaped member 404 composed of four walls 408 (one seen in FIG. 20 and two seen in FIG. 4) which define an opening, illustrated at 410, sized to snugly receive the tow bar 108. The plate 402 is suitably fastened, such as with fasteners 403, to the front of the bunk 72B with the box-shaped member 404 facing forwardly therefrom near the lower edge of and centrally of the width of the bunk 72B. The forward bunk 72A has an opening at 406, near the lower edge of and centrally of the width of the bunk 72A, which aligns with the opening 410 to receive the tow bar 108. Thus, the inner or aft end of the tow bar 108 is received in box-shaped member 404 flush with the bottom thereof, and the tow bar 108 is attached to the box member 404 by a removable pin 412 (not seen in FIG. 4) received in apertures 414 (one seen) in a pair of oppositely positioned walls 408 of the box member 404 and in an aperture or apertures (not shown) in the tow bar. The pin 412 is preferably a clevis pin to prevent it from inadvertently coming loose and being removed. The tow bar 108 extends from the box-shaped member 404 forwardly through the opening 406 and beyond to terminate at the towing device 400. If desired or needed, another such plate and box-shaped member may be provided on the front of the front bunk 72A for receiving the tow bar 108.

To get the tow bar 108 out of the way for use of the sawmill 30, if necessary, the pin 412 is removed and the tow bar 108 slid forwardly and out. To re-attach the tow bar 108 for towing, it is slid back in through opening 406 and into the box-shaped member 404 to bottom out at plate 402 and the pin 412 inserted to re-attach the tow bar 108 to the box-shaped member 404.

FIGS. 1 to 3 show the tow bar 108 for a sawmill base 32 with the front extension 104. The plate 402 for this embodiment of the base 32 is attached to the bunk 72D next to the forward structural member 72C of the base central portion 102. Box member 404 is attached to the plate 402 similarly as discussed for FIGS. 4 and 20, and detachably receives the tow bar 108 similarly as discussed for FIGS. 4 and 20. The tow bar 108 passes through an opening 407 (FIG. 2) and beyond the opening 407 similarly as tow bar 108 passes through and beyond the opening 406 in FIGS. 4 and 20. The tow bar 108 can be removed from and re-attached to the foldable base 30 similarly as described for the tow bar 108 of the base 31 without extensions in FIGS. 4 and 10.

As best seen in FIG. 6, the front extension 104 has a second structural member 72F rearwardly of the front structural member 72E. When the front extension is unfolded as in FIGS. 1 and 3, the tow bar 108 ends short of the front structural member 72E thereof and is thereby covered so that it need not be removed for use of the sawmill. The structural members 72E and 72F of the front extension 104 have suitably shaped recesses, illustrated at 422, or squared openings or the like in their lower edges to allow space for passage of the tow bar 108 when the front extension 104 is unfolded over the structural members 72E and 72F for use. For towing the sawmill 30, the forward extension 104 is folded up thereby exposing the tow bar 108 ready for being hooked to a towing vehicle for towing.

If desired, the rear extension 105 may be similarly set up to receive a tow bar 108.

Each extension 104 and 105 may have an easy to handle length of, for example, about 42 to 48 inches. The mechanics of a sawmill allow the sawing of a log up to about 2 feet from each end of the sawmill. The forward and rear extensions accordingly may allow the cutting of logs up to about 8 feet longer than otherwise.

Push and Go

Sawmill carriages have been provided wherein a lever associated with the push bar 44 and operating a pull cable is engaged along with the grasping of the push bar 44 to activate a cooling water valve for the blade 36 in addition to activating the throttle for the engine 46.

Figure 25:
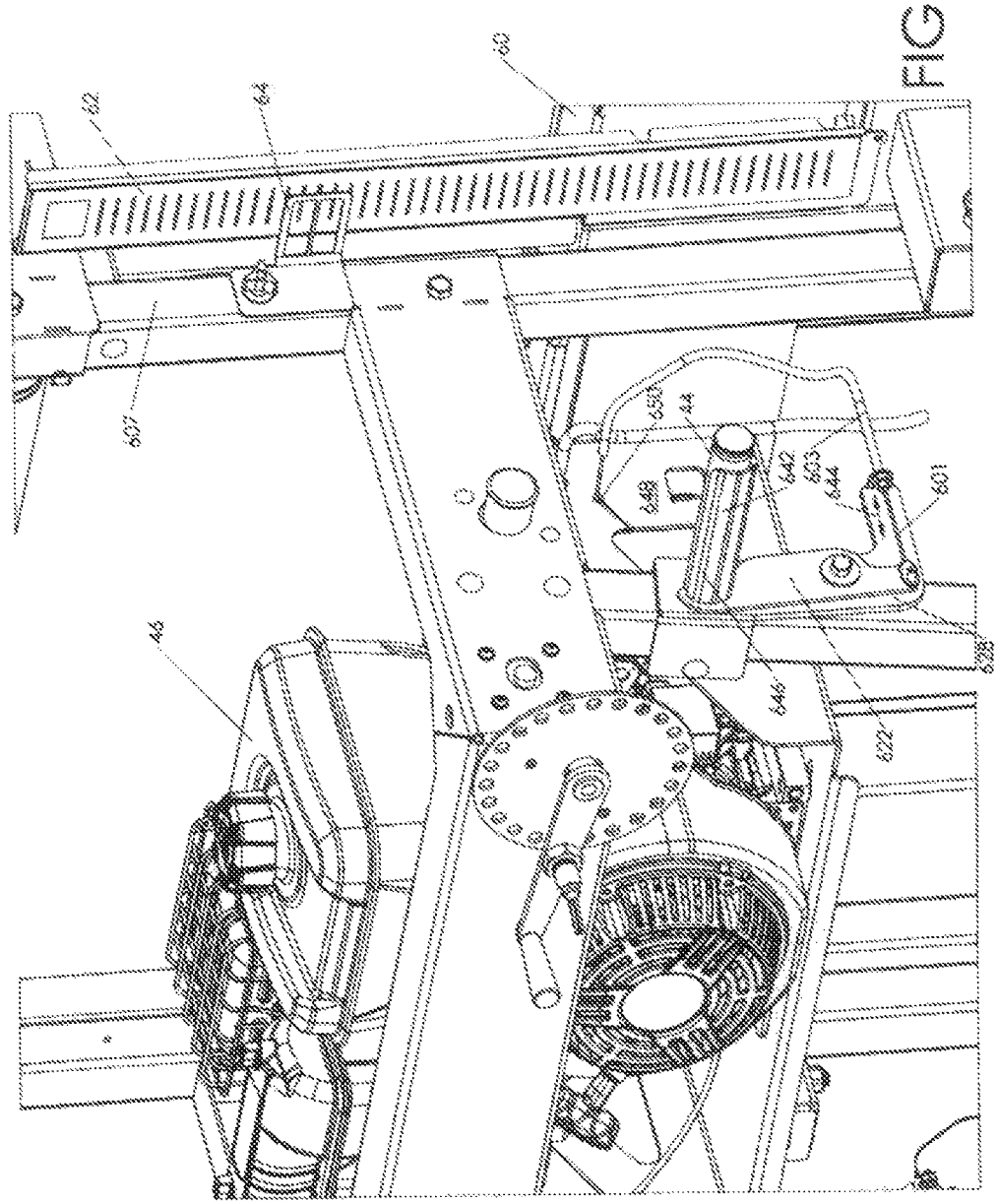
FIG. 25 is a detail perspective view of a portion of structure including a push bar for pushing the saw head along the rails and a plate movable for engaging the push bar for operating the throttle and other devices while the saw head is being pushed along the rails.
Figure 26:
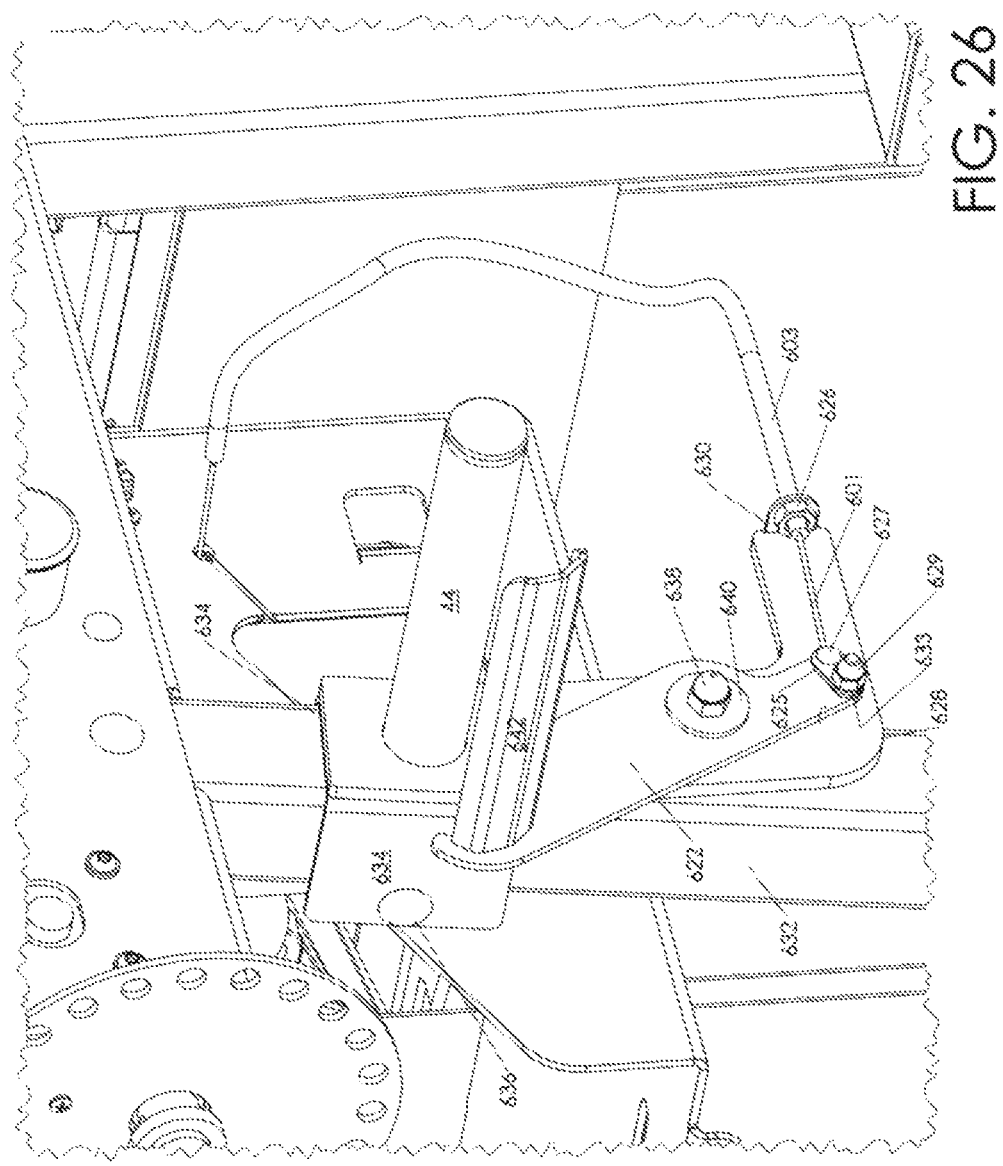
FIG. 26 is a close-up detail perspective view of the plate and push bar for the structure of FIG. 25.
Figure 27:
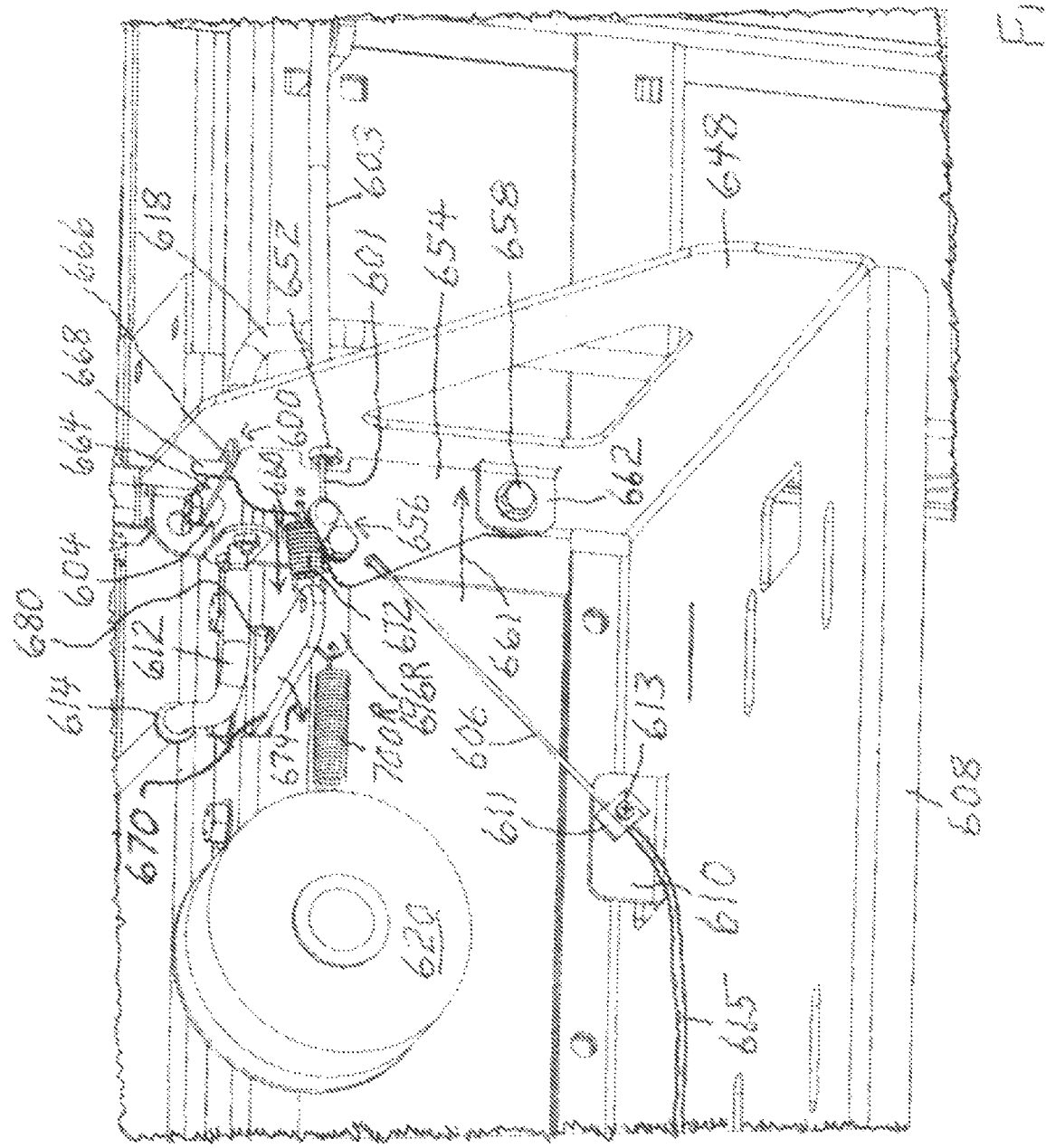
FIG. 27 is a detail perspective view of another portion of the structure of FIG. 25, including devices for operation of a water valve and brake engagement lever for the guide rails and for the throttle.
Figure 28:
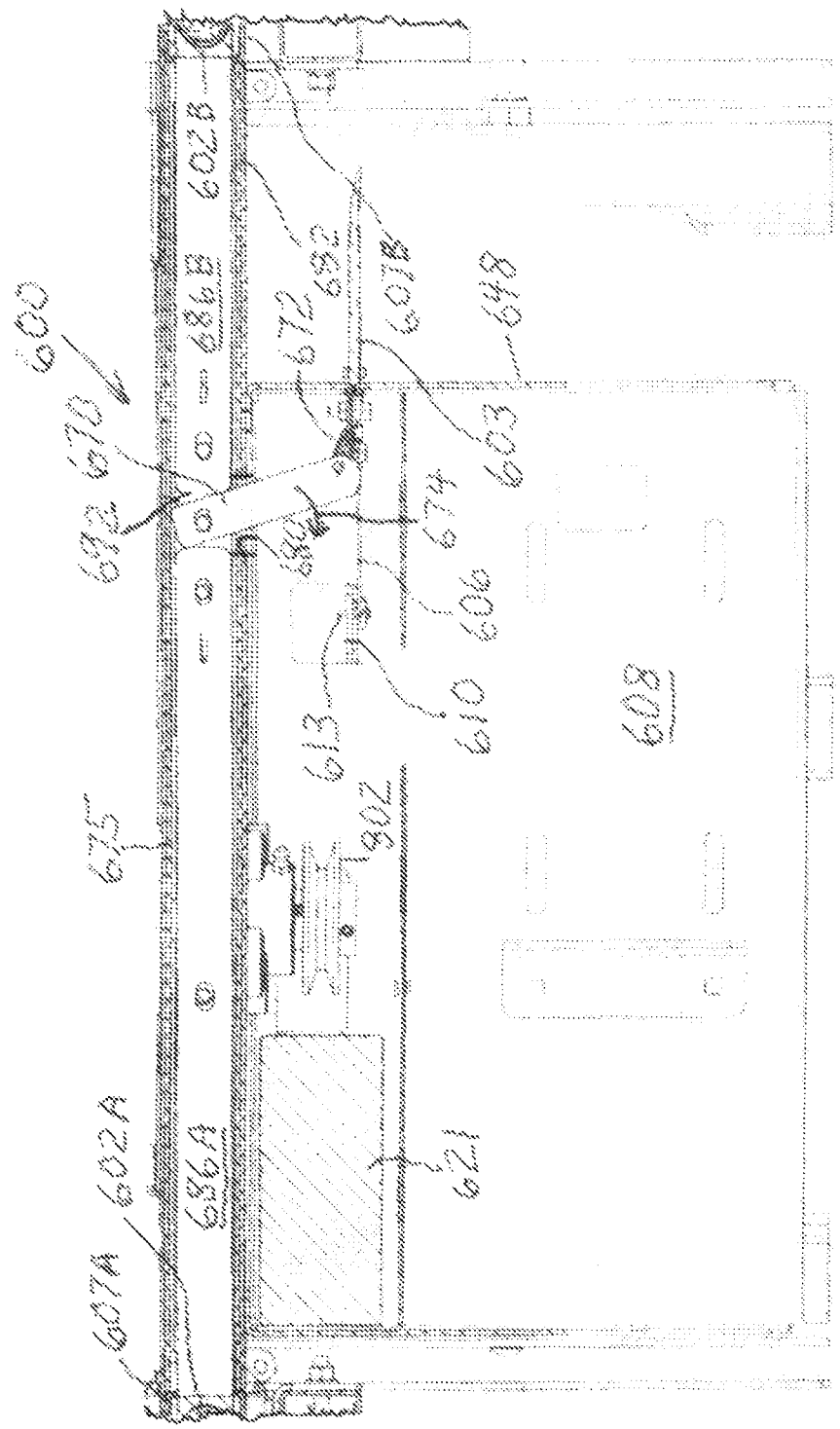
FIG. 28 is a detail plan view of another portion of the structure of FIG. 25, including brake arms and their engagement by the brake engagement lever, and showing the guide rails engaged by the brake arms.

Referring to FIGS. 24 to 33, in order to activate the saw blade cooling water valve 604 and to simultaneously operate the throttle control plate to activate the throttle (not shown) for the engine 46 for sawing as the operator engages the push bar 44 to move the carriage 34 for a cutting pass, there is illustrated at 600 an arrangement, utilizing a pull cable 601 enclosed as suitable in protective sheathing 603, for activating the engine throttle via the pull cable 606, wherein the throttle for the engine 46 is operated in accordance with principles commonly known by those of ordinary skill in the art to which this invention pertains, and for activating the cooling/lubricating water valve 604 so that the operation of the saw head 60 is easier and more efficient. The engine 46 is received on the engine base plate 608 and is not shown in FIG. 27 for purposes of clarity, and an engine drive clutch, which drives with a belt pulley 806 (FIG. 31, belt not shown for ease of illustration, and FIG. 36), is illustrated at 802. As shown in FIGS. 27 and 28, clamp 611 secures by suitable means such as, for example, screw 613 an end of cable sheathing 615 to a sheet metal embossment or flap 610, desirably oriented vertically as shown. The cable 606 passes through the protective sheathing 615 on its way to the throttle control plate 714 (FIG. 24) of the engine 46, passing to the other side of the belt cover 822 where it is secured by cable tie 715, then the other end of the sheathing is secured by another clamp 717, with the cable 606 extending out of the sheathing 615, and its end suitably secured to the engine throttle control plate 714. The engine throttle is actuated for cutting of wood by pulling on the cable 606 by the movement of control cam 654 in the engagement direction illustrated at 661, and pulling the cable 606 as well as the engine throttle control plate 714 in the direction illustrated at 718 for actuating the engine 46 for cutting wood. A suitably attached return spring, illustrated schematically at 719, is suitably attached to the engine throttle control plate 714 to apply tension thereto to pull the cable 606 in the opposite direction to direction 718 to return the engine throttle control plate to the throttle de-activation position to de-activate the engine 46 as well as to move the control cam 654 in the de-activation direction 660, in a manner well known to those of ordinary skill in the art to which this invention pertains.

A compartment or housing for the battery is shown at 621 in FIG. 28. Referring to FIG. 27, the water valve 604 receives water via water inlet hose 612 from a water tank 800 discussed hereinafter. The hose 612 passes through a grommet 614 which is provided to protect it from surrounding sheet metal. The water valve 604 discharges water through hose 618 for application to cool the saw blade 36 in a manner commonly known to those of ordinary skill in the art to which this invention pertains. An engine drive clutch is illustrated at 620.

Referring to FIGS. 25 and 26, the pull cable 601 is suitably guided through a hole (not shown) in a flange 630 which extends at right angles to a plate 628 and through nuts 626 attached thereto on opposite sides respectively of the flange 630 and aligned with the hole. The pull cable 601 is anchored at one end to a lower end portion of a generally vertical engagement lever 622 by a suitable clamping mechanism 624 wherein one end portion of a plate 625 is rotatably secured to engagement lever 622 by a suitable screw (not seen) and nut 629, with a suitable number such as a pair of washers 633 between the engagement lever 622 and plate 625, spacing the plates 622 and 625 apart to allow suitable movement of plate 625. The head (not shown) of this screw bears against the fixed plate 628 to allow suitable movement of the engagement lever 638 (discussed hereinafter). A suitable barrel 627 is rotatably received in an aperture (not seen) in the other end portion of the plate 625 so that a portion of the barrel 627 is trapped between the plate 625 and the engagement lever 622. The end of the pull cable 601 is secured to the barrel 627 by forming a molding of the barrel 627 on the end of the cable 601 during a conventional cable manufacturing process. The flange 630 is part of or suitably attached to the plate 628, which is fixedly attached to a cross-sectionally square post 632 via a member which wraps partly around the post 632 and has a pair of flanges 634 which are suitably secured thereto, as by a bolt or other fastener received in holes 636 in both flanges 634 and may be otherwise suitably fixed thereto. The engagement lever 622 is suitably pivotally attached to fixed plate 628 by a flat-headed hex drive screw (not seen) which passes through an aperture in fixed plate 628, then through a nylon wear washer (not seen) between the plate 628 and engagement lever 622, then through an aperture (not seen) in engagement lever 622, then through a washer 640, and an acorn nut 638 is threadedly received on the shank of this screw. The position of this acorn nut pivot point 638 is selected to achieve the desired length of pull of the pull cable 601 when the lever 622 is actuated, in accordance with principles commonly known to those of ordinary skill in the art to which the present invention pertains. As used herein and in the claims, a "cable" is meant to include a rope or cord, whether or not made of steel wire (although the cables herein are preferably made of a bundle of steel wires), or to include any other elongate flexible member which can be attached at one end to an object for exerting a pull on the object. Suitably attached to the upper end portion of the engagement lever 622 such as by welding is an end of a partially cylindrical plate 642 which engagingly conforms to or fits a curved or partially cylindrical portion of the cylindrical push bar 44 when the upper end portion of the engagement lever 622 is moved toward the push bar, thus pulling the pull cable out the desired distance, illustrated at 644, which may be, for example, about ⅝ inch. This curved plate 642 serves as an actuation lever. Thus, the operator can pull the pull cable 601 out the desired distance by pushing on the actuation lever 642 from its position shown in FIG. 26 spaced from the push bar 44 to its position as shown in FIG. 25 where it is snugly against and fitted to the push bar 44. As part of the process of grabbing onto the push bar 44 to push it forward for sawing, as seen in FIGS. 25 and 26, the operator pushes the actuation lever 642 to engage the push bar 44 and holds on to the actuation lever 642 and push bar 44 together while, with the desired stability, pushing the carriage to effect the cutting of wood. The actuation lever 642 is ridged, as illustrated at 646, for better grip. The pull cable extends thru a hole, illustrated at 650, in frame wall 648 and including nuts 652 (one shown in FIG. 27) on both sides of the wall 648 and aligned therewith and is shown to continue on in FIG. 27.

Referring to FIGS. 27 and 28, the pull cable 601 is anchored at its other end to the previously discussed plate, which may be called a control cam 654, via an attachment means 656 which is similar to attachment means 624. The control cam 654 is pivotally attached at its bottom end portion to a pair of plates 662 (one seen, the plates 662 being on opposite sides of the control cam 654) which are welded or otherwise suitably attached to the plate 648 and extend normal thereto. The control cam 654 is attached to tab 662 of member 648 via by means of a pivot fastener or cam pivot 658, which serves as a fulcrum about which the cam 654 turns, as further discussed herein, in accordance with principles commonly known to those of ordinary skill in the art to which this invention pertains.

As previously discussed, the upper portion of the control cam 654 is seen in FIG. 27 to be positioned in an engaged position with the pull cable 601 having been pulled by the operator's operation of actuation lever 642 to the position shown in FIG. 25 to pivot an edge of the control cam 654 against the plate 648 and initiate operation of the saw head 60.

The pivoting movement of the control cam 654 to the engaged position effects pulling movement on the engine throttle cable 606 to actuate the engine throttle, as previously discussed. The water valve 604 is open and shut by a link 664 attached thereto at one end and having a slot 666 near its other end. The control cam 654 has a vertical tongue 668 extending vertically from its upper end. The tongue 668 is received loosely in the slot 666. As the control cam 654 is moved between the engaged and disengaged positions, the link 664 is rotated between water valve open and closed positions respectively, it being shown in the open position in FIG. 27. Thus, by movement of the actuation lever 642 to engage the push bar 44, the water valve 604 is opened to provide water to the saw blade simultaneous with actuation of the throttle for sawing.

In order to position the saw head 60 for sawing, it has a pair of cylindrical elongate guide rails 602A and 602B (collectively 602) received in the respective bores 605 of low friction guide blocks 609, which may be composed of a suitable polymer material, for example, high density polyethylene (HDPE) material, for vertical movement therein. The guide blocks 609 are suitably encased in cross-sectionally square or otherwise suitably shaped guide rail tubes 607 respectively for vertical movement of the rails 602 within the tubes 607.

The elevation of the saw head 60 must be adjusted between sawing passes, but it must be kept firm during sawing, should it hit a nail or the like. In order to do this, the saw head 60 in prior sawmills has been unlocked from the frame by lifting lock handles to un-clamp the saw head guide rails. During sawing, the saw head of prior sawmills has been locked to the frame by pushing the lock handles downward to apply clamping force to the guide rails during sawing. This undesirably requires the operator to move around and separately unlock and lock the saw head between sawing passes.

It was discovered during development of the present sawmill that the saw head may be sufficiently stable during sawing passes to not require its being locked and unlocked but such locking and unlocking may nevertheless be optionally desired in order to insure stability during cutting passes. In order to eliminate the additional step by the operator of having to un-lock and lock the saw head 60 between sawing passes while continuing to allow the operator to control the un-locking and locking of the saw head 60, in accordance with the present invention, the arrangement 600, which may be called a push and go arrangement, also includes means, also actuated by the pull cable 601, for applying force or braking or clamping to the saw head guide rails 602 to maintain their vertical positions during sawing and to un-clamp the saw head guide rails 602 to allow their height adjustments for another sawing pass.

Figure 31:
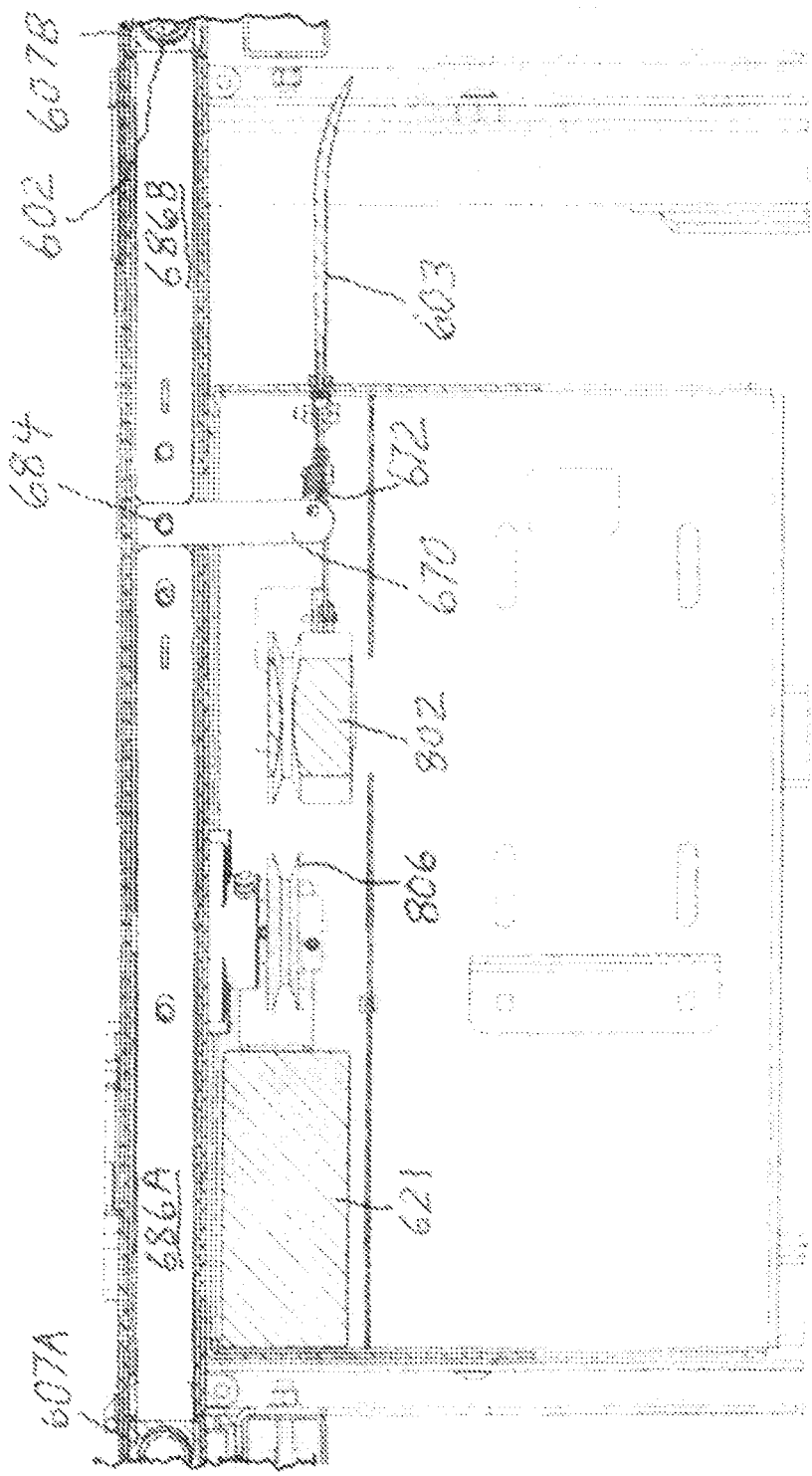
FIG. 31 is a view similar to that of FIG. 28, showing the guide rails disengaged by the brake arms.

To lock and unlock the saw head 60, a brake engagement lever 670 is connected to the control cam 654 by a spring 672. The brake engagement lever 670 is shown in a position in FIG. 27 (as well as FIGS. 28 and 29) wherein the saw head 60 is locked, achieved by the operator grasping the actuation lever 642 to the push bar 44. When the actuation lever 642 is released by the operator, the brake engagement lever is pivoted to a position, as illustrated at 674 in FIG. 27 and as also shown in FIGS. 31 and 32, wherein the saw head 60 is un-locked.

Figure 29:
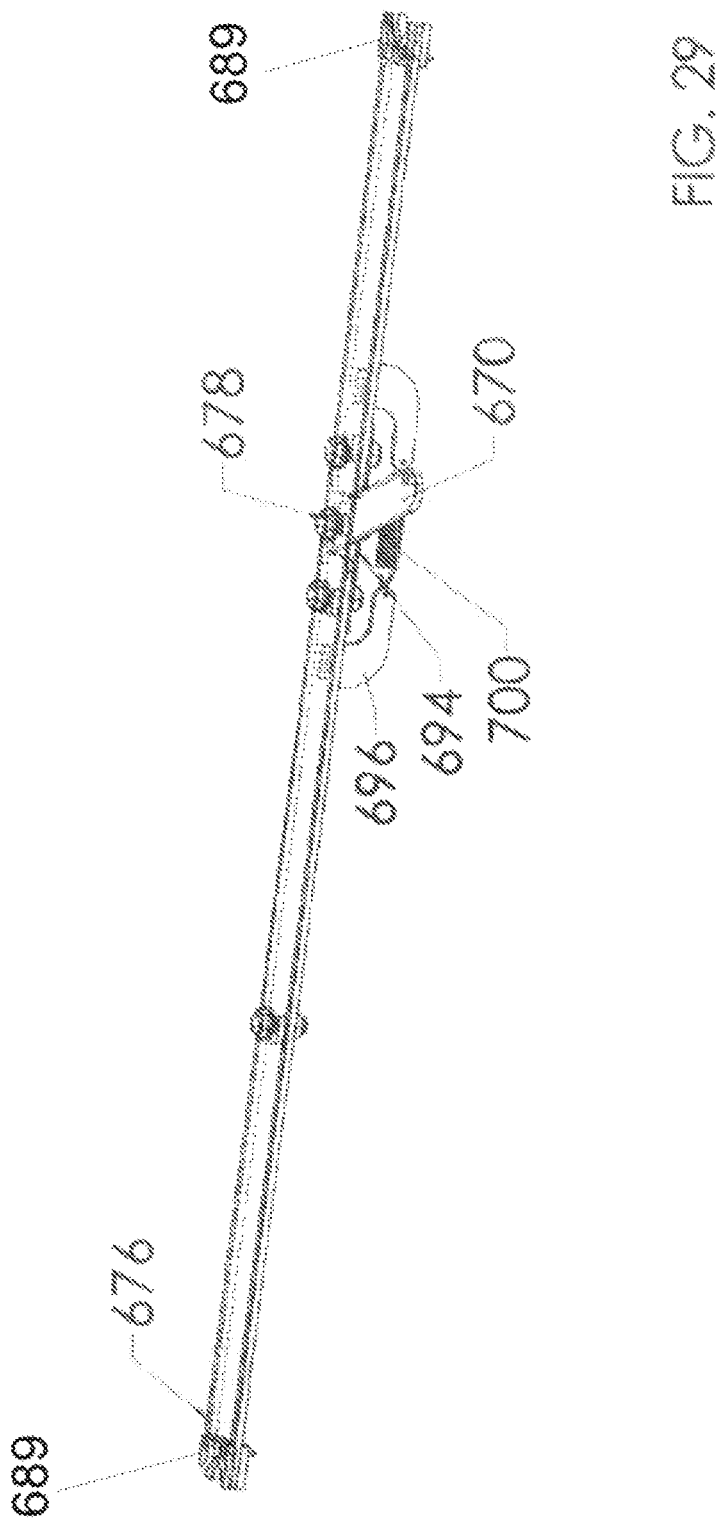
FIG. 29 is a detail perspective view of the brake arms and their engagement by the brake engagement lever, and showing the brake arms in position for engagement of the guide rails.
Figure 32:
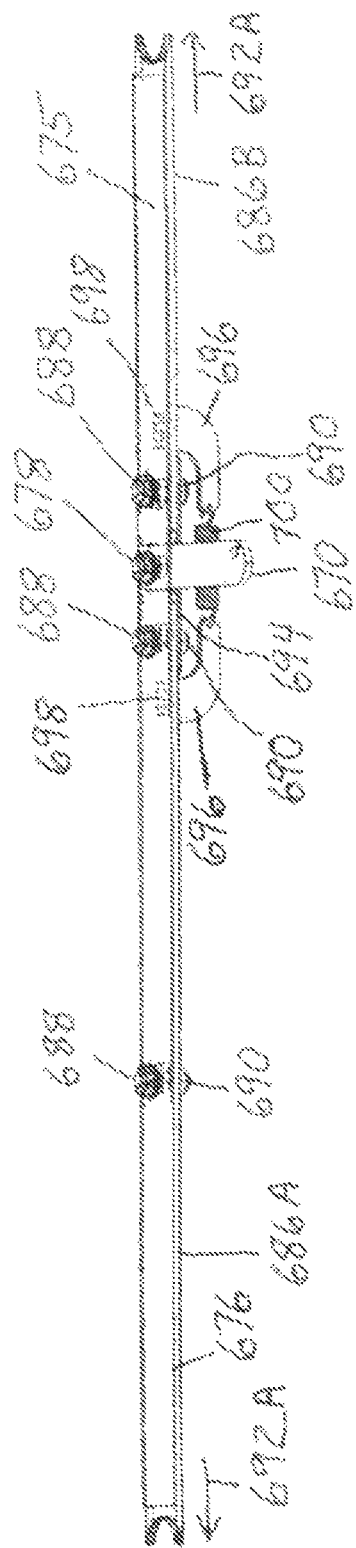
FIG. 32 is a view similar to that of FIG. 29, showing the brake arms in position for their disengagement from the guide rails.

Referring to FIGS. 28 and 29 and 32, an elongate housing 675 extends between the left and right guide rail tubes 607A and 607B respectively. The housing 674 includes both upper and lower plates 676 and 682 respectively and other plates as suitable. An end portion of the brake engagement lever 670 is received within the housing 674 and pivotally attached thereto by a suitably fastener 678, providing pivot point 684, in a manner commonly known to those of ordinary skill in the art to which this invention pertains. There is a gap 680 in the housing 674 on one side for passage of the brake engagement lever 670 and to allow its pivotal movement. A pair of left and right elongate plates or brake arms 686A and 686B respectively (collectively 686) are received within the housing 674, one arm such as 686B being shorter than the other arm 686A to allow the brake engagement lever 670 to be suitably positioned. The longer left brake arm 686A is slidably attached to the housing 674 by a pair of bolts 688 received in suitably spaced apertures (not shown) respectively in the upper and lower housing plates 676 and 682 respectively and in similarly spaced apertures (not shown) in the arm 686A, the apertures in the brake arm being oval in shape to allow longitudinal movement thereof relative to the housing 674. The bolts 688 are applied to be slightly loose with nylon lock nuts 690 applied so as to permit sliding but snug movement of the brake arm 686A. One of the bolts 688 is generally midways of the length of the brake arm 686A, and the other bolt 688 is near the end of the brake arm which is next to the brake engagement lever 670 so as to provide stability where the brake engagement lever 670 engages the brake arms 686. The shorter right brake arm 686B is similarly slidably attached to the housing 674, but with just one bolt 688, which is located near the end of the brake arm which is next to the brake engagement lever 670. The corners 692 of the brake arms 686 adjacent the brake engagement lever 670 are suitably rounded (best seen in FIG. 28) to allow pivotal movement 674 of the brake engagement lever 670 to simultaneously push both brake arms outwardly a small distance as seen from their positions in FIG. 32 to their positions in FIG. 29 to clampingly engage the guide rails 602, as discussed hereafter.

A nylon wear plate 694 extends beneath the brake engagement lever 670 and adjacent end portions of the brake arms 686 and is held in place by the fastener 678 and the bolts 688 (but not the left-most bolt in FIG. 32). A pair of brackets 696 extend through oblong holes (not seen) in the lower housing plate 682 adjacent the respective bolts 688 (the ones which are adjacent the location of the brake engagement lever 670) with their ends suitably attached, as indicated at 698, to the brake arms 686 respectively. The other ends of the brackets 696 are joined by a brake return spring 700, the above indicated holes in the lower housing plate 682 being sufficiently oblong in shape to allow the return movement of the brake arms 686 respectively from their braking position of FIGS. 28 and 29 to their position of FIG. 32.

FIG. 32 shows the brake arms 686 positioned to disengage the guide rails 602 respectively. FIG. 29 shows that the brake engagement lever 670 has been pivoted to push both brake arms outwardly, as illustrated at 692A in FIG. 32. FIG. 33 shows one of the guide rails 602 disengaged by the respective brake arm 686, as illustrated by the gap 691, so that the height of the saw head may be adjusted, and FIG. 30 shows one of the guide rails 602 engaged by the respective brake arm 686 to clamp or brake the saw head so as to stabilize and prevent vertical movement thereof while sawing.

Referring to FIGS. 30 and 33, the clamping end of each brake arm 686 has attached thereto, by a pair of pop rivets (not shown) or other suitable fasteners, a brake pad 689 (FIG. 29) on each of its upper and lower surfaces. Each brake pad 689 has a concave curvature, illustrated at 706, to conform to and provide a tight clamping engagement with the guide rail 602. Each guide rail 602 is composed, for example, of steel, and each brake pad 689 is composed of a suitable frictional material, i.e., one which has a high mating coefficient of friction with the guide rail material, such as, for example, rubber for the steel guide rail. There is a gap 711 between the guide rail 602 and the bore 605 of the guide block 609 to allow suitably easy or gliding vertical movement of the guide block 609 relative to the guide rail 602 therein. On the brake arm side of the guide rail tube 607, a slot, illustrated at 710, is provided in the guide rail tube 607 to receive the brake arm 686. FIG. 33 shows the brake pads 689 disengaged from the respective guide rail 602, as indicated by the gap 691. Thus, in this instance, the saw head 60 may be freely moved vertically to a different position for sawing. FIG. 30 shows the brake pads 689 engaged to the respective guide rail 602, as indicated by the absence of the gap 691, for applying braking force to the respective guide rail 602. Thus, in this instance, the saw head 60 is clamped so that it cannot move vertically during sawing even if there is a nail in the log or the like.

In the single step of moving the actuation lever 642 (FIG. 25) into a coupling or engaging relationship with the push bar 44, as seen in FIG. 25, ready for a sawing pass, the pull cable 601 is pulled to effect pivoting movement of the control cam 654 (FIG. 27) which then simultaneously, without other action required of the operator, (1) effects pivoting movement of the brake engagement lever 670 to clamp the guide rails 602 (FIG. 30) to prevent vertical movement of the saw head 60 during sawing, (2) actuates the engine throttle via cable 606 (FIG. 27), and (3) opens the saw blade cooling water valve 604 (FIG. 27). The pivotal movement of the control cam 654 may also be effected to perform other functions such as the hereinafter discussed activation of the discharge chute or to perform another group of the above or other functions.

Upon completion of a cutting pass, the operator moves the actuation lever 642 away from the push bar 44, as seen in FIG. 26, to inactivate the throttle and to simultaneously, without any action needed on the part of the operator, un-clamp the saw head (FIG. 33) so that it may be moved vertically into position for another sawing pass, and also close the cooling water valve, and/or perform another function or functions such as inactivation of the discharge chute. When the actuation lever 642 is released by the operator, the control cam 654 is returned to throttle shut-off position by return spring 700R (which is attached to member 696R which is in turn suitably attached to the control cam 654), whereby the control cam 654 is pivoted outwardly from the plate 648, as illustrated at 660. The brake engagement lever 670 is returned by return spring 700 to the brake disengaged position by its movement as seen at 674 in FIG. 27. This effects movement of the lever 664 to shut the water valve 604 off. As is conventional practice for small combustion engines, the return spring 719 on the engine throttle mechanism releases the throttle to stop the cutting. Thus, an additional step or steps are eliminated for an easier, quicker, and more efficient sawing operation, while also eliminating the possibility of inadvertent error by the operator.

Blade Tensioning Device

Referring to FIGS. 34 to 37, the saw blade 36 is driven by a pair of bandwheels 39 (one shown in FIG. 36) which are rotatably received, by means of bearing hubs 720 (also illustrated in FIG. 34), on stationary bandwheel spindles 724. The bandwheels 39 are contained within bandwheel housing which includes covers 826 and 828. One of the spindles 724 passes through blade tensioner housing 726 and through the spindle housing 728, and the blade tensioner housing 726 is suitably secured to the saw head frame. At 730 is shown a cut-out in a frame member of the tensioner housing 726. Similar cut-outs are provided in other frame members through which the spindle passes.

The saw mill cutting blade 36 requires a specific tension for proper cutting and blade longevity. Tension has previously been applied with the use of a torque wrench, but the difficulty with this is that the applied tension would in time be reduced and the operator would have to periodically re-torque to again achieve the required tension. In order to adjust the tension on the blade 36 to the required tension without having to periodically re-adjust the tension, in accordance with the present invention, a tensioner device 732 is connected to the spindle 724 to apply force to move the spindle 724 laterally within the limits of the cut-outs 730. Thus, the spindle 724 may be moved laterally within the cut-outs 730, as illustrated at 734.

A bolt 736 connects opposite frame members of the tensioner housing and passes through the spindle 724 to thereby prevent the spindle 724 from rotating. The passages 738 in the frame members through which the bolt 736 passes are suitably over-sized to permit the bolt to slide along with the spindle 724. A captivation washer 740, which is a washer large enough to cover the passage 738 adjacent the bolt head to keep it clear of foreign debris, is provided for the bolt head. A nut 742 with suitable washer 744 threadedly engages the bolt shank to achieve a tight yet slidable fit.

One end portion of a threaded clevis or rod 746, which has, for example, a ¾-6 acne thread, is threadedly received in an aperture 748 in the central portion 752 of a yoke 750 and welded thereto, whereby the threaded clevis 746 does not rotate. The arms 754 of the yoke 750 surround the bandwheel spindle 724, and the bolt 736 is received in apertures 756 in the yoke arms 754. A spring 758 is used to prevent chatter and add stiffness for the tracking adjustment on the bandwheel spindle. Thus, axial movement of the clevis, as illustrated at 760, effects movement of the bandwheel spindle 724 laterally, as illustrated at 734, to adjust the tension in the saw blade 36.

The other end portion of the clevis 746 extends through a hole 762 in the tensioner housing 726 and is threadedly engaged in a threaded bore 764 of a thrust adapter 766 in a cylindrical housing 768.

To achieve the specific tension on the saw blade 36 for proper cutting and blade longevity, in accordance with the present invention, a self-limiting (automatic) torque driver or torque limiter 770 is coupled with the thrust adapter 766 to adjust the blade tension via the threaded acne clevis 746 affixed directly to the bandwheel spindle 724. By turning the torque limiter 770, with a wrench applied to torque limiter protrusion 772, clockwise (tighten) or counterclockwise (loosen), the bandwheel spindle 724 and the bandwheel in its entirety is moved, thus to effectively change the blade tension. The bandwheel spindle 724 is allowed to pivot on a single bolt 780 which allows for a finite tracking adjustment via the bolt 780 applying side force on the rearward most part (against a seat) of the bandwheel spindle 724. The bolt 780 is received through an aperture in the spindle housing 728. A pocket cutout 786 in the floor of the spindle housing 728 is provided for sawdust evacuation.

The thrust adapter 766 connects/transmits rotary motion of a square male end portion 774 (opposite the wrench-receiving portion 772) of the torque limiter 770 to the clevis 746, providing threads in its threaded bore 764 to match or mate with the clevis threads. A suitable compression spring 776 is received between the thrust adapter 766 and the wall of the tensioner housing 726. The spring 776 may, for example, be a solid polyurethane rubber die spring. The spring 776 is provided to take up any excess "slack" in the system while creating residual force to compensate for opposing forces generated from cutting blade tension. A suitable thrust bearing 782, such as, for example, a needle thrust bearing, and washer 784 are received between the thrust adapter 766 and the spring 776. The torque limiter 770 is held in the housing 768 by a suitable retaining ring 788.

As the torque limiter 770 is turned by applying a wrench to the protrusion 772, it effects turning of the thrust adapter 766. As the thrust adapter 766 rotates, it effects, by means of the engagement of the mating threads of the clevis 746 and the thrust adapter 766, movement of the clevis axially, as illustrated at 760, to thereby adjust the position of the spindle, as illustrated at 734, to adjust the blade tension. As the spindle 724 is moved forwardly (to the right in FIG. 36), the amount of torque increases as the tension of the saw blade 36 increases, and this torque is sensed by the torque limiter 770, which is set to "click" or not allow the torque to increase beyond a certain amount related to the required tension of the saw blade 36, in accordance with principles commonly known to those of ordinary skill in the art to which this invention pertains. The torque limiter 770 may be any suitable torque limiter, for example, the PERF-A-TORQ #12B torque limiter ½" sold by the X4 Corporation of West Acton, Mass. Thus, the operator tightens the torque limiter 770 till it "clicks," and that is the pre-set torque for the desired blade tension.

Figure 35:
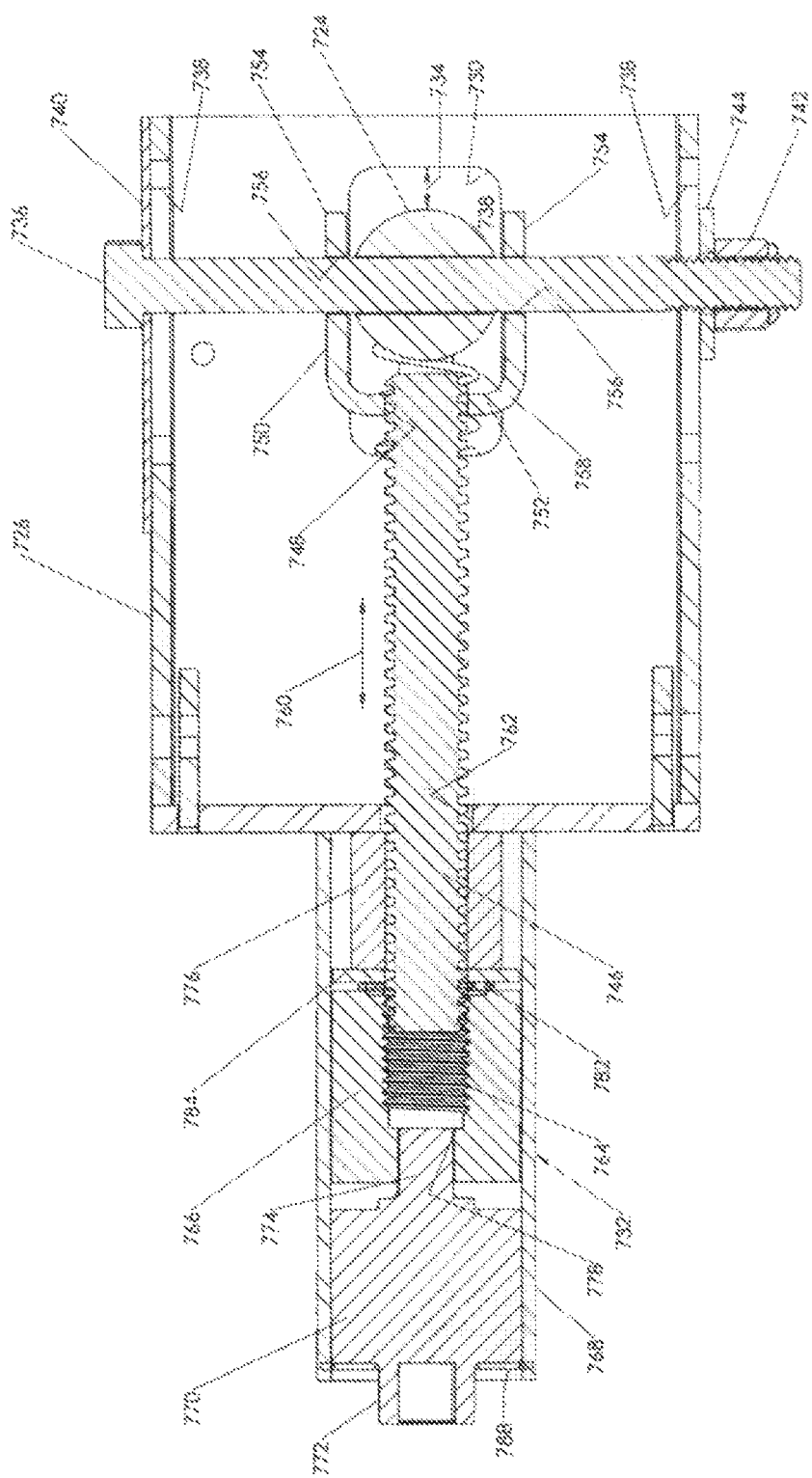
FIG. 35 is a sectional view, taken along lines 35-35 of FIG. 34, of the tensioner.

As the tensioner device 732 is shown in FIG. 35, minimal torque is being applied since the clevis 746 cannot move further to the left (as viewed in FIG. 35) due to the shoulder 778. Thus, the clevis 746 can move forwardly (or to the right in FIG. 35) by the distance illustrated at 734, which, for example, may be about ¼ inch.

Thus, the non-rotatable elongate threaded rod 762 is caused by the torque limiter 770 to move longitudinally, which effects movement of the yoke 750 and thus the bolt 736 and spindle 724 in a direction 734. As the distance between the spindles is increased, the tension on the saw blade is increased, and the operator of the saw mill may desire this tension to be a predetermined amount. Member 766 is threaded engaged to the threaded rod 762 to effect the longitudinal movement thereof. The torque limiter 770 is attached to the member 766 to effect rotation of the member as the torque limiter is rotated by application of a wrench to the nub or portion 772. Accordingly, the torque limiter 770 is adjusted to limit the amount of torque applied to the member 766 to a torque which provides a predetermined amount of tension to the saw blade.

Jackshaft

In prior saw mills, the band wheels 39 were driven by means of a belt directly from the drive clutch 802 to one of the band wheels 39. Since the engine 46 would output to the drive clutch at a constant specific speed which is typically 3600 rpm (revolutions per minute), the speed of the saw blade 36 would have to be a related specific speed, which translates to typically 3,775 feet per minute. Such a blade speed is not considered to be able to cut wood as well as desired. A higher blade speed of desirably between about 4,200 and 4,800 feet per minute, based on the type of wood, is considered to provide improved cutting. To achieve such an ideal blade speed, the pulley speed delivered to the band wheel should be ramped up so that the blade speed is within the range of about 4,200 to 4,800 rpm, depending on the type of wood being cut. But the blade speed in such prior saw mills has been undesirably limited to the size of the drive clutch. There has been a long felt need to improve the quality of the cut wood. In addition, in prior saw mills, in order to run a belt from the drive clutch to the band wheel 39, the drive clutch of necessity has been placed within the band wheel housing where it is undesirably exposed to saw dust and debris generated from the saw blade when cutting thus undesirably resulting in the need for frequent replacement of the drive clutch.

Referring to FIGS. 36 and 37, in order to vary the blade speed to a more ideal speed for specific wood being cut as well as to better protect the drive clutch, illustrated at 802, in accordance with the present invention, a jackshaft assembly, illustrated generally at 800, is provided between the drive clutch 802 and the band wheel 39. Belts are shown schematically and bearing mounting plates and safety covers/guards and other extraneous components are removed from FIG. 36 for purposes of clarity. The drive clutch 802 is suitably mounted to the shaft 814 of the engine 46, which may be an internal combustion engine, in accordance with principles commonly known to those of ordinary skill in the art to which this invention pertains. The jackshaft assembly 800 is comprised of a short shaft or jackshaft 804 on which are suitably mounted a drive pulley 806, a driven pulley 808, and a pair of flange bearings 810 inwardly of and adjacent to the drive and driven pulleys 806 and 808 respectively and suitably mounted and keyed to the shaft 804 and supported using bearing mounting plates 812 in accordance with principles commonly known to those of ordinary skill in the art to which this invention pertains. The pulleys 806 and 808 are secured to the shaft 804 with set screws (not shown) in a manner well known in the art to which this invention pertains. The various components may be assembled using principles commonly known to those of ordinary skill in the art to which this invention pertains.

The drive clutch 802 drives the drive pulley via belt 816. Both pulleys 806 and 808 rotate at the same speed since they are mounted on the common shaft 804. The driven pulley 808 drives the bandwheel 39 via the belt 818 which is also routed about a spring-loaded idler pulley 820 to apply constant tension on the drive at all times. A cover 822 (partially shown for purposes of clarity) is provided which offers protective covering for the clutch 802, drive pulley 806, belt 816, and battery 824. Protective covers 826 and 828 and a front cover (removed for purposes of clarity) are disposed about the bandwheel 39. At 830 are blade guide rollers, provided to hold the saw blade 36 as flat as possible to avoid cut creep up or down.

The jackshaft assembly 800 is provided for the operator to select bandwheel speed and thus the blade speed by changing the sizes (diameters) of the drive and/or driven pulleys 806 and 808 respectively, which ultimately changes saw blade cutting speed so that the ideal or better cutting speed may be obtained. For example, for a standard engine as well as clutch speed of 3,600 rpm, the drive pulley 806 may have a diameter of 4 inches (same as drive clutch, so 1:1) providing a speed of 3,600 rpm which is the speed transferred to the driven pulley 808. The driven pulley 808 may be provided with a diameter of 4.5 inches, providing a bandwheel speed of 887 rpm, which translates to a saw blade speed of 4,239 feet per minute, ideal for cutting a certain type of wood. As previously stated, the sizes (diameters) of the pulleys 806 and 808 may be changed as desired to achieve the desired or ideal saw blade speed.

It can be seen that if the clutch 802 were lined up with the bandwheel 39 as well as the saw blade 36 so that a belt could be directed coupled to the bandwheel 39, as in the prior saw blade drives, it would be "in the line of fire" of sawdust and susceptible to needing cleaning or replacement often. By placing the clutch 802 further back and out of the way of the sawdust, as in the present invention, it may be better protected.

Water Tank

Prior saw mills have had water tanks on cantilevered shelves to one side, and, since space is at a premium, they have had a less than desired capacity, typically about 10 liters and usually no more than about 2 gallons. As a result, they must be refilled perhaps 3 times a day. In such a prior saw mill, a structural beam has connected upstanding side structural members referred to herein as guide rail tubes. It is considered desirable to have a water tank of greater capacity in order to reduce the number of times it must be re-filled.

Referring to FIGS. 38 to 41, in order to serve the dual purpose of providing suitable structural support between the guide rail tubes 607 at the top thereof, including maintaining the spacing there between, as well as to provide a large capacity water tank that is "out of the way," in accordance with the present invention, the water tank 56 is provided as a structural support between the tops of the guide rail tubes 607, where it is also "out of the way." As a result, the structure of the water tank 56 providing support to the guide rail tubes 607, which allows it to extend all the way between the guide rail tubes 607, can have a large capacity. Thus, the water tank 56 has a capacity desirably of at least 2 gallons (for example, between 2 and about 8 gallons). Preferably, the water tank has a larger capacity of at least 5 gallons, for example, 5½ gallons, which is between two and three times the capacities of prior water tanks, and importantly providing enough water that it may only need to be refilled once in a day. Thus, the tank 56 is preferably a water tank having a capacity of at least 5 gallons for supplying water to the saw blade while it is cutting a log.

The water tank 56 is stainless steel, composed of stainless steel members welded together, so as not to have any corrosion thereof. The water tank 56 thus serving the dual purpose advantageously provides better use of the space between the guide rail tubes than if that space were taken up by structural support alone.

The water tank 56 has an upper wall 832, a lower wall 834, a pair of side walls 836 and 838, and a pair of end walls 840 and 842 all composed of stainless steel and all welded together. The end walls 840 and 842 extend beyond the wall 836 (i.e., beyond the water tank 56) to define end wall extensions which constitute walls 844 and 846 respectively for mating tube pockets or water tank receivers or tubular enclosure structures 848 and 850 respectively for receiving and structurally fixedly attaching the upper end portions 857 of the guide rail tubes 607 respectively for structurally supporting the tubes 607. The spacing, illustrated at 833, of each of the tube pockets 848 and 850 from the side wall 836 is provided for ease of manufacturing. Thus, if there were no such spacing 833, then the water tank 56 may not be able to be fully welded because there may not be enough room to get welding equipment properly into position, which may result in a water leak if not fully welded. This spacing 833 is desirably sufficient to adequately get the welding equipment properly into position. This spacing 833 is, for example, about 0.94 inch.

The tubes 607 protrude closely into the tank receivers 848 and 850 respectively and are suitably affixed via screws 873 or other suitable fasteners which are threadedly received through primary clamp holes or apertures 874, as best seen in FIGS. 22, 38, and 39, to pinchingly bear against the tubes 607 respectively. The tubes 607 are also suitably affixed by set screws or other suitable fasteners 875 which are threadedly received through secondary clamp holes or weld nuts 876 (and through the walls 842) to pinchingly bear against the tubes 607 respectively to apply additional force on the tank and tubes to reduce any vibration or chatter in the water tank while sawing. These clamping apertures 876 are located as seen to provide additional strength in that they are located in the corners of the receivers 848 and 850 to thereby directly apply force on corners of the mating square tubes 607 respectively, i.e., the strongest sections of the tubes 607.

Each tube pocket 848 and 850 also has three other walls 852, 854, and 856 welded to each other and to walls 844 and 846 respectively, and also composed of stainless steel, with walls 856 welded to walls 840 and 842 respectively to surroundingly closely engage the upper end portions of the guide rail tubes 607 respectively. The pockets 848 and 850 leave lower openings at 858 in which the guide rail tubes 607 are respectively tightly received. A pair of support gussets 860, also made of stainless steel, are each welded (at each end of the water tank 56 respectively) to the upper edges of the walls 844 and 846 respectively, 852, 854, and 846, and portions of walls 840 and 842 respectively and portions respectively of wall 836, as seen in FIG. 40. At 872 (FIG. 39) is the top edge of wall 840. A piece 837 constitutes the sides 836 and 838 and top 832 of the water tank 56, and piece 880 constitutes the bottom of the water tank 56, the pieces 836 and 880 welded to each other. At 862 (FIGS. 38 and 41) are pulleys (pulley lines not shown) for raising and lowering the carriage. At 868 is a water flow shut-off valve for the water supply line 612, which line is also seen in FIG. 27. The water tank 56 is filled with water through fill cap 869. Water tank lifting lugs 870 of stainless steel are received in cutouts 864 of support gussets 860 and suitably welded to support gussets 860 or otherwise suitably attached to the water tank 56.

Discharge Chute Activation (Alternative Push and go)

As previously discussed, the pull cable 601 (FIGS. 25 and 27), when the actuator lever 642 is pushed into the actuation position shown in FIG. 25, effects a pull on the pull cable 601 thereby effecting angular movement of the control cam 654 about fulcrum 658 to the right, as seen in FIG. 27, to the position shown in FIG. 27. It may be desirable to operate a variety of devices by the actuation of the pull cable 601, for example, the engine throttle, as previously discussed, the cooling and/or lubricating water valve, as previously discussed, the brake arms 686 (by the lever 670) as previously discussed, and the hereinafter discussed closure device 900 for the saw dust discharge chute 904. However, without the control cam, the pull cable 601 provides just a certain amount of pull (for example, ⅝ inch), yet the pull (or otherwise actuation leverage) required or desired for ideal operation of each device to be operated by actuation of pull cable 601 will vary from device to device, and the pull provided by the pull cable 601 is desirably selected to cover the leverage needed or desired for each and all of the devices. The amount of such leverage is based on the needs of each device and will be determined using principles commonly known to those of ordinary skill in the art to which the present invention pertains. It is an object of the present invention to allow a selection of length of pull of a pull cable or other actuation leverage for each such device. In order to achieve this object, the cam 654 is provided intermediate the pull cable 601 and individual pull cables (or other actuation members) emanating from the cam 654, as more specifically discussed hereinbelow.

In accordance with the present invention, in order to allow such a selection of length of pull of a pull cable or other actuation leverage for each such device, the control cam 654 is provided, wherein, for each device having a pull cable, the length of pull is related to the distance between the fulcrum 658 and the point of individual pull cable (or otherwise actuation member) attachment for that particular device. Thus, as seen in FIG. 27, the distance between the fulcrum 658 and the point of attachment of the cam 654 of the pull cable 606 for the throttle is less than the distance between the fulcrum 658 and the tab 668 for actuating the cooling and/or lubricating water valve. In accordance with mathematical principles commonly known to those of ordinary skill in the art to which the present invention pertains, this translates to the length of pull of the throttle pull cable 606 being less than distance of travel of the cooling and/or lubricating water tab 668 for opening the cooling and/or lubricating water valve 604.

Figure 45:
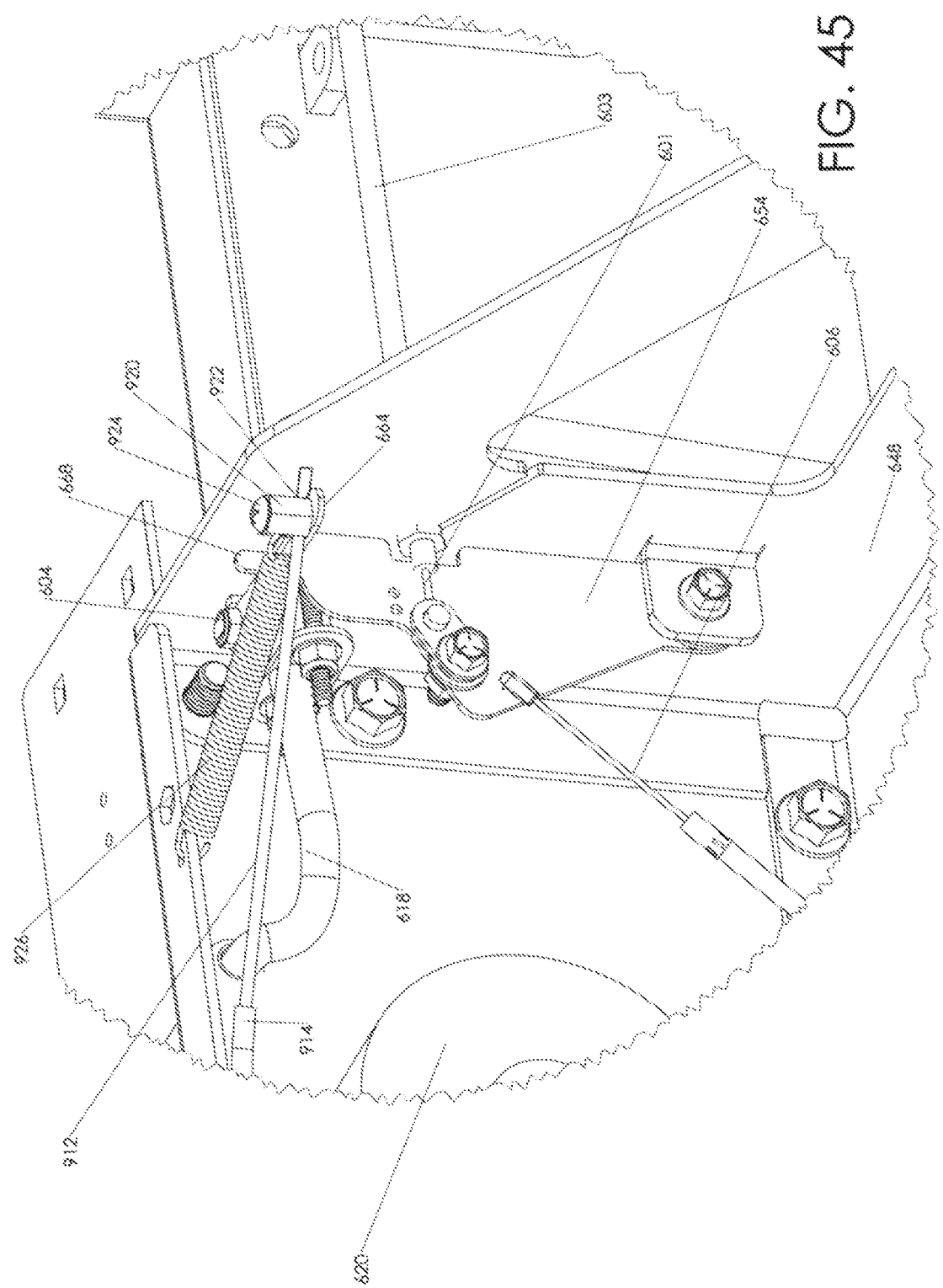
FIG. 45 is a detail perspective view of the encircled portion (labeled FIG. 45) of FIG. 44.

Likewise, the distance between the fulcrum 658 and the point 922 (FIG. 45) of attachment of the saw dust discharge chute closure device pull cable 912 is seen in FIG. 45 (discussed hereinafter) to be greater than the distance between the fulcrum 658 and the point of attachment to the cam 654 of the throttle pull cable 606. In accordance with mathematical principles commonly known to those of ordinary skill in the art to which the present invention pertains, this translates to the length of pull of the closure device pull cable 912 being greater than the length of pull of the throttle pull cable 606, and this greater length of pull may be considered important in view of various technical considerations for effective opening of the closure device.

For the purposes of this specification and the claims, a cam is defined as a member which is attached to a structure so as to be rotatable about a fulcrum. Thus, the cam 654 is a member attached to the frame 648 in a manner so as to be rotatable about fulcrum 658, and is seen to be able to provide various attachment points such as point 922 at various distances from the fulcrum 658 so as to allow various lengths of pull of individual pull cables (or length of travel of other actuation members) as needed or desired for various devices.

A typical saw mill may have a saw dust discharge chute wherein saw dust may build up during cutting passes, and an operator may dangerously place his hand in the chute opening to unclog the opening, at a time when the engine may be accidently turned back on. It is thus considered desirable that the discharge opening be open when the engine is running and a log is being sawed and to be closed when the engine is idling or not running.

Figure 51:
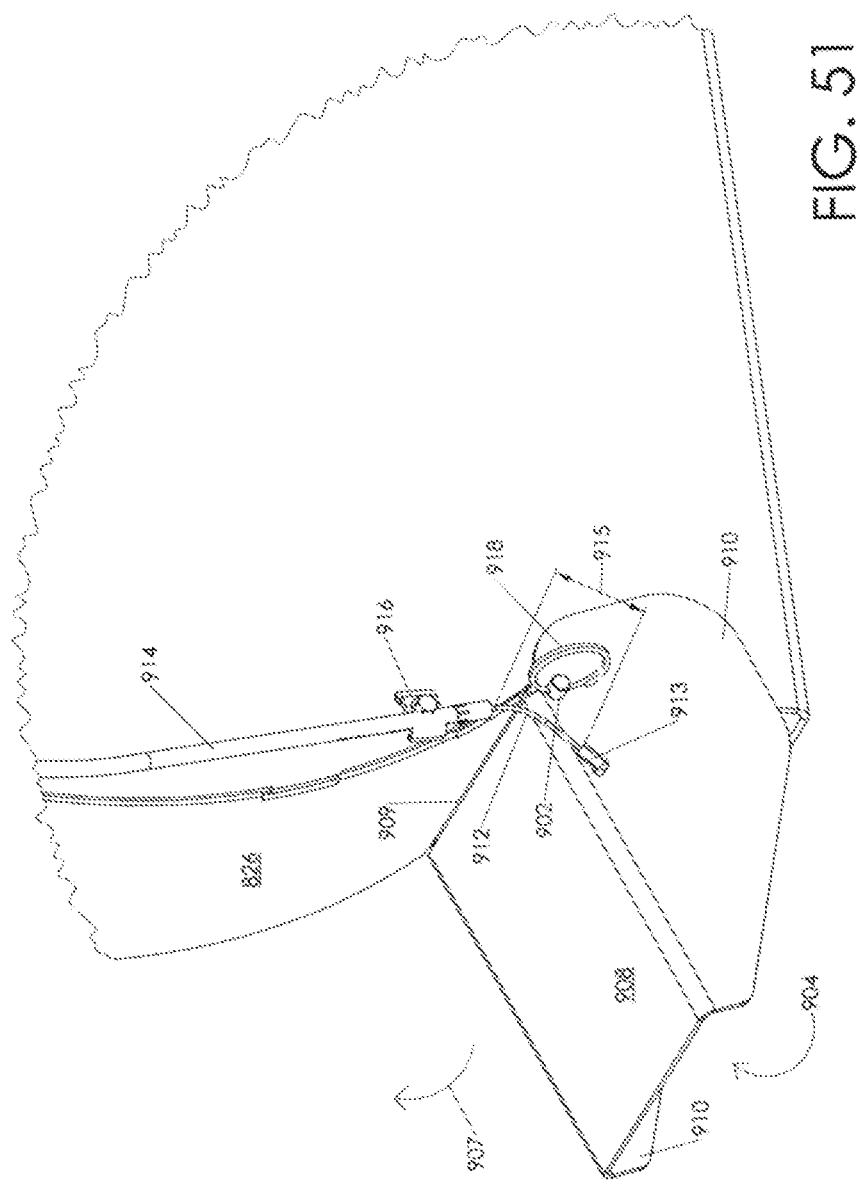
FIG. 51 is a close-up perspective view of the closure device of FIG. 44, showing the closure device in a position so that the sawdust discharge opening is open.
Figure 52:
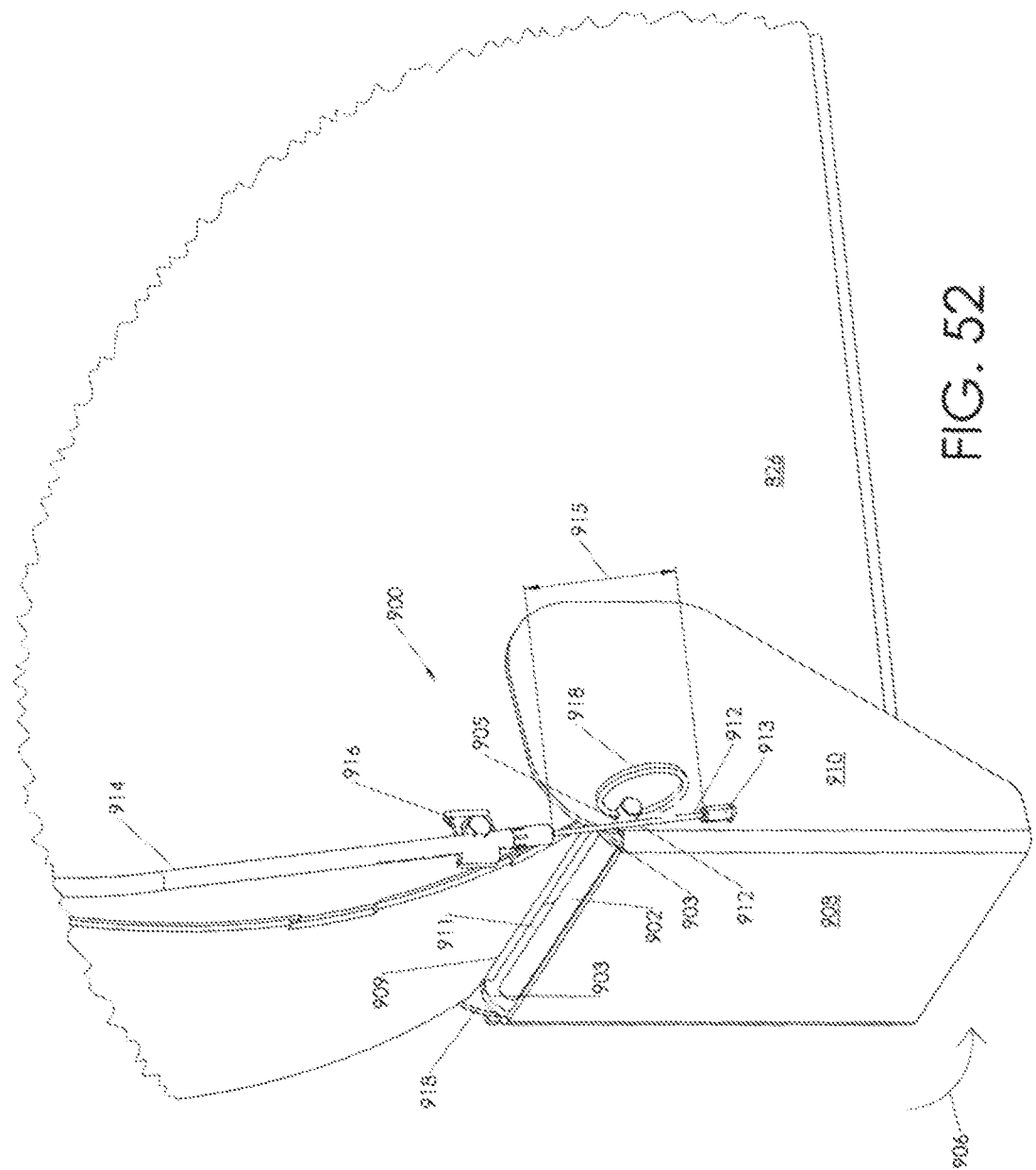
FIG. 52 is a view similar to that of FIG. 51 of the closure device of FIG. 44, showing the closure device in a position closing the sawdust discharge opening.

Referring to FIGS. 44, 45, 51, and 52, the saw mill 30 has a saw dust discharge opening, illustrated at 904, from the bandwheel cover 826, which is composed of a suitable sheet metal or other suitable material. In order to be able to effect closing of the opening 904 in accordance with the present invention, a closure device or discharge chute cover 900, which is composed of a suitable sheet metal or other suitable material, has a closure plate portion 908 to cover or close the opening 904 (FIG. 44), as seen in FIG. 52. A pair of wall portions 910, integral with wall portion 908, are generally normal to wall portion 908 to extend along and engage and slide along the sides respectively of the bandwheel cover 826 for grasping or fitting thereto to stabilize the closure of the opening 904. FIG. 51 shows rotation of the closure portion 908, as illustrated at 907, about a pivot as defined by pivot pin 902 as discussed hereinafter to open the sawdust discharge opening 904 for discharge of sawdust as the sawmill is operated. FIG. 52 shows rotation of the closure portion 908, as illustrated at 906, to close the opening when the sawmill is shut down after completion of a sawing pass.

As seen best in FIG. 52, the pivot pin 902 is suitably received rotatably in end openings 903 of housing portion 903 of the closure portion 908 and in apertures, one illustrated at 905, in the side closure portions 910 respectively and suitably attached as with clevis pins 918 or other suitable means. The housing 911 is welded or otherwise suitably attached to the upper edge 909 of the bandwheel cover opening 904 in accordance with principles commonly known to those of ordinary skill in the art to which the present invention pertains. Thus, the pivot pin 902 rotates within openings 903 and is rotatable along with the opening 907 or closing 906 movement of the closure device 900.

As previously discussed, FIGS. 24 to 33 depict a Push and Go structure wherein, in the single step of moving the actuation lever 642 (FIG. 25) into a coupling or engaging relationship with the push bar 44, as seen in FIG. 25, ready for a sawing pass, the pull cable 601 is pulled to effect pivoting movement of the control cam 654 (FIG. 27) which then (1) actuates the engine throttle via cable 606 (FIG. 27), which is part of the prior art, and (2) opens the saw blade cooling water valve 604 (FIG. 27) for flowing cooling water from the water tank 56 to the saw blade, and (3) effects pivoting movement of the brake engagement lever 670 to clamp the guide rails 602 (FIG. 30) to prevent vertical movement of the saw head 60 during sawing. This allows the flow of cooling water to the saw blade automatically, without any additional effort on the operator's part, when the throttle is engaged for a cutting pass and stops such water flow as soon as the throttle is disengaged by releasing the actuation lever 642. Thus, this is provided to desirably prevent the water valve from being inadvertently left on at the end of a cutting pass and to prevent the inadvertent failure to provide the flow of cooling water when a cutting pass is started, with adverse consequences either way. This desirably allows the guide rails to automatically, without any additional effort by the operator, be clamped during a cutting pass and be unclamped between cutting passes.

In accordance with the present invention, the push and go pivotal movement of the control cam 654 may also be effected to, additionally and/or instead of one of the above functions, automatically (without any additional effort required of the operator) perform opening of the closure device when the actuation lever is engaged to allow passage of sawdust out of the opening 904, and to perform closing of the closure device 900 when the actuation lever is disengaged so as to safely prevent the operator from having his arm in the discharge opening 904 if the engine is accidently started, or to perform other suitable functions similarly.

Figure 44:
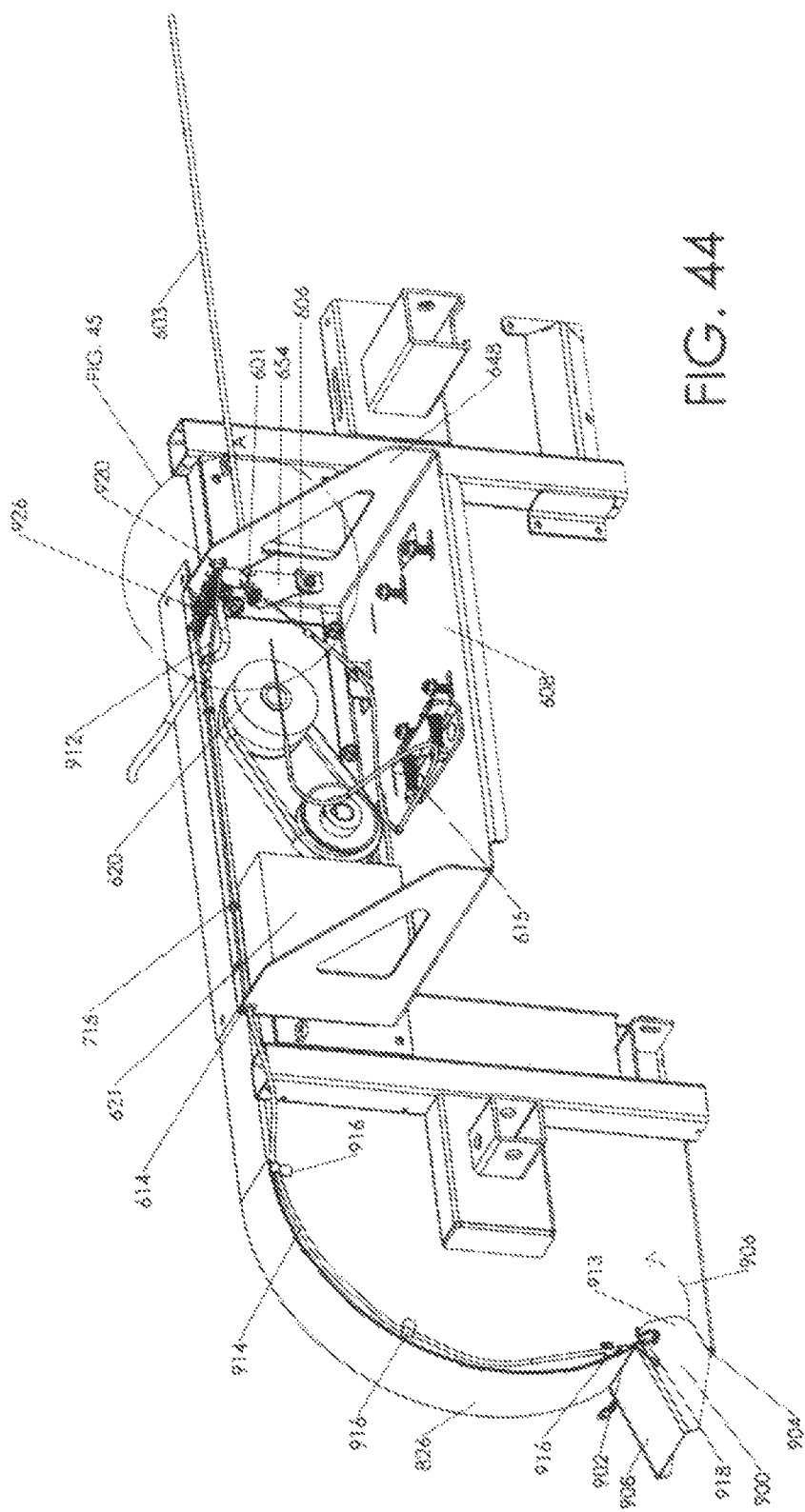
FIG. 44 is a view similar to that of FIG. 27 showing an alternative embodiment thereof which includes arrangements for operation of the water valve, the throttle, and a closure device for the sawdust discharge opening.

Referring to FIGS. 44 and 45 (wherein FIG. 45 is a close-up of the circled portion labeled "FIG. 45" in FIG. 44), the closure device 900 is desirably kept open during sawing, as seen in FIGS. 44, 45, and 51 and closed at the completion of a sawing pass, as seen in FIG. 52, by use of a pull cable 912, as part of an alternative push and go arrangement wherein, when the throttle is activated for sawing, the water valve 604 is simultaneously and automatically turned on, and the closure device 900 is simultaneously and automatically opened to allow discharge of sawdust, so that, advantageously, no additional action is required of the operator for either. When the actuation lever is disengaged to cease sawing, the water valve 604 is simultaneously and automatically turned off, and the closure device 900 is simultaneously and automatically closed to prevent the engine from being accidently started while a person has his or her hand in the sawdust opening.

Sheathing for the cable 912 is shown at 914, and the sheathing 914 is suitably attached to the bandwheel cover 826 by suitably spaced clamps 916 or other suitable means. A commonly known "Z bend" device 913 is molded during manufacture directly onto one end of the cable 912, and the Z bend device is suitably securely received and affixed in a hole in one of the closure device flaps or side portions 910 in accordance with principles commonly known to those of ordinary skill in the art to which the present invention pertains. The other end of the cable 912 is suitably attached to the end (the end opposite the water valve 604) of the water valve toggle plate 664 by a suitable means, for example, as follows. A barrel clamp 920 is welded or otherwise suitably attached to the end portion of the toggle plate 664, and the cable 912, which is braided, is passed through a passageway, illustrated at 922, in the barrel clamp 920 and a barrel clamp screw 924 is tightened down to clamp the cable 912 firmly. A return spring 926 is suitably hooked to the end (the end opposite the water valve 604 end) of the toggle plate 664 and suitably to the frame as shown.

The control cam 654 is shown in the "activated" position for sawing in FIG. 45 achieved by the pulling of cable 603 (toward the right side of FIG. 45) in the manner as previously discussed, wherein, by the single step by the operator of coupling the actuation lever 642 with the push bar 44, (1) the engine is throttled by the pulling of cable 606 by the control cam 654 in the manner as previously discussed to effect the sawing of wood by the engine, (2) the water valve 604 is opened by the turning movement of the lever or toggle plate 664 by the control cam tongue 668 in the manner as previously discussed to provide cooling water to the saw blade, and (3) the closure device 900 is opened, as seen in FIGS. 44 and 51 and illustrated at 907 and as hereinafter discussed, by the pulling of the cable 912, as effected by the movement of the end of the lever 664, to allow discharge of saw dust through opening 904.

Upon completion of a cutting pass, the control cam 654 is allowed or released to move to the "inactivated" position by the operator letting go of the actuation lever 642 to thereby with the return spring 719 (FIG. 24) de-throttle the engine, and, with the return spring 926, move lever 664 to close the water valve 604 to cease cooling and/or lubricating water flow to the saw blade. As aided by the return spring 926, the cable 912 is slacked, and, under the force of gravity, the closure device 900 moves downwardly into the closed position of FIG. 52 to thereby prevent the operator from reaching into an otherwise open saw dust passage at a time when the engine may be accidently started. In this regard, note the difference in length, illustrated at 915, of cable 912 protruding from the sheathing 914 when the closure device closes the opening 904 in FIG. 52 under the influence of gravity with the cable 912 slack as compared to the shorter length 915 in FIG. 51 when the closure device tautly is raised to open the opening 904.

It should be understood that the pull cable 912 may be attached in other ways. For example, it may be connected directly to the cam plate 654 similarly as the throttle cable 606 is connected directly thereto, and it may be connected to the closure device in other ways. Either way, it is defined herein and in the claims that the pull cable 912 is connected to the cam plate 654, whether it is connected directly thereto or indirectly such as via lever 664. Likewise, the lever 670 (FIG. 27) may be alternatively connected to water valve lever 664.

It should be understood that, if a saw mill includes a brake engagement lever 670 to clamp the guide rails 602 to prevent vertical movement of the saw head 60 during sawing, as illustrated in the embodiment of FIGS. 24 to 33, the push and go arrangement therefor may be incorporated into the push and go arrangement of the embodiment of FIGS. 44, 45, 51, and 52. It should also be understood that an additional one or more pull cables may be attached to the control cam 654 or lever 664 to, in similar ways, connect to one or more other sawmill components to automatically open/close them as the actuation lever is engaged/disengaged.

Log Clamps

Figure 46:
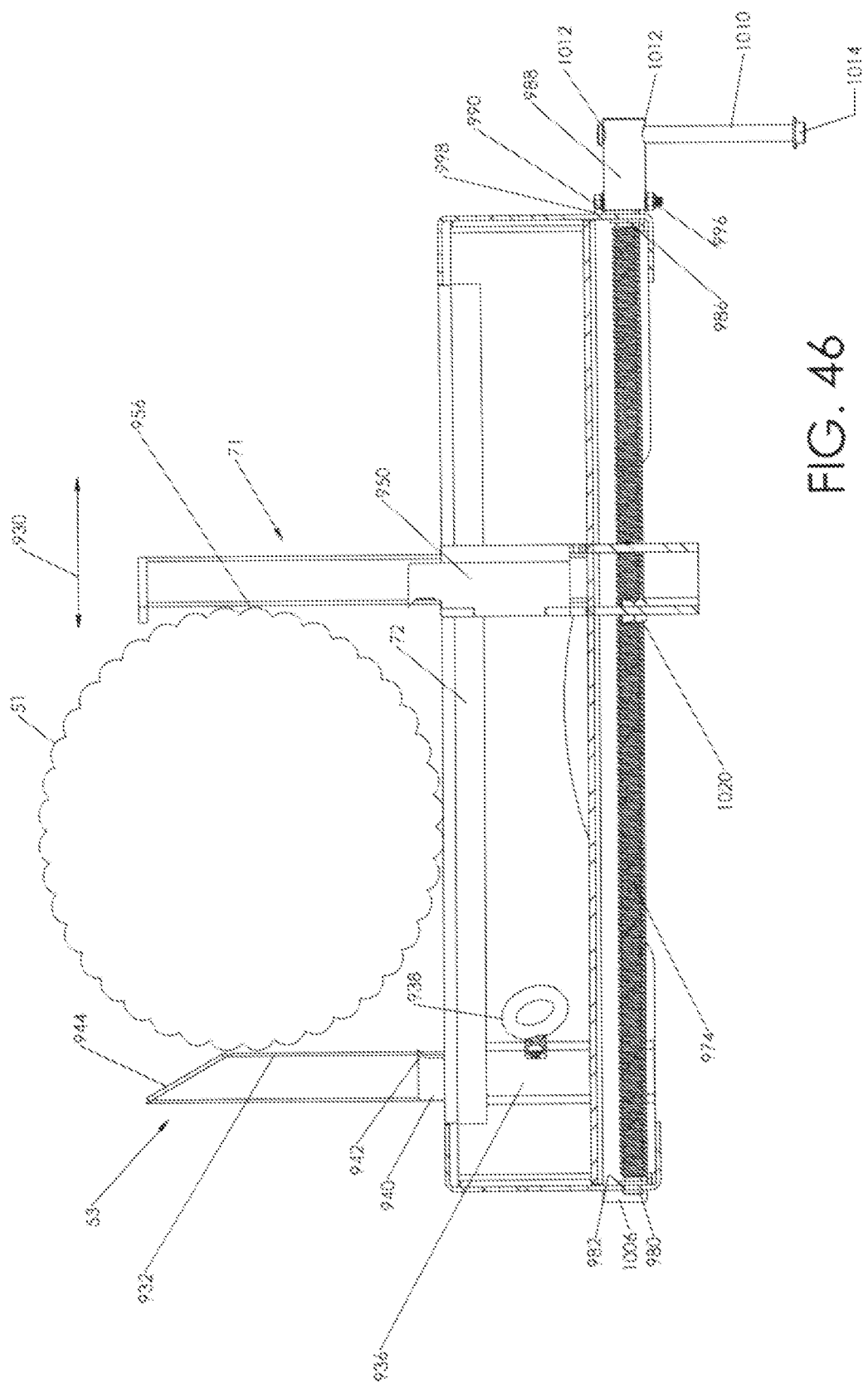
FIG. 46 is a side view of devices for clamping a log to the sawmill for sawing.
Figure 47:
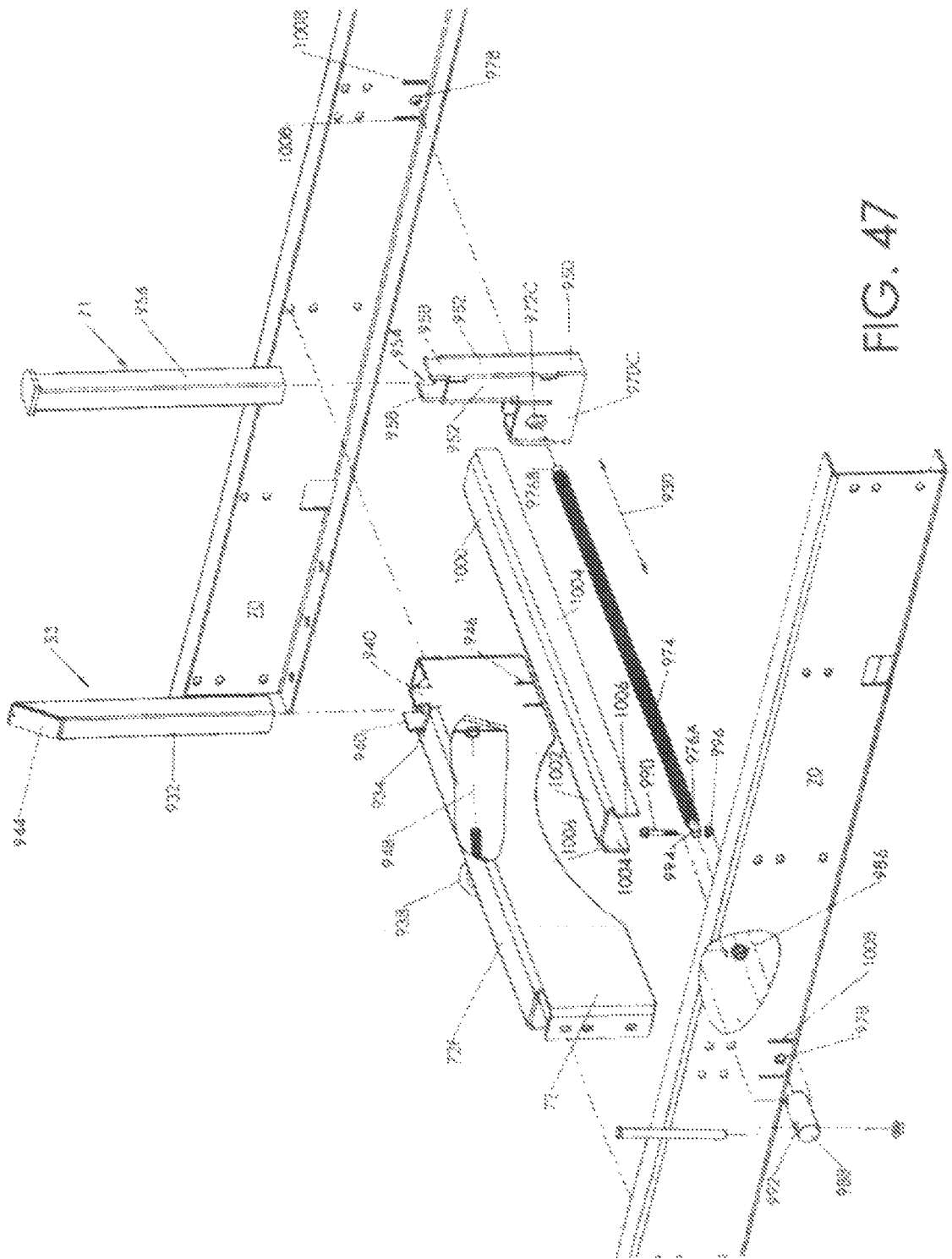
FIG. 47 is an exploded view of the clamping devices.
Figure 48:
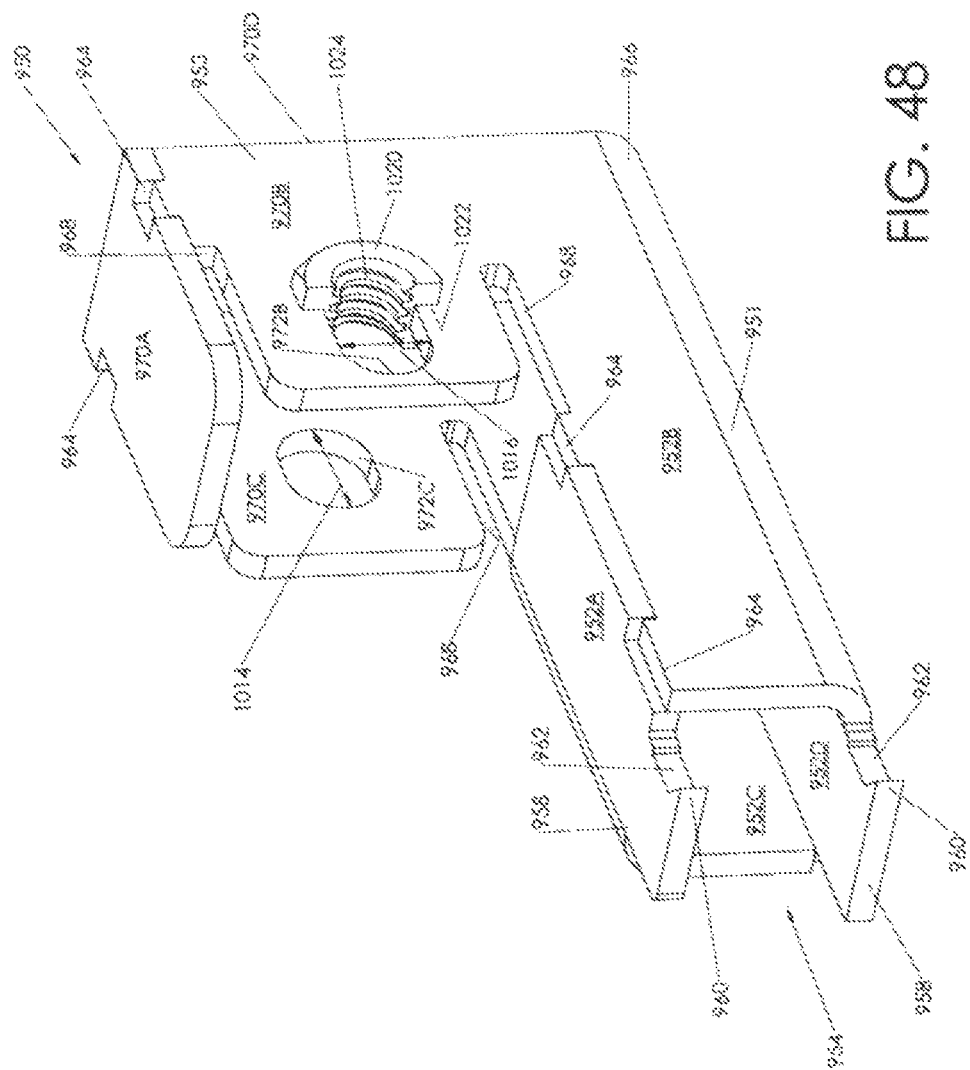
FIG. 48 is an enlarged perspective view of a trolley for moving one of the clamping devices crosswise of the sawmill.
Figure 49:
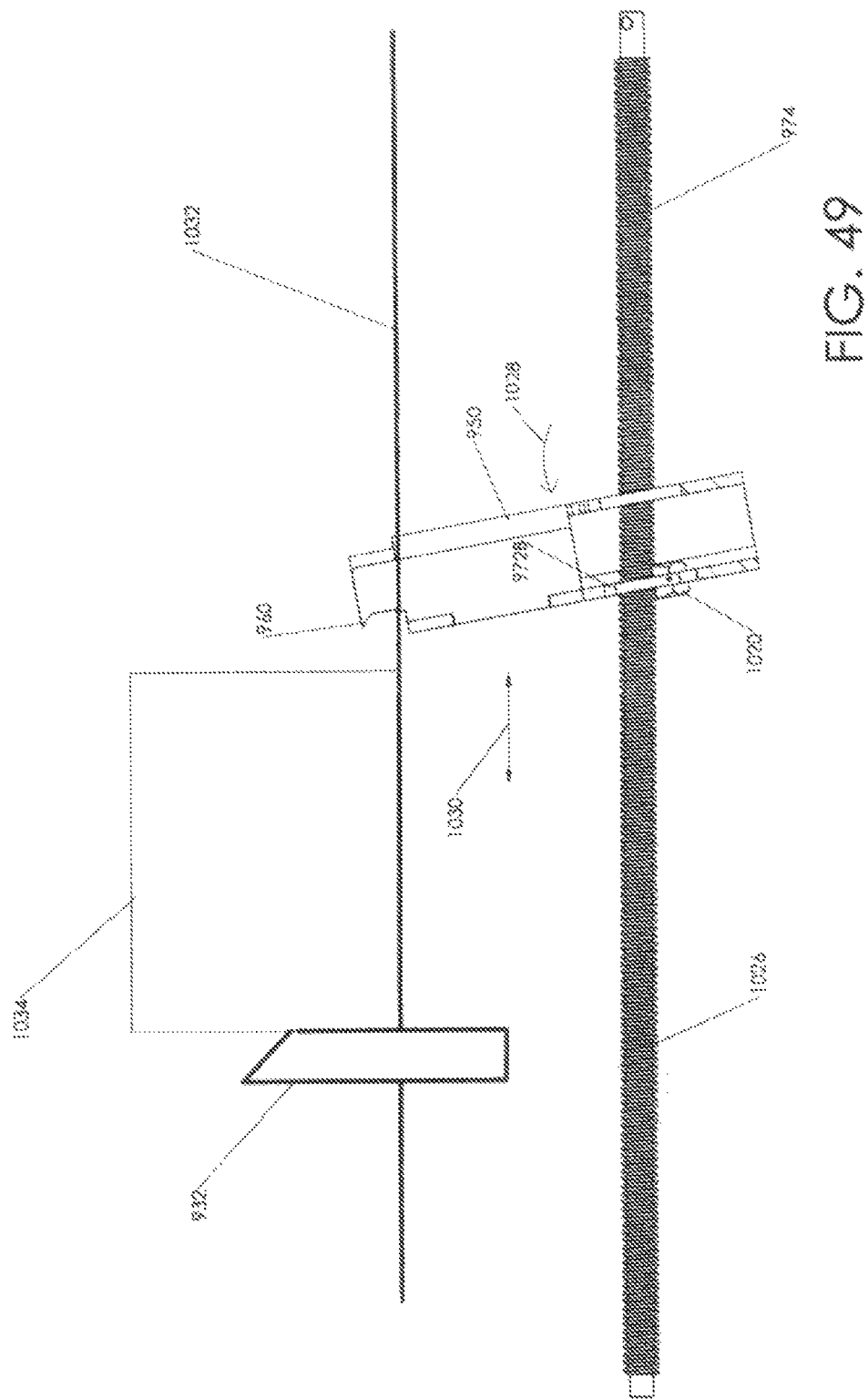
FIG. 49 is a diagrammatic view illustrating the one clamping device disengaged from the log.
Figure 50:
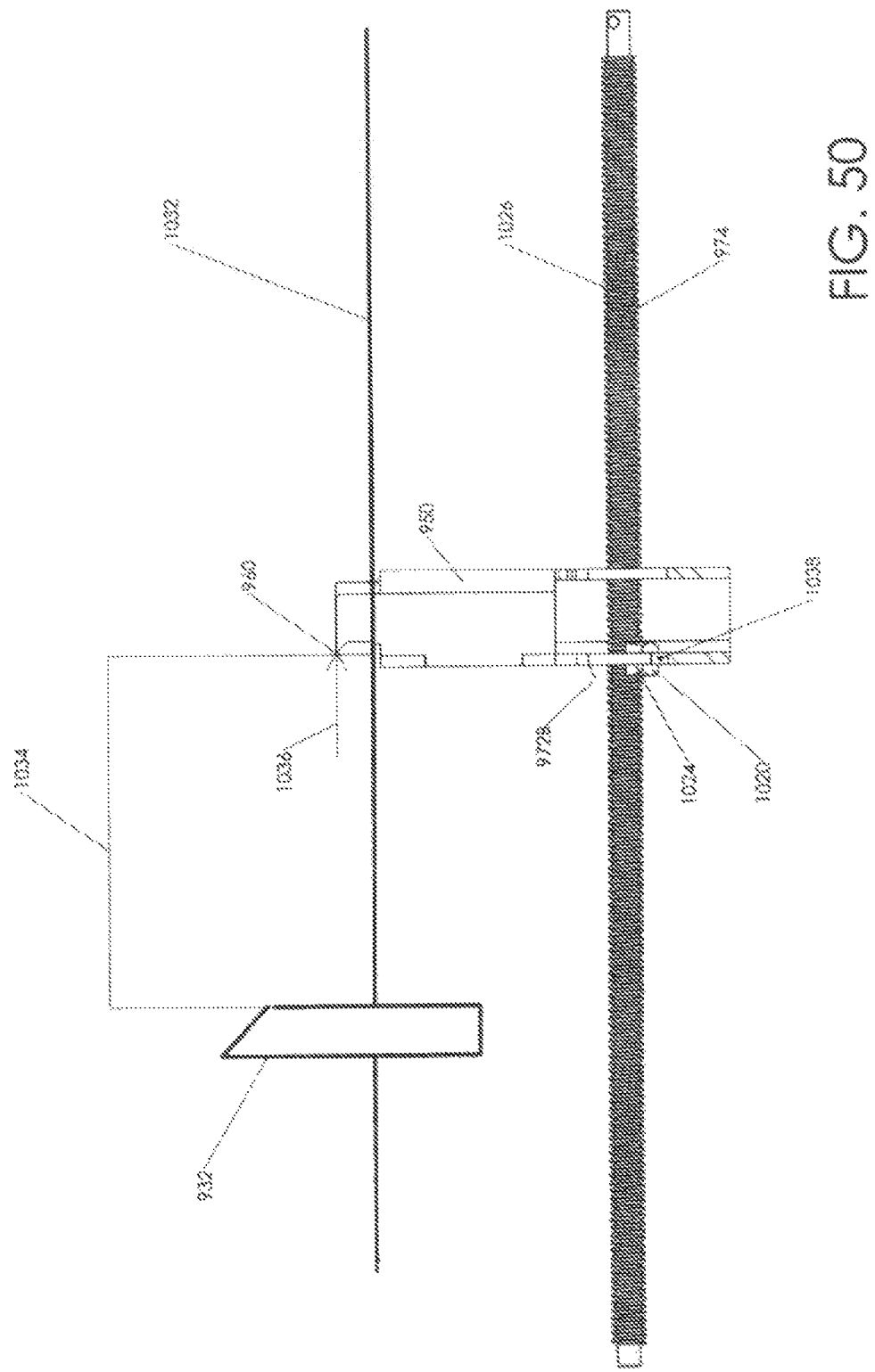
FIG. 50 is a view similar to that of FIG. 49 illustrating the one clamping device clamped to the log.

In order to saw a log 51 into board, it must first be processed into a log cant, i.e., so that it has four or at least a suitable number of flat sides, illustrated with four flat sides in a cross-sectionally rectangular shape at 1034 in FIGS. 49 and 50, so that different types of cuts can be made. FIG. 46 illustrates a log 51 in position to be processed into a log cant 1034. Herein, the terms "log" and "log cant" may be used interchangeably and, unless otherwise specified or apparent from the context, are meant to refer to a log processed to have a suitable number of flat sides suitable for sawing into boards.

In order to saw the log cant 51 into boards, it must first be securely clamped on the bunks 72. Referring to FIGS. 46 to 50 as well as FIGS. 1 to 4, there are shown two log clamping devices, i.e., a first 53 being fixed or stationary, and a second 71 being adjustable for movement lengthwise of the bunks 72, as illustrated at 930, to pinch the log 51 between the log stop 932 and clamp post 956 as seen in FIG. 46 for clamping thereof, and the log stop 932 and clamp post must be adjusted downwardly, as hereinafter described, to insure that they are always below the saw blade during such cutting. Because the log cant 1034 would be square or rectangular, there is not a need to keep adjusting the removable log stop 932, whose purpose is to keep the log cant squared (both figuratively and geometrically) so that the lumber does not undesirably get cut on a taper. Once the log has been processed into a cant, the log stops are only necessary to rotate the cant to a desired face/edge for cutting. Otherwise, they can be removed. During the process of turning the log into the cant, the log stops must be used and must of course be lowered as necessary to be below the saw blade.

The fixed device 53 includes a vertical log stop or cleat 932 which is square or otherwise suitably cross sectionally shaped and which rises above the associated bunk to bear the log cant 51 and whose lower portion is received through an opening, illustrated at 934, in the bunk upper flange 72F and into a receiver 936. The receiver 936 comprises a plate of steel having two bends forming a C-channel, but may be otherwise suitably formed, and welded (with the aid of cutouts to position the receiver 936 for welding) or otherwise suitably attached to the bunk 72. An eye bolt 938 is suitably attached to a wall of the receiver 936 to provide a shank (not shown) for engaging the log stop 932. The user manually tightens the eye bolt 938 to pinchingly apply force to securely position the log stop 932 in place and loosens the eye bolt 938 to remove the log stop 932. The receiver 936 has a pair of upwardly protruding lips 940, between which the log stop 932 passes, to stabilize and reinforce the log stop 932. Log-facing edges of the lips 940 have, upwardly thereof, pointed tips 942 for physically digging into the log cant 51 to secure it from moving during cutting. The log stop 932 has a pointed slanting upper portion or chamfer 944 so that when the log, prior to being formed into a cant, is being rolled or rotated, it does not get caught on the stop 932. This chamfer 944 helps guide the log while it is being rotated. A part of the bunk is removed by the cutout 948 to show more clearly the placement of the eyebolt 938.

The adjustable clamping device 71 includes a clamp trolley 950 which has a first box-shaped portion 951 defined by four elongate vertical walls 952 which define a vertical passage 954 for tightly receiving the lower end portion of an elongate clamp post 956. The post 956 is generally square or otherwise suitably shaped in cross section and the passage 954 shaped to conform thereto. A pair of flap portions 958 of a pair of opposite ones of the walls 952A and 952D extend above the other pair of walls 952B and 952C for use as log stops once a log has been processed into a cant 1034. Because the log 51 would be square in cross-section, there would be no need to keep adjusting the position of the removable log clamp post 71. Vertical cutouts 962 in the same sides of the flaps 958 define a pair of effective clamping tips 960 respectively, which physically dig into the log material being cut to secure it from moving during cutting.

The trolley 950 has a second portion 953 extending from the lower end of the first portion 951 normal thereto and has a pair of spaced walls 970B and 970C which extend from and normal to walls 952B and 952C respectively, a bottom wall at 970D which extends from and normal to wall 952D, and a wall 970A forming an end of the second portion 953 and extending between and connecting walls 970B, 970C, and 970D.

The trolley 950 has a main part 966 which comprises walls 952B, 952C, 952D, 970B, 970C, and 970D and which is made by forming several pieces of laser cut mild steel and welding them into the single part 966. The trolley also has parts which define walls 952A and 970A which are shaped to be and are snap-fitted onto their associated walls, i.e., wall 952A is partly received between or within and snap-fitted onto walls 952B and 952C to insure that the post 956 is tightly received therein and defining cutouts 964. Wall 970A is partly received between or within and snap-fitted onto walls 970B and 970C and serves as a stability plate to help prevent the trolley 950 from rotating about itself when clamping or unclamping. The wall 970A is notched at 964 to provide proper part positioning/location for weld (fixturing). The walls 970B and 970C are shaped to define channels 968 along the upper and lower edges of the upper portions thereof for a purpose which will become apparent hereinafter.

The upper portions of the walls 970B and 970C have generally centrally thereof a pair of aligned slots or apertures, illustrated at 972, respectively which receive an Acme screw or rod 974 or other suitable screw or threaded rod for effecting movement of the trolley 950 crosswise of the saw mill 30, as illustrated at 930, to effect clamping engagement of the log 51 between the log stop 932 and clamp post 956, as discussed hereinafter. Unthreaded end portions 976 of the Acme threaded rod 974 are rotatably received in apertures, illustrated at 978, respectively of the respective support structures or channel members 70 which extend longitudinally of the saw mill 30. Acme screw end portion 976B is suitably rotatably secured in respective aperture 978 by suitable means such as a flange bushing 980 having flange 982, which bushing is entrapped on the threaded rod 974. The other Acme screw end portion 976A is suitably rotatably secured in respective aperture 978 by suitable means such as flange bushing 986 (shown in a cutout of FIG. 47), and a suitable cylindrical extension member or Acme coupler 988 attached to the end portion 976A by a screw 990 received in apertures 992 and 994 in the extension member 988 and screw end portion 976A respectively and a nut 996 suitably applied or by other suitably fastener. A headed clevis pin 1010 is received in apertures 1012 at the outer end of the coupler 988 and a push nut cap 1014 attached to its end for the clevis pin 1010 to serve as a handle suitably spaced from the respective channel member 70 to manually turn the Acme screw 974 for moving the trolley 950 to clamp the log between the log stop 932 and the clamp post 956. At 998 (FIG. 46) is a tab which is similar to tab 984.

A safety cover 1000 for the Acme screw 974 has a thin upper portion 1002 and a pair of thin side portions 1004 which have end portions or tabs 1006 which extend a small distance beyond the upper portion 1002 at each end. The side portions 1004 are received in the trolley grooves 968 so as to allow sliding movement of the trolley 950 relative to the cover 1000. The cover end portions 1006 are at each end securely snapped into slots 1008 in the channel members 70 respectively to secure the cover 1000. This allows the trolley 950 to travel along the length of the Acme screw 974 and also to be tilted as illustrated in FIG. 49 and as discussed hereinafter.

Slots or apertures 972 are elongated, each having a major diameter, illustrated at 1014, and a smaller minor diameter, illustrated at 1016. For example, the major and minor diameters 1014 and 1016 respectively may be 1.11 and 0.86 inches respectively, and the Acme screw 974 may have a diameter (thread diameter), illustrated at 1018, which may be ¾ inch. A one-half Acme nut 1020 or other suitable lead nut is received in one 972B of the elongated slots and has a female thread 1024 which mates with the male thread 1026 of the Acme screw 974. For example, the threads may each be size 6. It can be seen that the elongated slots 972 are sufficiently shaped and sized to allow the Acme screw thread to be disengaged from the one-half Acme nut thread and to allow the trolley 950 to be tilted or tipped as shown in FIG. 49 and discussed hereinafter. The one-half Acme nut 1020 has a circumferential groove 1022 in its outer surface (opposite the threads, and extending close to the threads) in which is received trolley portion 970B thereby seating the one-half Acme nut 1020 at the lower end (along the major diameter 1014) of the elongated slot 972B. The one-half Acme nut 1020 is welded or otherwise suitably affixed to the trolley portion 970B.

One is able to cut only above the log stop 932 and clamp post 956, so, as the cant 1034 is cut, the log stop 932 and clamp post 956 must be adjusted downwardly so that they are always below the saw blade. The log stop 932 is height-adjusted by means of the eye bolt 938 which applies pressure to keep it from moving once adjusted to a specific height. The clamp post 956 does not utilize any clamping type instrument to keep it in place. Rather, the user manually raises or lowers the clamp post 956 and holds it while the log is being clamped. Once contact is made with log, the clamp post 956 would not be able to move.

The clamp post 956 is no longer needed and can be removed once the cant 1034 is formed and is thus not shown in FIGS. 49 and 50. Once at least 3 sides of the cant have been created, the clamp post 956 is no longer needed, and the clamp trolley 950 can be effectively used to secure the cant for the remainder of processing.

FIG. 49 shows the clamping trolley 950 disengaged from the Acme screw 974 wherein it is tilted as illustrated at 1028, with the one-half Acme nut 1020 disengaged from the Acme screw 974. The integrated elongated slots 972 in the trolley 950 allow loose entrapment about the Acme screw 974 and accordingly allow for the trolley 950 to be tipped, as illustrated at 1028, to quickly engage or disengage the Acme nut 1020 against or from the Acme screw 974. The tilting 1028 causes the Acme screw 974 to impinge the upper edge of the slot 972B so that the Acme screw 974 is free of the one-half Acme nut 1020. This allows the clamping trolley 950 to be easily slid along the length of the Acme screw 974, as illustrated at 1030, without the operator having to expend the effort of turning the handle 1010, so that the clamping trolley 950 may be slid quickly into near clamping position, as seen in FIG. 50.

FIG. 50 shows the clamping of the log or log cant 1034, wherein the upper surface of adjacent bunks 72 is illustrated at 1032. With the clamping tip 960 of the clamping trolley 950 coming into engagement with the log cant 1030, the handle 1010 is turned to apply clamping force, which generates back pressure on the clamping tip 960 of the clamping trolley 950, as illustrated at 1036. The elongated slots 972 allow a moment to be created, the center of moment illustrated at 1038. This slight rotational moment causes the trolley 950 to tip clockwise (as seen in FIG. 50) or into the upright position thereby threadedly mating or engaging the Acme screw 974 into or with the Acme nut 1020. The handle 1010 is turned to achieve the desired amount of clamping force.

It should be understood that, while the present invention has been described in detail herein, the invention can be embodied otherwise without departing from the principles thereof. Such other embodiments are meant to come within the scope of the present invention as defined by the appended claims.

What is claimed is:

1. A sawmill comprising
an elongate base including a pair of parallel rails extending longitudinally of said base,
a carriage including rollers which engage said rails for moving of said carriage along said rails,
said base further including a pair of support structures to which said rails are rigidly attached respectively,
said base further including a plurality of longitudinally spaced structural members interconnecting said support structures for supporting a log between said rails,
said carriage further including a saw operable for cutting a log on said structural members as said carriage is moved along said rails,
wherein said rails are laminated to said support structures respectively,
wherein, when the sawmill is set up for use, said support structures rise at least as high as said rails respectively, and
wherein said base further includes a plurality of spacers disposed between each of said rails and the respective one of said support structures.

2. A sawmill according to claim 1 wherein said elongate base includes an elongate central base portion and at least one base extension portion hingedly attached to said central base portion at an end of said central base portion in a manner which allows said base extension portion to be folded from a first position for use to a second position at least partially over onto said central base portion.

3. A sawmill according to claim 2 wherein said at least one base extension portion includes a pair of parallel other rails which lie end-to-end with said rails extending longitudinally of said base respectively when said at least one base extension portion is in said first position to be engageable by said rollers of said carriage and further includes a pair of other support structures to which said other rails are rigidly attached respectively and a plurality of longitudinally spaced other structural members interconnecting said other support structures, and
wherein said other rails are laminated to said other support structures respectively.

4. A sawmill according to claim 1 wherein said elongate base includes an elongate central base portion which has said rails, said support structures, said structural members, and said spacers, which are defined herein as first rails, first support structures, first structural members, and first spacers respectively, and
- wherein said elongate base further includes at least one base extension portion which has a pair of second rails positionable for alignment with said first rails respectively for engagement by said carriage, a pair of second support structures to which said second rails are rigidly attached respectively, a plurality of second spacers disposed between each of said rails and the respective one of said support structures, and a plurality of spaced second structural members interconnecting said second support structures, whereby said second rails are laminated to said second support structures respectively,
- wherein said elongate base further includes a pair of hinges hingedly attaching said at least one base extension portion to said central base portion at an end of said central base portion in a manner which allows said at least one base extension portion to be folded from a first position for use to a second position at least partially over onto said central base portion,
- wherein said elongate base also includes a pair of third spacers,
- wherein each of said third spacers has a first spacer portion which is attached to one of two groupings wherein a first of said groupings comprises said respective first rail and said respective first structural member of said central base portion, and wherein a second of said groupings comprises said respective second rail and said respective second structural member of said base extension portion, and
- wherein each of said third spacers also has a second spacer portion which extends from said respective first spacer portion to slidably engage between the other of said two groupings as said base extension portion is unfolded to said first position.

5. A sawmill according to claim 1, further comprising
a tow bar attached to said base,
a plurality of legs detachably attachable to said base for supporting said base,
a pair of axles detachably attachable to said base, a pair of wheels attached to said axles respectively, and tires mounted on said wheels respectively,
wherein said legs are height-adjustable to raise said base to an height such that said tires are raised above the ground so that said axles with said wheels attached may be removed,
whereby the sawmill may be towed from one location to another, and whereby said wheels and said axles may be removed so that said wheels and said tires do not interfere with use of the sawmill.

6. A sawmill according to claim 5 wherein said elongate base includes an elongate central base portion and at least one base extension portion hingedly attached to said central base portion at an end of said central base portion in a manner which allows said base extension portion to be folded from a first position for use to a second position at least partially over onto said central base portion.

7. A sawmill according to claim 1 further comprising a plurality of bolts which rigidly attach each said rail to said respective support structure and further attach said structural members respectively thereto.

8. A sawmill according to claim 1 further comprising a pair of elongate ramps for loading logs onto the sawmill, wherein at least one of said ramps has a first end portion configured for engaging the ground and a second end portion configured for resting on one of said support structures, said at least one ramp comprising two plates attached side-by-side, a plurality of longitudinally spaced safety catches sandwiched between said plates, a pin attaching each said catch to said plates so that said catch is rotatable about said pin between a first position wherein said catch extends outwardly of said respective ramp and a second position wherein said catch lies within said respective ramp so that logs may be moved up said ramps pushing said catches forwardly from said first position to said second position, said at least one ramp further comprising a stop member attached to said plates for restraining said catch from rotating backwardly from said first position, said at least one ramp further comprising means for effecting return of said catches from said second position to said first position once a log has passed to thereby restrain a log if it thereafter falls backwardly, wherein said means for effecting return comprises a weighted portion on each said catch which is positioned on said catch to bias said catch to fall back to said first position due to gravity.

9. A sawmill according to claim 1 wherein said rails are laser cut.

10. A sawmill according to claim 1 wherein said base includes a tow bar attached to said base and further includes a central base portion and a base extension portion which is hingedly attached to said central base portion in a manner to be foldable at least partially over onto said central base portion and which overlies said tow bar when unfolded so that said base extension portion lies end-to-end with said central base portion for use of the sawmill to cut logs.

11. A sawmill according to claim 1 wherein said carriage further includes
a pair of spaced bandwheels upon which said saw blade is mounted,
a pair of stationary spindles upon which said bandwheels respectively are mounted, and
means for applying a predetermined amount of tension to said saw blade,
wherein said means for applying said predetermined amount of tension includes an elongate non-rotatable threaded rod which when moved longitudinally effects lateral movement of one of said spindles thereby changing the distance between said spindles to change the amount of tension on said saw blade,
a member threaded engaged to said threaded rod to effect the longitudinally movement of said threaded rod upon rotation of said member, and
a torque limiter attached to said member to effect rotation of said member as said torque limiter is rotated,
wherein the torque limiter is adjusted to limit the amount of torque applied to said member to a torque which provides said predetermined amount of tension.

12. A sawmill according to claim 1 wherein said carriage further includes
a pair of spaced bandwheels upon which said saw blade is mounted,
a clutch for transmitting power to one of said bandwheels, and
means for varying speed of said bandwheels,
wherein said means for varying speed of said bandwheels includes a shaft, a drive pulley on said shaft which receives power from said clutch, and a driven pulley on said shaft for transmitting power to one of said bandwheels.

13. A sawmill according to claim 1 wherein said carriage further includes
- a pair of spaced vertical members upon which said carriage is movable vertically for positioning said saw blade vertically, and
- means for structurally supporting upper ends of said vertical members,
- wherein said means for structurally supporting includes a tank for holding and supplying a fluid for use in operation of the sawmill, said tank extending between and attached to the upper ends of said vertical members.

14. A sawmill according to claim 1 further comprising
an engine having a throttle,
at least one device,
a saw blade for sawing wood when powered by said engine when said throttle is actuated,
an actuation lever movable by a person from a de-actuation position to an actuation position and holdable by the person in said actuation position,
a cam pivotally movable between a first position and a second position,
a first member attaching said cam to said actuation lever for pivotally moving said cam from said first position to said second position by moving said actuation lever to said actuation position,
a second member attaching said throttle to said cam and responsive to movement of said cam to said second position for effecting actuation of said throttle for powering of said engine,
at least one third member attaching said at least one device to said cam and responsive to movement of said cam to said second position for effecting actuation of said at least one device, and
one or more springs attached in a manner, when said actuation lever is released from said actuation position, to return said cam to said first position, said throttle to a de-actuated position thereof, and said at least one device to a de-actuated position thereof.

15. A sawmill according to claim 1 further comprising
at least one means for clamping a log cant to said base,
wherein said means for clamping includes a first clamp member attachable to one of said structural members for clampingly engaging one side of a log cant,
wherein said means for clamping also includes a second clamp member which is attached to said one of said structural members and which includes means for moving said second clamp member in a direction longitudinally of said one of said structural members,
wherein said means for moving includes a threaded rod extending longitudinally of said one of said structural members and attached to said base in a manner to be rotatable, a handle attached to an end of said rod to effect rotation of said rod, a pair of walls of said second clamp member which have a pair of aligned vertically oblong apertures respectively for receiving said rod, a half nut fixedly attached to the bottom of one of said apertures and having threads which mate with threads on said threaded rod so that said rod can threadedly engage said half nut,
wherein said apertures are sized such that said second clamp member can be tilted so that said threads of said threaded rod and said threads of said half nut are disengaged and said second clamp member slid along said threaded rod to an approximate position for clamping, then, with said second clamp member positioned upright and said threads of said threaded rod and said threads of said half nut re-engaged, said handle can be turned to apply clamping force to an other side of the log cant.

16. A sawmill comprising
an elongate base including an elongate central base portion and at least one base extension portion,
a pair of hinges hingedly attaching said at least one base extension portion to said central base portion at an end of said central base portion in a manner which allows said at least one base extension portion to be folded from a first position for use of the sawmill to a second position wherein said at least one base extension portion is folded at least partially over onto said central base portion,
said elongate central base portion including a pair of parallel first rails extending longitudinally thereof,
said at least one base extension portion including a pair of parallel second rails which are alignable with said first rails respectively when said at least one base extension portion is in said first position,
a carriage including rollers for alternately engaging said first and second rails for moving of said carriage along said first and second rails respectively and further including a saw blade for cutting a log as said carriage is moved along said first and second rails respectively,
said elongate central base portion further including a pair of first support structures to which said pair of first rails are respectively rigidly attached side-by-side,
said elongate central base portion further including a plurality of longitudinally spaced first spacers disposed between each of said first rails and each respective one of said first support structures whereby said each of said first rails is spaced from said each respective one of said first support structures,
said elongate central base portion further including a plurality of longitudinally spaced first structural members interconnecting said first support structures for supporting a log between said first rails,
said at least one base extension portion further including a pair of second support structures to which said second rails are respectively rigidly attached side-by-side,
said at least one base extension portion further including at least one second spacer disposed between each of said second rails and each respective one of said second support structures whereby said each of said second rails is spaced from said each respective one of said second support structures,
said at least one base extension portion further including a plurality of longitudinally spaced second structural members interconnecting said second support structures,
a pair of third spacers,
wherein each of said third spacers has a first spacer portion which is disposed between and rigidly attached to one of first and second groupings, wherein said first grouping comprises a respective one of said first rails and the respective one of said first structural members, and wherein said second grouping comprises a respective one of said second rails and the respective one of said second structural members,
wherein said each of said third spacers has a second spacer portion which extends from said respective first spacer portion and which is disposed between the other of said first and second groupings when said at least one base extension portion is in said first position and is removed therefrom as said at least one base extension portion is moved toward said second position, and said carriage further including a saw operable for cutting a log on said first structural members as said carriage is moved at least partially along said first and second rails when said at least one base portion is in said first position.

17. A sawmill according to claim 16 wherein, when the sawmill is set up for use, said first and second support structures rise at least as high as said first and second rails respectively.

18. A sawmill according to claim 16 wherein said first and second rails are laser cut.

19. A sawmill comprising an elongate base including an elongate central base portion and at least one base extension portion, a pair of hinges hingedly attaching said at least one base extension portion to said central base portion at an end of said central base portion in a manner which allows said at least one base extension portion to be folded from a first position for use of the sawmill to a second position wherein said at least one base extension portion is folded at least partially over onto said central base portion, said elongate central base portion including a pair of parallel first rails extending longitudinally thereof, said at least one base extension portion including a pair of parallel second rails which are alignable with said first rails respectively when said at least one base extension portion is in said first position, a carriage including rollers for alternately engaging said first and second rails for moving of said carriage along said first and second rails respectively and further including a saw blade for cutting a log as said carriage is moved along said first and second rails respectively, said elongate central base portion further including a pair of first support structures to which said pair of first rails are respectively rigidly attached side-by-side, said elongate central base portion further including a plurality of longitudinally spaced first spacers disposed between each of said first rails and each respective one of said first support structures whereby said each of said first rails is spaced from said each respective one of said first support structures, said elongate central base portion further including a plurality of longitudinally spaced first structural members interconnecting said first support structures for supporting a log between said first rails, said at least one base extension portion further including a pair of second support structures to which said second rails are respectively rigidly attached side-by-side, said at least one base extension portion further including at least one second spacer disposed between each of said second rails and each respective one of said second support structures whereby said each of said second rails is spaced from said each respective one of said second support structures, said at least one base extension portion further including a plurality of longitudinally spaced second structural members interconnecting said second support structures, a pair of third spacers, wherein each of said third spacers has a first spacer portion which is disposed between and rigidly attached to a respective one of said first rails and the respective one of said first support structures of said central base portion, wherein said each of said third spacers has a second spacer portion which extends from said respective first spacer portion and which is disposed between a respective one of said second rails and the respective one of said second support structures of said at least one base extension portion when said at least one base extension portion is in said first position and is removed therefrom as said at least one base extension portion is moved toward said second position, and said carriage further including a saw operable for cutting a log on said first structural members as said carriage is moved at least partially along said first and second rails when said at least one base portion is in said first position.

20. A sawmill according to claim 19 wherein, when the sawmill is set up for use, said first and second support structures rise at least as high as said first and second rails respectively.

* * * * *